United States Patent
Hahm et al.

(10) Patent No.: US 12,200,811 B2
(45) Date of Patent: Jan. 14, 2025

(54) HOME APPLIANCE, METHOD OF CONTROLLING THE SAME, AND METHOD OF CONTROLLING MOBILE DEVICE COMMUNICATING WITH HOME APPLIANCE

(71) Applicant: Samsung Electronics Co., Ltd., Suwon-si (KR)

(72) Inventors: Seongil Hahm, Suwon-si (KR); Jeik Kim, Suwon-si (KR); Kwanjoo Myoung, Suwon-si (KR); Miyoung Yoo, Suwon-si (KR); Daesung An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 392 days.

(21) Appl. No.: 17/836,639

(22) Filed: Jun. 9, 2022

(65) Prior Publication Data
US 2022/0417723 A1     Dec. 29, 2022

Related U.S. Application Data

(63) Continuation of application No. PCT/KR2022/006428, filed on May 4, 2022.

(30) Foreign Application Priority Data

Jun. 29, 2021   (KR) .......................... 10-2021-0084875

(51) Int. Cl.
*H04L 12/28*       (2006.01)
*H04W 4/80*        (2018.01)
(Continued)

(52) U.S. Cl.
CPC ......... *H04W 8/005* (2013.01); *H04L 12/2814* (2013.01); *H04W 4/80* (2018.02); *H04W 76/14* (2018.02)

(58) Field of Classification Search
None
See application file for complete search history.

(56) References Cited

U.S. PATENT DOCUMENTS

| | | |
|---|---|---|
| 9,769,686 B2 | 9/2017 | Kang et al. |
| 9,961,484 B2 | 5/2018 | Choi et al. |
| | (Continued) | |

FOREIGN PATENT DOCUMENTS

| | | |
|---|---|---|
| KR | 10-2014-0078518 | 6/2014 |
| KR | 10-1762013 | 7/2017 |
| | (Continued) | |

OTHER PUBLICATIONS

International Search Report dated Aug. 9, 2022, issued in PCT Application No. PCT/KR2022/006428.
(Continued)

*Primary Examiner* — Angela Nguyen
(74) *Attorney, Agent, or Firm* — STAAS & HALSEY LLP

(57) ABSTRACT

A method of controlling a home appliance, the method including, by a home appliance: outputting, via Bluetooth low energy (BLE) advertising, a BLE advertising packet including service set identifier (SSID)-related information related to an SSID of a software enabled access point (Soft AP) of the home appliance in a new product state in which the home appliance has not been registered in a server; outputting a Wi-Fi beacon of the Soft AP; in response to a connection request for the Soft AP received from a mobile device after outputting the Wi-Fi beacon, establishing a Wi-Fi communication connection between the mobile device and the Soft AP; receiving, from the mobile device via the Wi-Fi communication connection, a control signal related to an initial setting operation of registering the home
(Continued)

appliance in the server; and performing the initial setting operation, based on the received control signal.

20 Claims, 22 Drawing Sheets

(51) Int. Cl.
 *H04W 8/00* (2009.01)
 *H04W 76/14* (2018.01)

(56) References Cited

U.S. PATENT DOCUMENTS

| | | | |
|---|---|---|---|
| 10,506,129 | B2 | 12/2019 | Terashita et al. |
| 10,574,445 | B2 | 2/2020 | Agerstam et al. |
| 10,904,028 | B2 | 1/2021 | Jang et al. |
| 2014/0373123 | A1* | 12/2014 | Kang ............... H04L 41/22 715/736 |
| 2015/0103708 | A1 | 4/2015 | Kang et al. |
| 2016/0219496 | A1 | 7/2016 | Jang et al. |
| 2017/0215030 | A1 | 7/2017 | Choi et al. |
| 2018/0324684 | A1 | 11/2018 | Onohara et al. |
| 2020/0314743 | A1* | 10/2020 | Baki ............... H04W 12/08 |
| 2021/0051742 | A1 | 2/2021 | Ganesan et al. |
| 2021/0068068 | A1 | 3/2021 | Lee |
| 2021/0119996 | A1 | 4/2021 | Ha et al. |
| 2021/0295993 | A1 | 9/2021 | Shin |
| 2022/0174473 | A1* | 6/2022 | Rooney ............... H04L 9/50 |
| 2022/0392431 | A1 | 12/2022 | Kwon et al. |

FOREIGN PATENT DOCUMENTS

| | | |
|---|---|---|
| KR | 10-1772408 | 9/2017 |
| KR | 10-2018-0065428 | 6/2018 |
| KR | 10-1980039 B1 | 5/2019 |
| KR | 10-2019-0089863 | 7/2019 |
| KR | 10-2019-0099586 | 8/2019 |
| KR | 10-2022666 B1 | 9/2019 |

OTHER PUBLICATIONS

European Search Report dated Jun. 6, 2024 issued in European Application No. EP 22 83 3386.

* cited by examiner

FIG. 5

| ITEM | ITEM DESCRIPTION |
|---|---|
| di | Device ID. Indicates unique ID of device |
| rt | Resource Type. Indicates type of device |
| otmsupportfeature | OTM Support Feature. Indicates feature of easy setup supported by home appliance |
| firmwareversion | Firmware Version. Indicates SW version of home appliance |
| owned | Owned State. Indicates owned state of device |

HOME APPLIANCE, METHOD OF CONTROLLING THE SAME, AND METHOD OF CONTROLLING MOBILE DEVICE COMMUNICATING WITH HOME APPLIANCE

CROSS-REFERENCE TO RELATED APPLICATIONS

This application is a continuation application filed under 35 U.S.C. § 111 (a) of International Application PCT/KR2022/006428, filed May 4, 2022, it being further noted that foreign priority benefit is based upon Korean patent application 10-2021-0084875, filed Jun. 29, 2021, in the Korean Intellectual Property Office, the disclosures of which are incorporated by reference herein in their entireties.

BACKGROUND

1. Field

The disclosure relates to a home appliance, a method of controlling the home appliance, a computer-readable recording medium having recorded thereon a program for executing, on a computer, the method of controlling the home appliance, and a mobile device communicating with the home appliance.

2. Description of Related Art

With the wide supply of Internet of things (IoT) products, lives of people are becoming more abundant than before, as surrounding things are connected via the Internet. However, many IoT products do not include a touch screen like a smartphone, and thus user input is very restrictive. Such a restriction is a hindrance that prevents a user from easily connecting the IoT products to the Internet. This restriction may be solved by utilizing the high usability of smartphones. In detail, a method by which a smartphone mediates a process in which the IoT product is connected to the Internet and a process by which the IoT product is registered in an IoT server may be used. Such a method is referred to as easy setup, onboarding, or commissioning.

For the easy setup, a communication establishment operation between the smartphone and a home appliance is required. However, the communication establishment operation for the easy setup consumes considerable power. Due to such a power issue, the easy setup often fails when communication establishment and IoT server registration processes are not completed within a certain time, according to the method of the related art.

SUMMARY

Additional aspects will be set forth in part in the description which follows and, in part, will be apparent from the description, or may be learned by practice of the presented embodiments.

According to an embodiment of the disclosure, a method includes, by a home appliance: outputting, via Bluetooth low energy (BLE) advertising, a BLE advertising packet including service set identifier (SSID)-related information related to an SSID of a software enabled access point (Soft AP) of the home appliance in a new product state in which the home appliance has not been registered in a server; outputting a Wi-Fi beacon of the Soft AP; in response to a connection request for the Soft AP received from a mobile device after outputting the Wi-Fi beacon, establishing a Wi-Fi communication connection between the mobile device and the Soft AP; receiving, from the mobile device via the Wi-Fi communication connection, a control signal related to an initial setting operation of registering the home appliance in the server; and performing the initial setting operation, based on the received control signal.

The SSID-related information may include manufacturer identification information and initial setting identification information of the home appliance, and the SSID of the Soft AP may be matched to at least one of the manufacturer identification information or the initial setting identification information, or a combination thereof.

The outputting of the BLE advertising packet and the outputting of the Wi-Fi beacon may be performed by a communication module of the home appliance configured as a single chip, wherein at least a part of a time interval for outputting the BLE advertising packet and at least a part of a time interval for outputting the Wi-Fi beacon may overlap.

The outputting of the BLE advertising packet and the outputting of the Wi-Fi beacon may be performed by a communication module of the home appliance configured as a single chip, and the method may further include, by the home appliance: during a first time interval, applying power to the communication module and performing the outputting of the BLE advertising packet and the outputting of the Wi-Fi beacon; when the establishing of the Wi-Fi communication connection between the mobile device and the Soft AP is not initiated during the first time interval, during a second time interval after the first time interval, blocking the power of the communication module and stopping the outputting of the BLE advertising packet and the outputting of the Wi-Fi beacon; and periodically repeating the first time interval and the second time interval until the establishing of the Wi-Fi communication connection between the mobile device and the Soft AP is initiated.

The method may further include, by the home appliance, displaying, on a display of the home appliance, user authentication information to be used for user authentication of the mobile device.

The performing of the initial setting operation may include, after the user authentication of the mobile device is completed: receiving address information of an initial setting cloud from the mobile device; transmitting a temporary password to the mobile device; receiving server connection information from the initial setting cloud, by using the temporary password as authentication information; and registering the home appliance in the server by using the server connection information.

The method may further include, by the home appliance, before the user authentication of the mobile device, transmitting version information of the initial setting operation to the mobile device via the Wi-Fi communication connection.

The outputting of the BLE advertising packet may be performed by a BLE communication module of the home appliance, the outputting of the Wi-Fi beacon may be performed by a Wi-Fi communication module of the home appliance, and the method may further include, by the home appliance, blocking power of the Wi-Fi communication module while the outputting of the BLE advertising packet is being performed.

The method may further include, by the home appliance: establishing a Bluetooth communication connection with the mobile device, based on a BLE connection request received from the mobile device; supplying power to the Wi-Fi communication module and activating the Soft AP, based on receiving an activation request of the Soft AP via the Bluetooth communication connection; and outputting the Wi-Fi beacon of the Soft AP.

According to another embodiment of the disclosure, a home appliance includes: a communication module; at least one memory storing at least one instruction; and at least one processor connected to the at least one memory, wherein the at least one processor is configured to execute the at least one instruction to: output, via Bluetooth low energy (BLE) advertising, a BLE advertising packet including service set identifier (SSID)-related information related to an SSID of a software enabled access point (Soft AP) of the home appliance in a new product state in which the home appliance has not been registered in a server; output a Wi-Fi beacon of the Soft AP via the communication module; in response to a connection request for the Soft AP received from a mobile device after outputting the Wi-Fi beacon, establish a Wi-Fi communication connection between the mobile device and the Soft AP; receive, from the mobile device via the Wi-Fi communication connection, a control signal related to an initial setting operation of registering the home appliance in the server; and perform the initial setting operation, based on the received control signal.

According to another embodiment of the disclosure, a computer-readable recording medium has recorded thereon a program for executing, on a computer, the method of controlling a home appliance.

According to another embodiment of the disclosure, a method includes, by a mobile device: performing a Bluetooth low energy (BLE) scan operation; detecting a BLE advertising packet that includes service set identifier (SSID)-related information of a home appliance and is transmitted from the home appliance in a new product state in which the home appliance has not been registered in a server, according to the BLE scan operation; obtaining an SSID of the home appliance from the server, by using the SSID-related information; establishing a Wi-Fi communication connection with the home appliance, by using the SSID of the home appliance; providing an initial setting graphic user interface (GUI) related to an initial setting operation of registering the home appliance in the server; and transmitting, to the home appliance via the Wi-Fi communication connection, a control signal related to the initial setting operation input through the initial setting GUI.

BRIEF DESCRIPTION OF DRAWINGS

Aspects, features, and advantages of certain embodiments of the disclosure will be more apparent from the following description taken in conjunction with the accompanying drawings, in which:

FIG. 5 is a diagram showing information about a home appliance transmitted by the home appliance to a mobile device, according to an embodiment of the disclosure.

DETAILED DESCRIPTION

Figure 1:
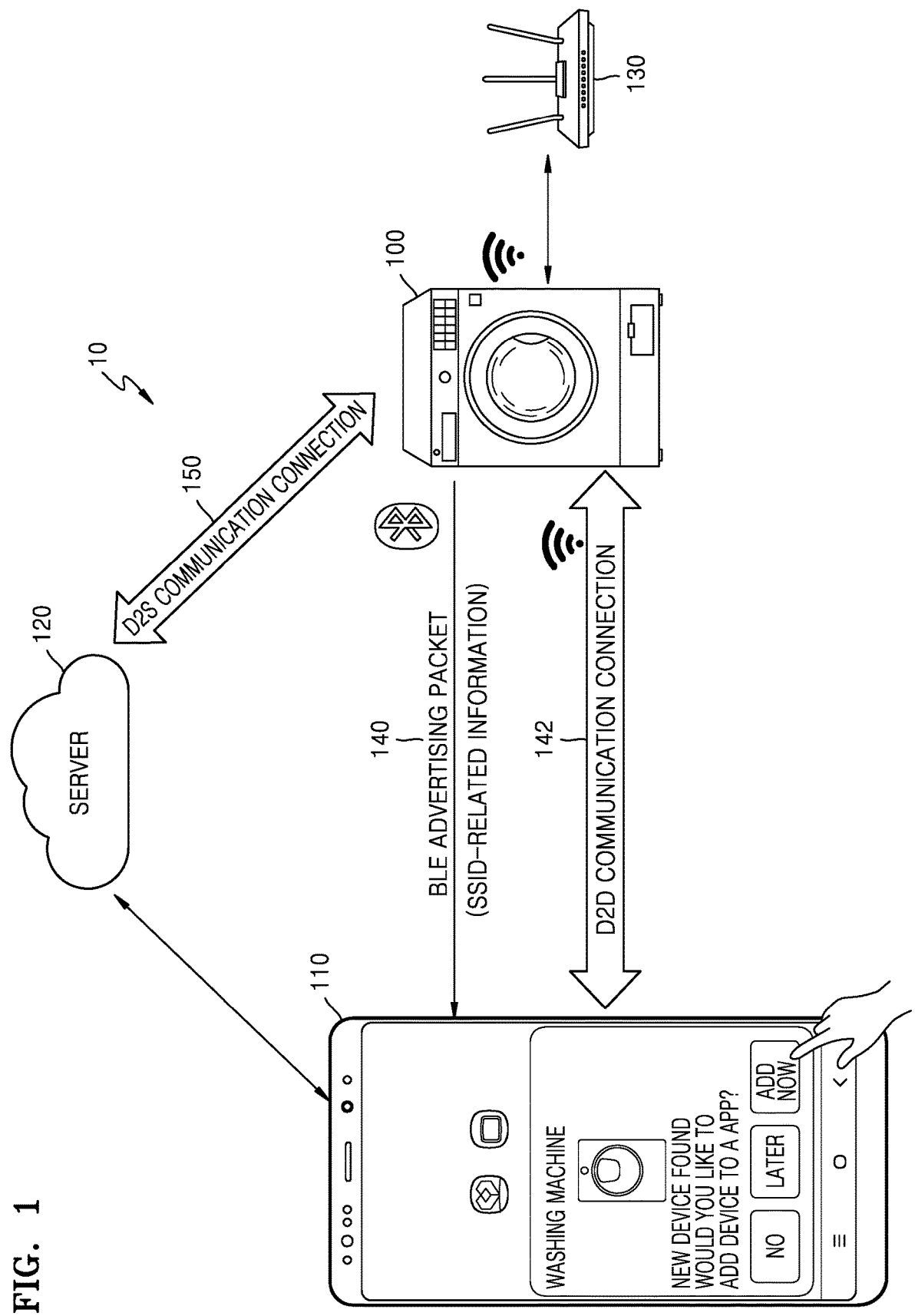
FIG. 1 is a diagram of a home appliance control system according to an embodiment of the disclosure.

In the disclosure, the expression "at least one of a, b, or c" may refer to "a", "b", "c", "a and b", "a and c", "b and c", "all of a, b, and c", or a modification thereof.

The present specification describes and discloses principles of embodiments of the disclosure such that the scope of right of claims are clarified and one of ordinary skill in the art may implement embodiments of the disclosure described in the claims. The embodiments of the disclosure may be implemented in various forms.

Throughout the specification, like reference numerals denote like elements. The present specification does not describe all elements of the embodiments of the disclosure, and generic content in the technical field of the disclosure or redundant content of the embodiments of the disclosure is omitted. The term "module" or "unit" used in the specification may be implemented in software, hardware, firmware, or a combination thereof, and according to embodiments of the disclosure, a plurality of "modules" or "units" may be implemented as one element or one "module" or "unit" may include a plurality of elements.

In the description of embodiments of the disclosure, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

Hereinafter, operation principles and various embodiments of the disclosure will be described with reference to accompanying drawings.

Provided are a home appliance for enhancing security and reducing power consumption for establishing communication with a mobile device, during a process of registering, in a server, the home appliance in a new product state that has not been registered in the server, a method of controlling the home appliance, and a method of controlling the mobile device.

FIG. 1 is a diagram of a home appliance control system according to an embodiment of the disclosure.

A home appliance control system 10 according to an embodiment of the disclosure includes a home appliance 100, a mobile device 110, and a server 120. The home appliance 100 includes a Bluetooth low energy (BLE) advertising function and communicates with the mobile device 110 via Wi-Fi communication. Also, the home appliance 100 communicates with the server 120. The home appliance 100 may access the server 120 via an access point (AP) device 130 or the like. The home appliance 100 may perform Wi-Fi communication with the AP device 130, and access the server 120 by accessing the Internet via the AP device 130.

The home appliance 100 may provide various functions while communicating with the mobile device 110 and server 120. For example, the home appliance 100 may access the server 120 and be registered in the server 120. Also, the home appliance 100 provides various functions via an application executed in the mobile device 110. The application operates in association with the server 120. The application may provide functions, such as monitoring, control, automation, voice assistance, and the like, by the home appliance 100.

To provide such functions of the application, the home appliance 100 needs to be registered in the mobile device 110 and server 120, and establish communication with the mobile device 110 and server 120. However, the home appliance 100 is unable to provide the functions of the application and various functions provided by the server 120, when the home appliance 100 is in a new product state that has not been registered in the server 120 yet after being released from a factory. Such a new product state is referred to as an out-of-box (OOB) state.

As described above, the new product state denotes a state in which the home appliance 100 is not registered in the server 120. The home appliance 100 is registered in the server 120 and connected to a certain account. The home appliance 100 may be managed as a device of the certain account, and may be monitored and controlled by another device logged into the connected account. When the home appliance 100 is not registered in the server 120, the home appliance 100 may generate and output information indicating that it is in the new product state and need to be registered in the server 120. According to an embodiment of the disclosure, the home appliance 100 may generate a BLE advertising packet including the information indicating the new product state or information requesting an initial setting operation, and output (e.g., broadcast) the generated BLE advertising packet to an adjacent device.

The home appliance 100 may perform processes of establishing a communication connection with the mobile device 110 and establishing a communication connection with the server 120, while in the new product state. For communication establishment, the home appliance 100 uses a software enabled access point (Soft AP) enabling the home appliance 100 to be recognized as a virtual AP. The Soft AP is implemented as software that is a wireless local area network (LAN) client, but operates as a wireless AP. The Soft AP operates like the wireless AP. The home appliance 100 drives the Soft AP by using a Wi-Fi module. Other devices may join the Soft AP of the home appliance 100 to establish a Wi-Fi communication connection with the home appliance 100 and perform Wi-Fi communication with the home appliance 100. The Wi-Fi communication connection established between the mobile device 110 and home appliance 100 by using the Soft AP may correspond to a Wi-Fi direct method.

To perform the initial setting operation, the home appliance 100 establishes device-to-device (D2D) communication connection 142 with the mobile device 110. The D2D communication connection 142 is established using the Wi-Fi communication method, by using the Soft AP. The Soft AP has a certain service set identifier (SSID) and the mobile device 110 accesses via the SSID of the Soft AP of the home appliance 100. In this regard, the home appliance 100 transmits the SSID of the Soft AP to the mobile device 110 and the mobile device 110 obtains the SSID to access the home appliance 100.

According to embodiments of the disclosure, the home appliance 100 outputs information related to the SSID of the Soft AP by using BLE advertising. The home appliance 100 does not directly output the SSID of the Soft AP, but outputs SSID-related information related to the SSID. The SSID-related information includes identification information (manufacturer ID) of a manufacturer of the home appliance 100, and initial setting identification information (initial setting ID). The home appliance 100 inserts the SSID-related information into a BLE advertising packet 140 and outputs the same. The BLE advertising packet 140 includes the SSID-related information and is output in a BLE advertising method.

The home appliance 100 may enhance security of the home appliance 100 by inserting the SSID-related information, instead of the SSID, into the BLE advertising packet 140. When the SSID is directly inserted, all devices receiving the BLE advertising packet 140 are able to access the home appliance 100. In this case, a device that does not have authority to access the home appliance 100 may establish communication with the home appliance 100, thereby damaging the security of the home appliance 100. According to an embodiment of the disclosure, the SSID-related information is inserted into the BLE advertising packet 140 and the mobile device 110 obtains the SSID from the server 120, thereby preventing an arbitrary device from establishing Wi-Fi communication with the home appliance 100.

Meanwhile, an easy setup technology of a Soft AP method uses a Wi-Fi communication method. However, Wi-Fi communication is unable to be always turned on because power consumption thereof generally exceeds a standby power standard of a product. Accordingly, a method by which the home appliance 100 turns on the Wi-Fi module only for a certain time period and then turns off the Wi-Fi module, while being in the new product state, may be used. In this case, when the mobile device 110 does not perform the initial setting operation within a time during which the Soft AP is activated, the initial setting operation is able to be performed only when a user explicitly turns on a corresponding function in the home appliance 100 later. For example, the initial setting operation is able to be performed again only when the user turns on a power button of the home appliance 100 to change the state of the home appliance 100 from a standby power state to an operating power state, or explicitly turns on a Soft AP function of the home appliance 100. In other words, the Soft AP method has limitation on increasing a connection rate because a time and opportunity to inform a user of the mobile device 110 that connection is possible in the standby power state are limited.

When power of a Wi-Fi communication module of the home appliance 100 is blocked after a certain time, the home appliance 100 is not found even when the user performs Wi-Fi scan with the mobile device 110, and thus the initial setting operation is unable to be performed. In addition, the Soft AP method has a power consumption issue of the mobile device 110. When the Wi-Fi scan is periodically performed on a home screen of the mobile device 110, a runout speed of battery power of the mobile device 110 is increased. Due to such a power issue, the mobile device 110 is unable to periodically perform the Wi-Fi scan on the home screen. Accordingly, when the mobile device 110 searches for the home appliance 100 in the new product state by using the Wi-Fi scan, it is unable for the home screen of the mobile device 110 to search for the home appliance 100 in the new product state and provide information about the home appliance 100.

The home appliance 100 according to an embodiment of the disclosure outputs the BLE advertising packet 140 including the SSID-related information, by using the BLE advertising method. According to such a method, the home appliance 100 is able to output the SSID-related information for the initial setting operation, by using standby power. Because BLE advertising is able to be performed with low power, the BLE advertising may be performed only with the standby power of the home appliance 100. Also, because BLE scan of the mobile device 110 is able to be performed with standby power, a battery power consumption issue may be significantly reduced. Also, because the mobile device 110 is able to perform the BLE scan in a standby mode, the mobile device 110 may detect the home appliance 100 that requires the initial setting operation on the home screen, and obtain information for establishing the D2D communication connection 142 with the home appliance 100.

The mobile device 110 requests the server 120 for the SSID of the home appliance 100, by using the SSID-related information. The server 120 receives the SSID-related information from the mobile device 110 and searches for SSID corresponding to the received SSID-related information. For example, the server 120 may receive the manufacturer ID and the initial setting ID, and search for SSID corresponding to a combination of the manufacturer ID and the initial setting ID. The server 120 may store the SSID corresponding to the SSID-related information (e.g., the combination of manufacturer ID and initial setting ID), and search for the SSID by using the stored information. The server 120 transmits a found SSID to the mobile device 110.

According to an embodiment of the disclosure, an address of the server 120 may be stored in the BLE advertising packet 140. According to another embodiment of the disclosure, the address of the server 120 may be stored in an application for controlling the home appliance 100. Upon receiving the BLE advertising packet 140, the mobile device 110 access a server address stored in the BLE advertising packet 140 or a server address stored in the application. The mobile device 110 obtains the SSID by accessing the server 120.

The home appliance 100 outputs a Wi-Fi beacon of the Soft AP while performing a BLE advertising operation. As another example, the home appliance 100 outputs the Wi-Fi beacon of the Soft AP after the BLE advertising operation. The Wi-Fi beacon of the Soft AP output by the home appliance 100 includes additional information and SSID of the Soft AP. The mobile device 110 performs the Wi-Fi scan and detects the Wi-Fi beacon output from the home appliance 100. The mobile device 110 identifies the SSID of the Wi-Fi beacon, and joins the Soft AP of the home appliance 100, based on detecting the Wi-Fi beacon having the same SSID as the home appliance 100 obtained by the mobile device 110. The mobile device 110 establishes the Wi-Fi communication connection with the Soft AP of the home appliance 100. The Wi-Fi communication connection between the mobile device 110 and the Soft AP of the home appliance 100 corresponds to the D2D communication connection 142 between the mobile device 110 and the home appliance 100.

When the D2D communication connection 142 with the mobile device 110 is established, the home appliance 100 performs the initial setting operation while communicating with the mobile device 110 via the Wi-Fi communication connection. Upon detecting the home appliance 100 in the new product state, the mobile device 110 executes an application related to the home appliance 100 and performs the initial setting operation on the home appliance 100. The mobile device 110 executes the application to perform an operation required for the initial setting operation of the home appliance 100, and receives a user input. Also, the mobile device 110 executes the application to establish a communication connection between the server 120 and the home appliance 100, while communicating with the server 120.

The home appliance 100 receives, from the mobile device 110, a control signal related to the initial setting operation to establish a device-to-server (D2S) communication connection 150 with the server 120 and registers the home appliance 100 in the server 120. According to an embodiment of the disclosure, the home appliance 100 performs user authentication on the mobile device 110. The home appliance 100 transmits authentication information to the application executed by the mobile device 110, based on performing the user authentication. The mobile device 110 registers the home appliance 100 in the server 120 by using the authentication information received from the home appliance 100. The home appliance 100 accesses the server 120 by receiving server connection information from the server 120. The home appliance 100 completes an operation of registering the home appliance 100 in the server 120 by accessing (e.g., logging in or signing in) the server 120 by using the server connection information. The home appliance 100 may be connected to a specific account of the server 120.

Figure 2:
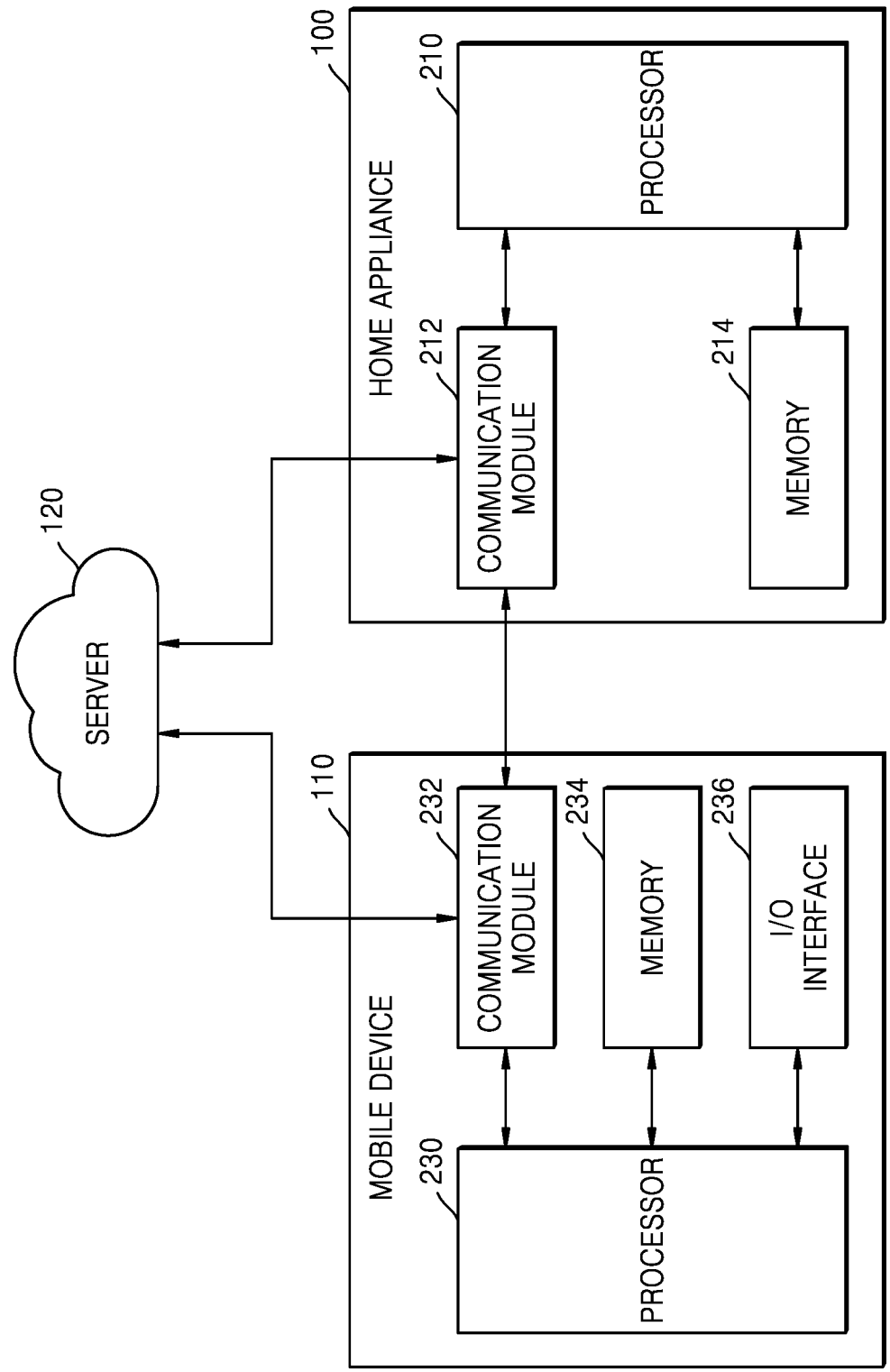
FIG. 2 is a diagram of a home appliance, a mobile device, and a server, according to an embodiment of the disclosure.

FIG. 2 is a diagram of a home appliance, a mobile device, and a server, according to an embodiment of the disclosure.

According to an embodiment of the disclosure, the home appliance 100 includes a processor 210, a communication module 212, and a memory 214.

The home appliance 100 is an electronic device performing a certain function. The home appliance 100 is arranged at a certain location at home. For example, the home appliance 100 may include a refrigerator, a kimchi refrigerator, a washing machine, a television (TV), an air conditioner, a robot vacuum cleaner, a vacuum cleaner, a clothing management device, an oven, a microwave, an induction cooker, an audio output device, or a smart home hub device.

The home appliance 100 performs an intrinsic function by including a certain home appliance function module. For example, the home appliance function module may include a cooler, a container, a door, a temperature sensor, a door opening/closing sensor, a light, and the like, which are provided in the refrigerator. As another example, the home appliance function module may include a washing machine drum, a motor, a door, a door opening/closing sensor, a water supply portion, a drainage portion, and the like, which are provided in the washing machine. As another example, the home appliance function module may include a vacuum suction assembly, a dust collector, a brush, and the like, which are provided in the vacuum cleaner.

The processor 210 controls all operations of the home appliance 100. The processor 210 may be configured as one or more processors. The processor 210 may perform a certain operation by executing an instruction or command stored in the memory 214. Also, the processor 210 controls operations of components provided in the home appliance 100.

The communication module 212 may communicate with an external device wirelessly or via wires. The communication module 212 communicates with the mobile device 110 and the server 120. The communication module 212 may communicate with the mobile device 110 by using a short-range communication method. For example, the communication module 212 may communicate with the mobile device 110 via a Bluetooth, Bluetooth low energy (BLE), or Wi-Fi communication connection. Also, the communication module 212 may communicate with the server 120 by using a long-range communication method. For example, the communication module 212 may communicate with the AP device 130 via Wi-Fi, and communicate with the server 120 via a long-range communication network connected to the AP device 130.

The communication module 212 may include a wireless communication module (e.g., a cellular communication module, a short-range wireless communication module, or a global navigation satellite system (GNSS) communication module) or a wired communication module (e.g., a local area network (LAN) communication module or a power line communication module). Also, the communication module 212 may perform short-range communication, and for example, may use Bluetooth, BLE, short-range wireless communication, near field communication (NFC), WLAN (Wi-Fi), Zigbee, infrared data association (IrDA) communication, Wi-Fi direct (WFD), ultra wideband (UWB), Ant+ communication, or the like. As another example, the communication module 212 may perform long-range communication, and for example, may communicate with an external device via a legacy cellular network, a 5th generation (5G) network, a next-generation communication network, the Internet, or a computer network (e.g., LAN or wide-area network (WAN)).

The communication module 212 may establish communication with the mobile device 110 and server 120, according to control by the processor 210. Also, the communication module 212 may transmit a control signal and data to the mobile device 110 and server 120, or receive a control signal and data from the mobile device 110 and server 120.

The home appliance 100 may be registered in a certain account registered in the server 120, and communicate with the server 120. Also, the home appliance 100 may communicate with the mobile device 110 via a Bluetooth, BLE, or Wi-Fi communication connection. According to an embodiment of the disclosure, the home appliance 100 may communicate with another home appliance 100 via a home network.

According to an embodiment of the disclosure, the communication module 212 may include a BLE-Wi-Fi communication chipset in which a BLE communication module and a Wi-Fi communication module are configured as a single chip. According to such a configuration, the BLE communication module and the Wi-Fi communication module are simultaneously turned on or off. The communication module 212 supports both a BLE communication function and a Wi-Fi communication function when the BLE-Wi-Fi communication chipset is turned on. When the BLE-Wi-Fi communication chipset is turned off, the BLE communication function and the Wi-Fi communication function are both disabled.

According to another embodiment of the disclosure, the communication module 212 includes a BLE communication chipset corresponding to the BLE communication module and a Wi-Fi communication chipset corresponding to the Wi-Fi communication module. The BLE communication chipset and the Wi-Fi communication chipset are independently turned on or off. The BLE communication chipset and the Wi-Fi communication chipset may have power lines that are independently turned on or off. In this case, the communication module 212 may selectively turn on or off the BLE communication function and the Wi-Fi communication function.

The BLE communication function has lower driving power than the Wi-Fi communication function. The BLE communication function may maintain a turn-on state even in a standby power state of the home appliance 100. On the other hand, the Wi-Fi communication function is unable to be driven by standby power. Accordingly, to enable the Wi-Fi communication function, the home appliance 100 escapes from the standby power state and switches to a state (e.g., a normal mode) in which the home appliance 100 consumes more power.

When it is possible to independently turn on or off the BLE communication chipset and the Wi-Fi communication chipset, the home appliance 100 may maintain, in the standby power state, an on-state of the BLE communication chipset and an off-state of the Wi-Fi communication chipset. Accordingly, the home appliance 100 may output the BLE advertising packet in the standby power state, and switch to the normal mode when necessary.

On the other hand, when the BLE communication chipset and the Wi-Fi communication chipset are configured as a single chip, the home appliance 100 is unable to use both the BLE communication function and the Wi-Fi communication function in the standby power state. Accordingly, the home appliance 100 escapes from the standby power state and operates in the normal mode to use the BLE communication function or the Wi-Fi communication function. Also, the home appliance 100 is unable to use both the BLE communication function and the Wi-Fi communication function in the standby power state.

In the home appliance 100, the BLE communication chipset and the Wi-Fi communication chipset may be configured integrally or independently due to various reasons, such as a design issue, an expense issue, packing, a power issue, product miniaturization, and the like. Accordingly, the home appliance 100 may differently set a control method therefor, according to the configuration of the BLE communication chipset and Wi-Fi communication chipset of the home appliance 100.

When a Wi-Fi function of the communication module 212 is enabled, the processor 210 performs a Soft AP operation such that the communication module 212 of the home appliance 100 operates as the Soft AP. The processor 210 performs a certain instruction of performing the Soft AP operation to control the communication module 212 to operate as the Soft AP. The processor 210 assigns an SSID to the communication module 212. According to an embodiment of the disclosure, the processor 210 sets an SSID pre-assigned to the home appliance 100 as an SSID of the Soft AP. The pre-assigned SSID is matched to certain SSID-related information. The SSID-related information includes, for example, a manufacturer ID and initial setting ID of the home appliance 100. The SSID may be matched to the manufacturer ID and initial setting ID. The server 120 stores the manufacturer ID and initial setting ID of the home appliance 100, and pre-stores SSID information corresponding to the manufacturer ID and initial setting ID. Upon receiving the manufacturer ID and initial setting ID from the mobile device 110 later, the server 120 searches for the SSID corresponding to the manufacturer ID and initial setting ID and transmits the same to the mobile device 110.

The memory 214 stores various types of information, data, an instruction, a program, and the like required for operations of the home appliance 100. The memory 214 may be configured in at least one of a volatile memory or a nonvolatile memory, or a combination thereof. The memory 214 may include at least one type of storage medium among a flash memory type, a hard disk type, a multimedia card micro type, a card type memory (for example, a secure digital (SD) or an extreme digital (XD) memory), random access memory (RAM), static RAM (SRAM), read-only memory (ROM), electrically erasable programmable ROM (EEPROM), programmable ROM (PROM), a magnetic memory, a magnetic disk, and an optical disk. Also, the memory 214 may correspond to a web storage or cloud server performing a storing function on the Internet.

The mobile device 110 corresponds to an electronic device communicating with an external device. The mobile device 110 may correspond to, for example, a communication terminal, a wearable device, a tablet personal computer (PC), or the like. The mobile device 110 communicates with the server 120 and an external device, via a long-range communication network. The mobile device 110 is connected to a mobile communication network to perform various operations.

The mobile device 110 includes a processor 230, a communication module 232, a memory 234, and an input/output (I/O) interface 236.

The processor 230 controls all operations of the mobile device 110. The processor 230 may be configured as one or more processors. The processor 230 may perform a certain operation by executing an instruction or command stored in the memory 234.

The communication module 232 may communicate with an external device wirelessly or via wires. The communication module 230 communicates with the home appliance 100 and the server 120. The communication module 232 may communicate with the home appliance 100 via a short-range communication method. Also, the communication module 232 may communicate with the server 120 by using a long-range communication method.

The communication module 232 may include a wireless communication module (e.g., a cellular communication module, a short-range wireless communication module, or a GNSS communication module) or a wired communication module (e.g., an LAN communication module or a power line communication module). Also, the communication module 232 may perform short-range communication, and for example, may use Bluetooth, BLE, short-range wireless communication, NFC, WLAN (Wi-Fi), Zigbee, IrDA communication, WFD, UWB, Ant+ communication, or the like. As another example, the communication module 232 may perform long-range communication, and for example, may communicate with an external device via a legacy cellular network, a 5G network, a next-generation communication network, the Internet, or a computer network (e.g., LAN or WAN).

The communication module 232 may establish communication with the home appliance 100 and server 120, according to control by the processor 230. The communication module 232 may transmit a control signal and data to the home appliance 100 or server 120, or receive a control signal and data from the home appliance 100 or server 120.

The memory 234 stores various types of information, data, an instruction, a program, and the like required for operations of the mobile device 110. The memory 234 may be configured in at least one of a volatile memory or a nonvolatile memory, or a combination thereof. The memory 234 may include at least one type of storage medium among a flash memory type, a hard disk type, a multimedia card micro type, a card type memory (for example, a secure digital (SD) or an extreme digital (XD) memory), random access memory (RAM), static RAM (SRAM), read-only memory (ROM), electrically erasable programmable ROM (EEPROM), programmable ROM (PROM), a magnetic memory, a magnetic disk, and an optical disk. Also, the memory 234 may correspond to a web storage or cloud server performing a storing function on the Internet.

The communication module 232 includes a BLE communication module and a Wi-Fi communication module.

According to an embodiment of the disclosure, the BLE communication module and the Wi-Fi communication module are implemented as a single chipset. In this case, the communication module 232 turns on or off the BLE communication module and Wi-Fi communication module configured as a single chip set, together.

According to another embodiment of the disclosure, the BLE communication module and the Wi-Fi communication module are implemented as individual chipsets. In this case, the communication module 232 independently turns on or off the BLE communication module and the Wi-Fi communication module.

The BLE communication module performs a BLE scan. The BLE scan is an operation of receiving and detecting a BLE packet. When the BLE communication module and the Wi-Fi communication module are implemented as individual chipsets, the BLE communication module is operable in a standby power state of the mobile device 110. Accordingly, the mobile device 110 may perform the BLE scan in the standby power state and detect the BLE packet. The mobile device 110 may perform the BLE scan in the standby power state to detect and receive the BLE advertising packet output from the home appliance 100. Accordingly, the mobile device 110 is able to detect and receive the BLE advertising packet of the home appliance 100 even in the standby power state, a home screen, or the like.

Also, the Wi-Fi communication module performs a Wi-Fi scan to detect a Wi-Fi signal. The communication module 232 may perform the Wi-Fi scan to detect a Wi-Fi beacon transmitted from the home appliance 100 and establish a Wi-Fi communication connection. The mobile device 110 may perform the Wi-Fi scan when the BLE advertising packet is received and the home appliance 100 in the new product state is detected in the vicinity, and establish the Wi-Fi communication connection with the home appliance 100 by detecting the Wi-Fi beacon output from the home appliance 100.

The memory 234 stores a first application for controlling the home appliance 100. The processor 230 controls the home appliance 100 by executing the first application. The first application may provide functions, such as monitoring, control, automation, voice assistance, and the like, by the home appliance 100. The memory 234 pre-stores the first application or stores the first application by receiving the same from a cloud server.

The processor 230 executes the first application and establishes communication with the home appliance 100. The processor 230 generates a control signal to be transmitted to the home appliance 100, based on a user input received via the first application. The communication module 232 transmits the control signal to the home appliance 100. Also, the communication module 232 receives, from the home appliance 100, state information, a sensor detection value, a control signal, or the like of the home appliance 100. The processor 230 monitors and controls the home appliance 100, based on the state information, sensor detection value, control signal, or the like received from the home appliance 100.

Upon detecting the home appliance 100 in the new product state, the processor 230 executes the first application and performs the initial setting operation of the home appliance 100. Upon receiving the BLE advertising packet from the home appliance 100, the processor 230 identifies and detects the home appliance 100. The processor 230 identifies the home appliance 100, based on information about the home appliance 100 included in the BLE advertising packet. Also, when it is determined that the home appliance 100 in the new product state is in the vicinity, based on information included in the BLE advertising packet, the processor 230 outputs information indicating that there is the home appliance 100 in the new product state and the initial setting operation is required. For example, the processor 230 may display, on the home screen, the information about the home appliance 100 in the new product state, as a popup window. Based on a user input regarding the information indicating that the initial setting operation is required, the processor 230 executes the first application and performs the initial setting operation of the home appliance 100.

The I/O interface 236 may receive a command or data to be used in a component (e.g., the processor 230) of the mobile device 110 from the outside (e.g., a user) of the mobile device 110. The I/O interface 236 may include, for example, a touch screen, a touch pad, a key, a microphone, a mouse, a keyboard, or a digital pen (e.g., stylus pen). Also, the I/O interface 236 includes, for example, a display, a speaker, a vibration device, or the like.

The I/O interface 236 provides a graphic user interface (GUI) related to the first application and receives a user input input via the GUI. The I/O interface 236 includes abundant resources compared to an I/O interface of the home appliance 100. For example, the I/O interface 236 includes a touch screen, a key, a microphone, a speaker, a vibration device, and the like, but the home appliance 100 may include only a limited number of keys and a small display. Embodiments of the disclosure receive a control input for controlling the home appliance 100, by using the mobile device 110 having abundant I/O resources compared to the home appliance 100.

The server 120 communicates with a plurality of devices to control the plurality of devices and perform certain processes requested by the plurality of devices. The server 120 stores a user account and stores device information registered by a user in each user account. The server 120 communicates with a plurality of devices including the home appliance 100 and the mobile device 110, and exchanges control signals and data with the plurality of devices. The server 120 may be connected to the plurality of devices via a long-range communication network. The long-range communication network includes, for example, a legacy cellular network, a 5G network, a next-generation communication network, the Internet, or a computer network (e.g., LAN or WAN).

The server 120 stores SSID-related information and an SSID. The SSID-related information includes a manufacturer ID and an initial setting ID. Also, the server 120 may include additional information about the home appliance 100. For example, the server 120 may store additional information of the home appliance 100, such as a serial number, a media access control (MAC) address, a device type, or a model name.

Also, the server 120 provides a function related to the first application. For example, the server 120 may provide home appliance monitoring, a security function, an authentication function, and the like. The server 120 may store security information or authentication information corresponding to the home appliance 100, and perform user authentication by using the pre-stored security information or authentication information when the mobile device 110 requests the user authentication.

Figure 3:
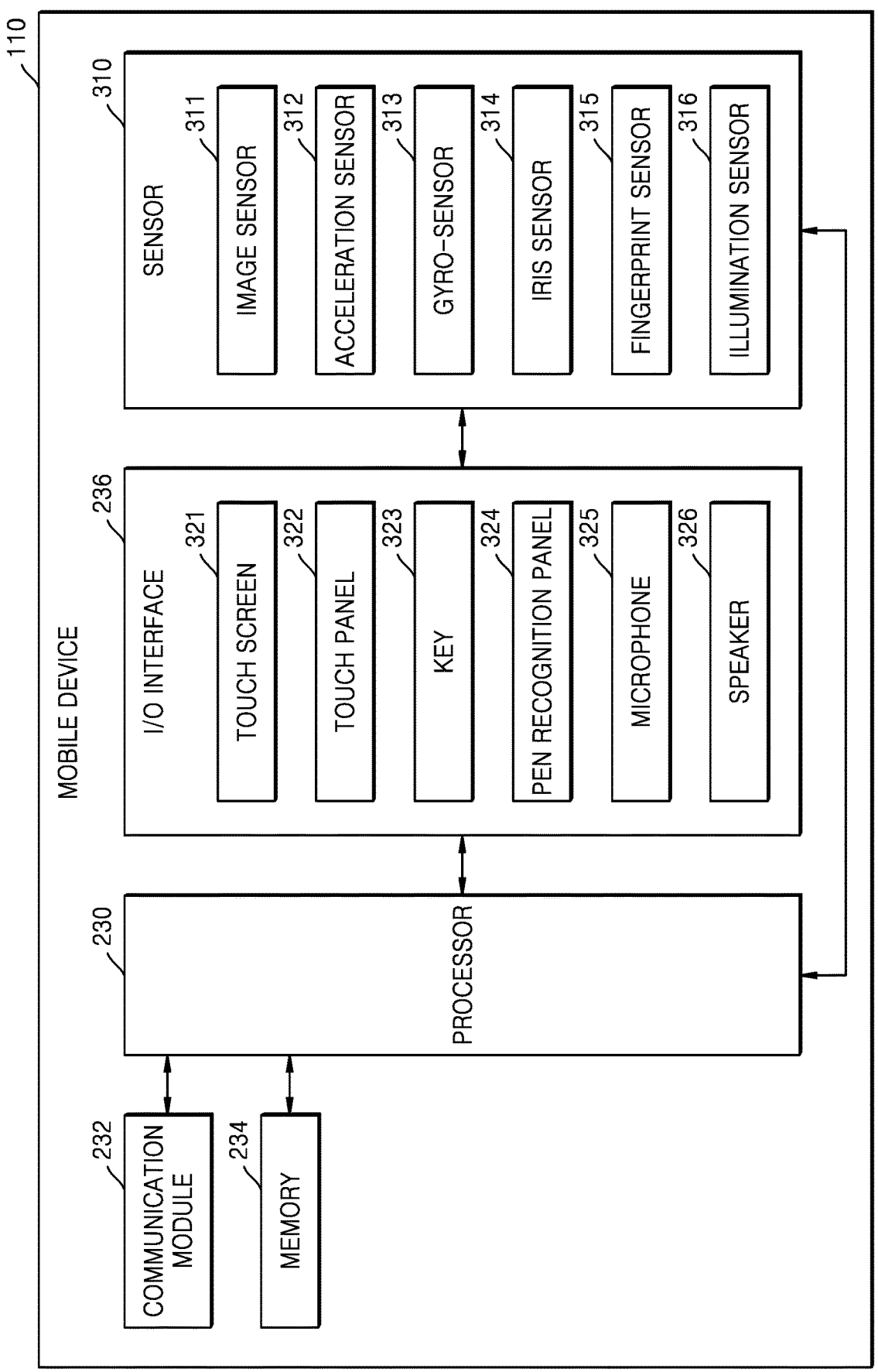
FIG. 3 is a diagram of a structure of a mobile device, according to an embodiment of the disclosure.

FIG. 3 is a diagram of a structure of a mobile device, according to an embodiment of the disclosure.

The mobile device 110 according to an embodiment of the disclosure includes the processor 230, the communication module 232, the memory 234, the I/O interface 236, and a sensor 310. The mobile device 110 may include the abundant sensors 310 and I/O resources compared to the home appliance 100. For example, the I/O interface 236 may include a touch screen 321, a touch panel 322, a key 323, a pen recognition panel 324, a microphone 325, a speaker 326, and the like. The sensor 310 may include an image sensor 311, an acceleration sensor 312, a gyro-sensor 313, an iris sensor 314, a fingerprint sensor 315, an illumination sensor 316, and the like.

The mobile device 110 may control the home appliance 100 by using the I/O interface 236 and the sensor 310. The mobile device 110 executes the first application for controlling the home appliance 100 and establishes a communication connection with the home appliance 100. The mobile device 110 receives a control signal in various forms, via the first application. The control signal may be input via the touch screen 321, touch panel 322, key 323, pen recognition panel 324, microphone 325, or the like. Also, the mobile device 110 provides an output in various forms, via the first application. The output of the first application may be output via the touch screen 321, speaker 326, or the like.

Also, the mobile device 110 may perform user authentication by using the I/O interface 236 and sensor 310. The mobile device 110 performs the user authentication by using user authentication information input via the I/O interface 236. For example, the mobile device 110 may receive an input of a password or an input of an authentication pattern gesture, by using the touch screen 321, key 323, or the like. As another example, the mobile device 110 may perform bio authentication by using the image sensor 311, iris sensor 314, fingerprint sensor 315, or the like. As another example, the mobile device 110 may perform the user authentication by photographing a quick response (QR) code, barcode, or the like provided in the home appliance 100, by using the image sensor 311.

Figure 4:
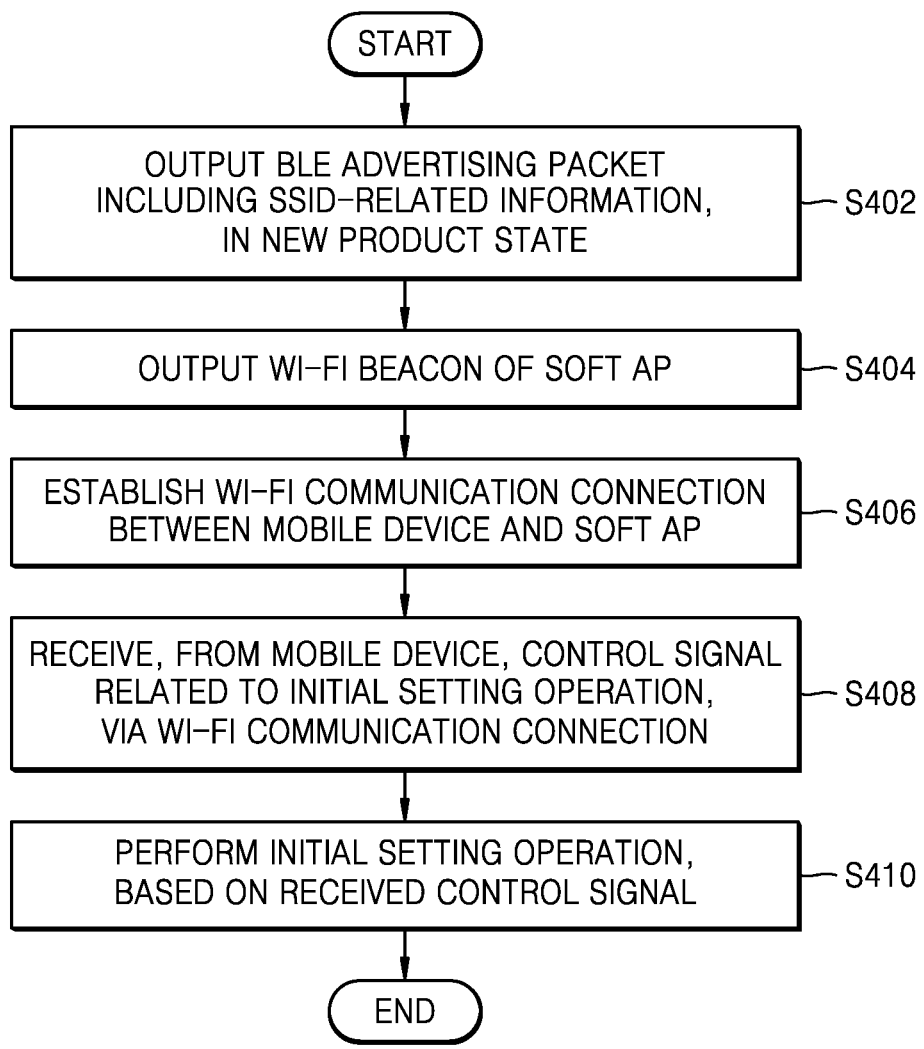
FIG. 4 is a flowchart of a home appliance control method according to an embodiment of the disclosure.

FIG. 4 is a flowchart of a home appliance control method according to an embodiment of the disclosure.

Each operation of the home appliance control method according to an embodiment of the disclosure, may be performed by an electronic device that includes a processor and a communication module and is in various forms communicating with the mobile device 110 and server 120. In the disclosure, an embodiment of the disclosure in which the home appliance 100 according to embodiments of the disclosure performs the home appliance control method. Accordingly, embodiments of the disclosure described with respect to the home appliance 100 are applicable to embodiments of the disclosure about the home appliance control method, and embodiments of the disclosure described with respect to the home appliance control method are applicable to embodiments of the disclosure about the home appliance 100. The home appliance control method according to embodiments of the disclosure is not limited being performed by the home appliance 100 of the disclosure, and may be performed by various types of electronic devices.

In operation S402, the home appliance 100 outputs a BLE advertising packet including SSID-related information, in a new product state.

The home appliance 100 performs BLE advertising in the new product state. The home appliance 100 determines whether there is account information connected to the corresponding device. When there is the account information connected to the corresponding device, the home appliance 100 operates while communicating with the mobile device 110 and server 120, by using the account information connected to the device. When there is no account information connected to the corresponding information, the home appliance 100 determines that the corresponding device is in the new product state. The home appliance 100 may be in the new product state when the home appliance 100 has never been connected to an account after being released from a factory. As another example, the home appliance 100 may return to the new product state again when the home appliance 100 has been connected to a certain account and logged out from the connected account. As another example, the home appliance 100 may return to the new product state when the home appliance 100 has been connected to a certain account and a factory process or format process is performed on the corresponding device.

When the home appliance 100 is in the new product state, the home appliance 100 enables a BLE module and performs the BLE advertising. When a BLE module and a Wi-Fi module are configured as a single chipset, the home appliance 100 enables the communication module 212 and enables the BLE module when operating in a normal mode out from a standby power mode. Also, the BLE module performs the BLE advertising to output the BLE advertising packet. As another example, when the BLE module and the Wi-Fi module are configured as individual chipsets, the home appliance 100 enables only the BLE module by applying power only to the BLE module. Here, the Wi-Fi module may maintain an off-state. The home appliance 100 may perform the BLE advertising by enabling only the BLE module in the standby power mode.

The home appliance 100 generates the BLE advertising packet including SSID-related information. According to an embodiment of the disclosure, the BLE advertising packet may be stored when released from the factory. According to another embodiment of the disclosure, the BLE advertising packet may be generated and stored as the home appliance 100 performs a certain process after being released from the factory.

The BLE advertising packet may include the SSID-related information and additional information. The SSID-related information includes, for example, a manufacturer ID and an initial setting ID. The manufacturer ID is an identifier of a manufacturer of the corresponding home appliance 100. The initial setting ID is an identifier of a process to be performed for initial setting of the corresponding home appliance 100. The additional information includes, for example, a part or all of a serial number, a Wi-Fi MAC address, product type information, an initial setting operation request, or the like.

When the BLE advertising packet is generated, the home appliance 100 outputs the generated BLE advertising packet via a BLE advertising method. The home appliance 100 may transmit the BLE advertising packet to an adjacent BLE enabled device without specifying a recipient, by using the BLE advertising method. The BLE advertising packet is transmitted to the mobile device 110 when a BLE scan is performed by the mobile device 110.

Then, in operation S404, the home appliance 100 outputs a Wi-Fi beacon of a Soft AP.

The home appliance 100 applies power to the Wi-Fi module and enables the Soft AP. The processor 210 enables the Soft AP by executing a certain instruction or program. The Soft AP operates as a virtual AP capable of being accessed by devices communicating with the home appliance 100. The Soft AP includes an SSID corresponding to the SSID-related information.

The Soft AP generates and outputs the Wi-Fi beacon. The Wi-Fi beacon includes the SSID of the Soft AP. The Wi-Fi beacon is transmitted to a device performing a Wi-Fi scan around the home appliance 100. The mobile device 110 detects and receives the Wi-Fi beacon by performing the Wi-Fi scan. Upon detecting the Wi-Fi beacon corresponding to the SSID attempting a Wi-Fi access while performing the Wi-Fi scan, the mobile device 110 joins an AP of the corresponding SSID. The mobile device 110 obtains an SSID of the home appliance 100 and identifies the SSID of the Wi-Fi beacon output from the Soft AP of the home appliance 100. The SSID of the Wi-Fi beacon output from the Soft AP corresponds to the SSID of the home appliance 100. The mobile device 110 receives the Wi-Fi beacon of the Soft AP of the home appliance 100, identifies that the SSID of the Wi-Fi beacon matches an SSID obtained by the mobile device 110, based on information of the BLE advertising packet, and joins the Soft AP of the home appliance 100.

According to an embodiment of the disclosure, the mobile device 110 outputs information indicating that the home appliance 100 is detected and joints the Soft AP of the home appliance 100, based on a user input, in response to receiving the BLE advertising packet from the home appliance 100. According to another embodiment of the disclosure, the mobile device 110 outputs the information indicating that the home appliance 100 is detected and joins the Soft AP of the home appliance 100, based on a user input, based on receiving the Wi-Fi beacon from the home appliance 100. The mobile device 110 joins the Soft AP only when a user selected to access the home appliance 100. When the user did not select or denied to access the home appliance 100, the mobile device 110 may not join the Soft AP.

According to an embodiment of the disclosure, the home appliance 100 enables the Wi-Fi module together with the BLE module. Also, the home appliance 100 outputs the Wi-Fi beacon during a same time interval while performing an output operation of the BLE advertising packet. When the communication module 212 of the home appliance 100 includes the BLE module and Wi-Fi module implemented as a single chipset, the BLE advertising packet and Wi-Fi beacon are output during a same time interval.

According to another embodiment of the disclosure, the home appliance 100 outputs the Wi-Fi beacon during another time interval after a time interval for outputting the BLE advertising packet. In this case, the Wi-Fi module may be in an off-state while the BLE advertising packet is output, and turned on when the Soft AP is enabled. After the BLE advertising packet is output, the home appliance 100 may receive a request signal requesting enabling of the Soft AP from the mobile device 110 via a BLE communication connection, and turn on the Wi-Fi module and enable the Soft AP, based on a request to enable the Soft AP. When a BLE chipset and a Wi-Fi chipset are implemented as individual chips and are capable of being turned on or off independently, the home appliance 100 may operate the Wi-Fi module only when a request for Wi-Fi communication is received from the mobile device 110. According to such a configuration, the home appliance 100 may output the BLE advertising packet even in the standby power state. Also, the home appliance 100 may reduce power consumption by applying power to the Wi-Fi module only when the Wi-Fi module is required.

Then, in operation S406, the home appliance 100 establishes a Wi-Fi communication connection between the mobile device 110 and the Soft AP.

After the Wi-Fi beacon is output, the home appliance 100 receives a Wi-Fi communication establishment request from the mobile device 110. Upon receiving the Wi-Fi communication establishment request from the mobile device 110, the home appliance 100 establishes the Wi-Fi communication connection. The home appliance 100 may generate a Wi-Fi communication channel between the mobile device 110 and the Soft AP. Also, the home appliance 100 receives information about the mobile device 110 and stores the information about the mobile device 110 therein. The information about the mobile device 110 may include at least one of the SSID, MAC address, device type, device owner, device name, or part or all of serial number of the mobile device 110. Also, the home appliance 100 may transmit, to the mobile device 110, information about the home appliance 100. The home appliance 100 transmits the information about the home appliance 100 via the Wi-Fi communication connection.

The Wi-Fi communication connection between the mobile device 110 and the home appliance 100 corresponds to the D2D communication connection 142. The mobile device 110 and the home appliance 100 may directly communicate via the D2D communication connection 142.

Then, in operation S408, the home appliance 100 receives, from the mobile device 110, a control signal related to an initial setting operation, via the Wi-Fi communication connection. The mobile device 110 executes a first application to receive a control signal for performing the initial setting operation of the home appliance 100. For example, the home appliance 100 receives, from the mobile device 110, device name setting, server access account setting, server access path information, AP device access information, AP device authentication information, or the like. Upon receiving the control signal related to the initial setting operation from the mobile device 110, the home appliance 100 may output, via an output interface, an interaction based on the received control signal.

Then, in operation S410, the home appliance 100 performs the initial setting operation, based on the control signal related to the initial setting operation received from the mobile device 110.

The home appliance 100 additionally performs a control operation between the home appliance 100 and the mobile device 110, based on the control signal received from the mobile device 110. The home appliance 100 may perform a user authentication operation of the mobile device 110, based on the control signal received from the mobile device 110.

Also, the home appliance 100 may perform an operation of establishing communication with the server 120 and registering the home appliance 100 in a user account of the server 120, based on the control signal received from the mobile device 110. The communication established between the home appliance 100 and the server 120 corresponds to the D2S communication connection 150. The home appliance 100 and the server 120 exchange control signals and data via the D2S communication connection 150. The D2S communication connection 150 may be performed via the AP device 130. As another example, the D2S communication connection 150 may be performed via a wired LAN provided in the home appliance 100 or by using a mobile communication module.

Also, the home appliance 100 may perform an operation of establishing a connection between the AP device 130 and the home appliance 100, based on the control signal received from the mobile device 110. The home appliance 100 may receive, from the mobile device 110, an SSID, device ID, password, or the like of the AP device 130, and establish a Wi-Fi connection with the AP device 130, based on the received information.

FIG. 5 is a diagram showing information about a home appliance transmitted by the home appliance to a mobile device, according to an embodiment of the disclosure.

According to an embodiment of the disclosure, the home appliance 100 transmits information about the home appliance 100 to the mobile device 110, when Wi-Fi communication with the mobile device 110 is established. The information about the home appliance 100 includes at least one of, for example, a device ID (di), a resource type (rt), object transaction middleware (OTM) support feature (otmsupportfeature), a firmware version (firmwareversion), or an owned state.

The device ID (di) indicates a unique ID of a device. The device ID may be defined in a universally unique identifier (UUID) format.

The resource type (rt) indicates a type of the home appliance 100. The type of the home appliance 100 may be defined to be, for example, an air conditioner, a washing machine, a refrigerator, or the like.

The OTM support feature (otmsupportfeature) indicates a feature of an easy setup supported by the home appliance 100. The OTM support feature (otmsupportfeature) may be defined to be, for example, QR easy setup, user confirmation skip, or the like.

The firmware version (firmwareversion) indicates a software version of the home appliance 100. The firmware version (firmwareversion) may be defined based on OTM code.

The owned state indicates an owned state of a device. The owned state indicates whether the home appliance 100 is connected to a specific account. When the home appliance 100 is connected (registered, logged in, or signed in) to a certain account, the owned state is defined to be owned. When the home appliance 100 is not connected to a certain account, the owned state is defined to be not owned.

According to an embodiment of the disclosure, the home appliance 100 inserts, into a BLE advertising packet, at least one of the device ID (di), the resource type (rt), the OTM support feature (otmsupportfeature), the firmware version (firmwareversion), or the owned state. The mobile device 110 identifies the home appliance 100, based on the information about the home appliance 100 inserted into the BLE advertising packet, and determines whether the home appliance 100 is a device that requires an initial registration operation. For example, the mobile device 110 may determine whether the home appliance 100 is a device that requires an initial registration operation, based on the owned state.

Figure 6:
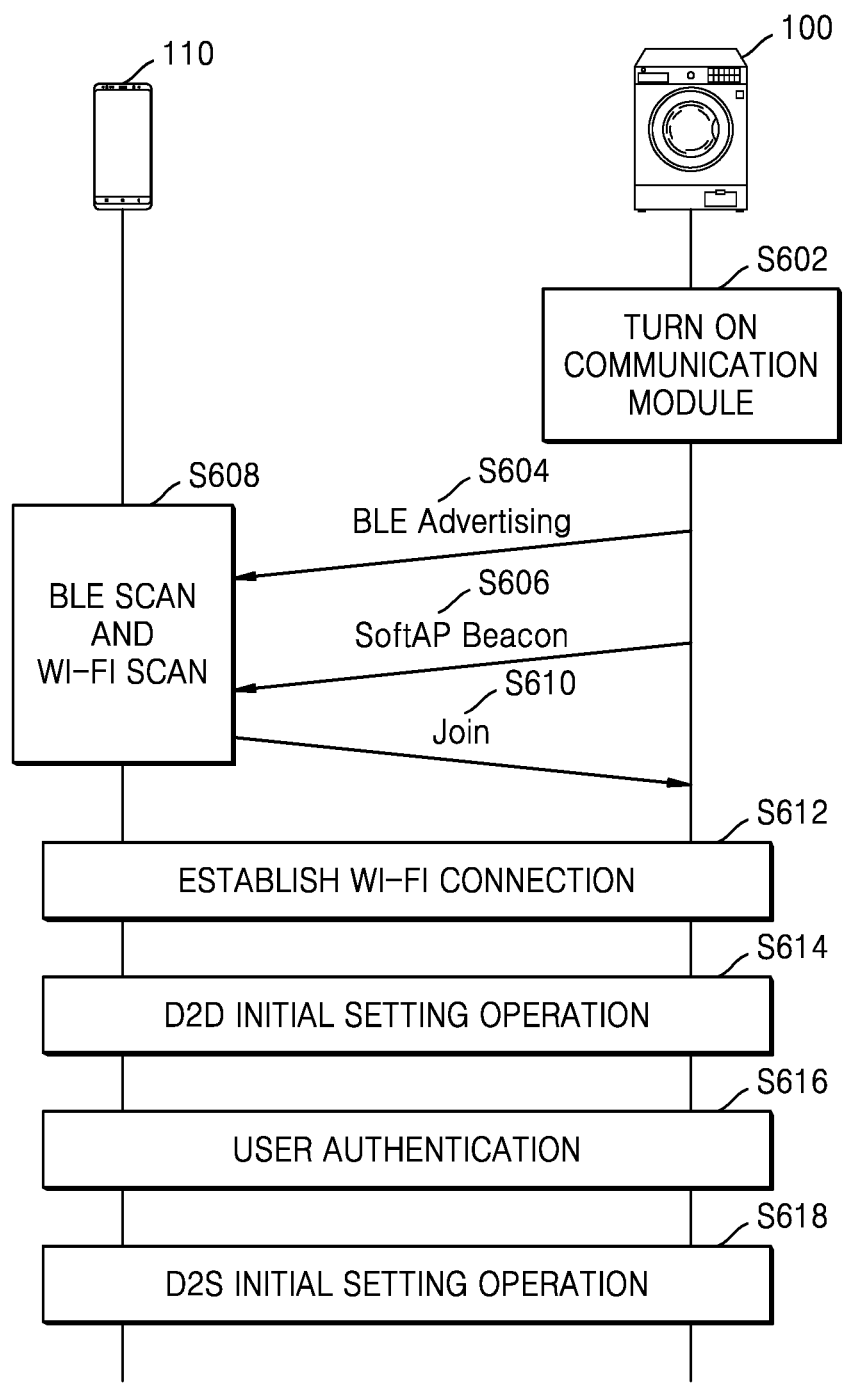
FIG. 6 is a diagram showing a process of establishing communication between a mobile device and a home appliance and performing an initial setting operation, according to an embodiment of the disclosure.

FIG. 6 is a diagram showing a process of establishing communication between a mobile device and a home appliance and performing an initial setting operation, according to an embodiment of the disclosure.

According to an embodiment of the disclosure, the home appliance 100 performs an output operation of the BLE advertising packet and an output operation of a Wi-Fi beacon during a same time interval. The home appliance 100 may include a BLE communication module and a Wi-Fi communication module configured as a single chipset. In this case, when the home appliance 100 turns on the Wi-Fi communication module and maintains a turn-on state of the Soft AP, power is applied to the BLE communication module at the same time. The home appliance 100 outputs the BLE advertising packet and the Wi-Fi beacon together during the same time interval. In this case, because the BLE communication module and the Wi-Fi communication module are turned on together, the mobile device 110 is able to detect the Wi-Fi beacon and join the Soft AP, based on the mobile device 110 receiving the BLE advertising packet, without a separate Wi-Fi enable request.

First, in operation S602, the home appliance 100 turns on the communication module 212. When the communication module 212 is turned on, power is applied to both the BLE communication module and the Wi-Fi communication module. The home appliance 100 executes a Soft AP function such that the Wi-Fi communication module operates as a virtual AP. The Wi-Fi communication module operates in a Soft AP mode.

Then, in operation S604, the home appliance 100 performs BLE advertising. The home appliance 100 generates the BLE advertising packet and outputs the BLE advertising packet via a BLE advertising method. The BLE advertising packet includes SSID-related information of the Soft AP.

Also, in operation S606, the home appliance 100 outputs the Wi-Fi beacon of the Soft AP. The home appliance 100 outputs the Wi-Fi beacon from the Soft AP to transmit information about the Soft AP to a peripheral device.

Operations S604 and S606 are not performed in a specific order, and are performed in parallel during a same time interval. In other words, during the same time interval, the BLE communication module performs the BLE advertising and the Wi-Fi communication module performs the output operation of the Wi-Fi beacon.

Next, in operation S608, the mobile device 110 performs a BLE scan and Wi-Fi scan. The mobile device 110 enables the BLE communication module to perform the BLE scan and enables the Wi-Fi communication module to perform the Wi-Fi scan.

The BLE scan is an operation of detecting a BLE communication signal. The mobile device 110 may detect and receive the BLE advertising packet output via the BLE advertising method, during the BLE scan. Because the BLE scan may be performed with standby power, the BLE scan is performable always or periodically on the background. By periodically performing the BLE scan, the mobile device 110 may detect the BLE advertising packet output from the surrounding home appliance 100, without having to perform a first application for controlling the home appliance 100.

The W-Fi scan is an operation of detecting a Wi-Fi signal. The mobile device 110 may detect and receive the Wi-Fi beacon during the Wi-Fi scan. Because the Wi-Fi scan is difficult to be performed with standby power, the mobile device 110 may perform the Wi-Fi scan when there is a request for the W-Fi scan. According to an embodiment of the disclosure, the mobile device 110 detects the BLE advertising packet via the BLE scan, and performs the W-Fi scan when it is determined that there is the home appliance 100 that requires an initial registration operation.

Upon obtaining the BLE advertising packet, the mobile device 110 obtains an SSID from the server 120, based on the SSID-related information included in the BLE advertising packet.

In operation S610, when the Wi-Fi beacon matching the obtained SSID is detected, the mobile device 110 joins the Soft AP of the home appliance 100. In operation S612, a Wi-Fi connection between the mobile device 110 and the home appliance 100 is established when the mobile device 110 joins the Soft AP of the home appliance 100.

When the Wi-Fi connection between the mobile device 110 and the home appliance 100 is established, a D2D initial setting operation between the mobile device 110 and the home appliance 100 is performed in operation S614. The home appliance 100 transmits, via a D2D communication connection, software version information of the home appliance 100. By using the software version information of the home appliance 100, the mobile device 110 defines an initial setting operation of the home appliance 100 and determines a type or version of a protocol to be used during communication with the home appliance 100. Also, based on the software version information of the home appliance 100, the mobile device 110 determines whether user authentication is required and how user authentication information is received, during the initial setting operation with the home appliance 100. Also, during the D2D initial setting operation, the mobile device 110 may obtain cloud address information to be accessed during the initial setting operation of the home appliance 100.

When the D2D initial setting operation is performed, a user authentication operation between the mobile device 110 and the home appliance 100 is performed in operation S616. The mobile device 110 performs the user authentication operation before performing a D2S initial setting operation.

According to an embodiment of the disclosure, the user authentication operation is performed so as to authenticate whether a user of the mobile device 110 is an authentic user of the home appliance 100. The home appliance 100 may provide the user authentication information that is locally obtainable, and the mobile device 110 may perform a user authentication process near the home appliance 100, by obtaining the user authentication information from the home appliance 100. For example, the home appliance 100 outputs a certain authentication sign on a display of the home appliance 100, and the mobile device 110 performs the user authentication process by receiving, from a user, the user authentication information output from the display of the home appliance 100 and transmitting the same to the server 120 or home appliance 100. As another example, the home appliance 100 may include a QR code or barcode printed on or attached to a housing of the home appliance 100, and use the QR code or barcode as the user authentication information. The mobile device 110 photographs (recognizes or scans) the QR code or barcode provided on the home appliance 100, and performs the user authentication by transmitting, to the home appliance 100 or server 120, information related to the QR code or barcode.

The home appliance 100 or server 120 performs user authentication for the mobile device 110 by comparing the user authentication information received from the mobile device 110 with pre-registered user authentication information of the home appliance 100. When the user authentication information received from the mobile device 110 matches the pre-registered user authentication information of the home appliance 100, the home appliance 100 or server 120 determines that the mobile device 110 is owned by an authentic owner and authenticates the user. When the user authentication information received from the mobile device 110 does not match the pre-registered user authentication information of the home appliance 100, the home appliance 100 or server 120 determines that the mobile device 110 is not owned by an authentic owner and does not allow the mobile device 110 from controlling the home appliance 100.

Then, when the user authentication of the mobile device 110 is completed, a D2S initial setting operation is performed between the home appliance 100 and the server 120, in operation S618. The mobile device 110 executes the first application for controlling the home appliance 100 to provide a GUI for the D2S initial setting operation. The mobile device 110 outputs a guide and information related to the D2S initial setting operation, via the first application. The mobile device 110 receives a control signal or information related to the D2S initial setting operation, via the first application. The mobile device 110 registers the home appliance 100 in the server 120, based on the control signal or information input via the first application. The mobile device 110 connects the home appliance 100 to a certain account registered in the server 120. Also, the mobile device 110 establishes communication between the home appliance 100 and the server 120. When a D2S communication connection is established, the home appliance 100 and the server 120 directly communicates with each other via the D2S communication connection. For example, the home appliance 100 transmits, to the server 120, state information (e.g., an operation state, error detection, enabling, or the like). The server 120 outputs the control signal to the home appliance 100 by receiving the control signal for the home appliance 100 from the mobile device 110 or another device.

Figure 7:
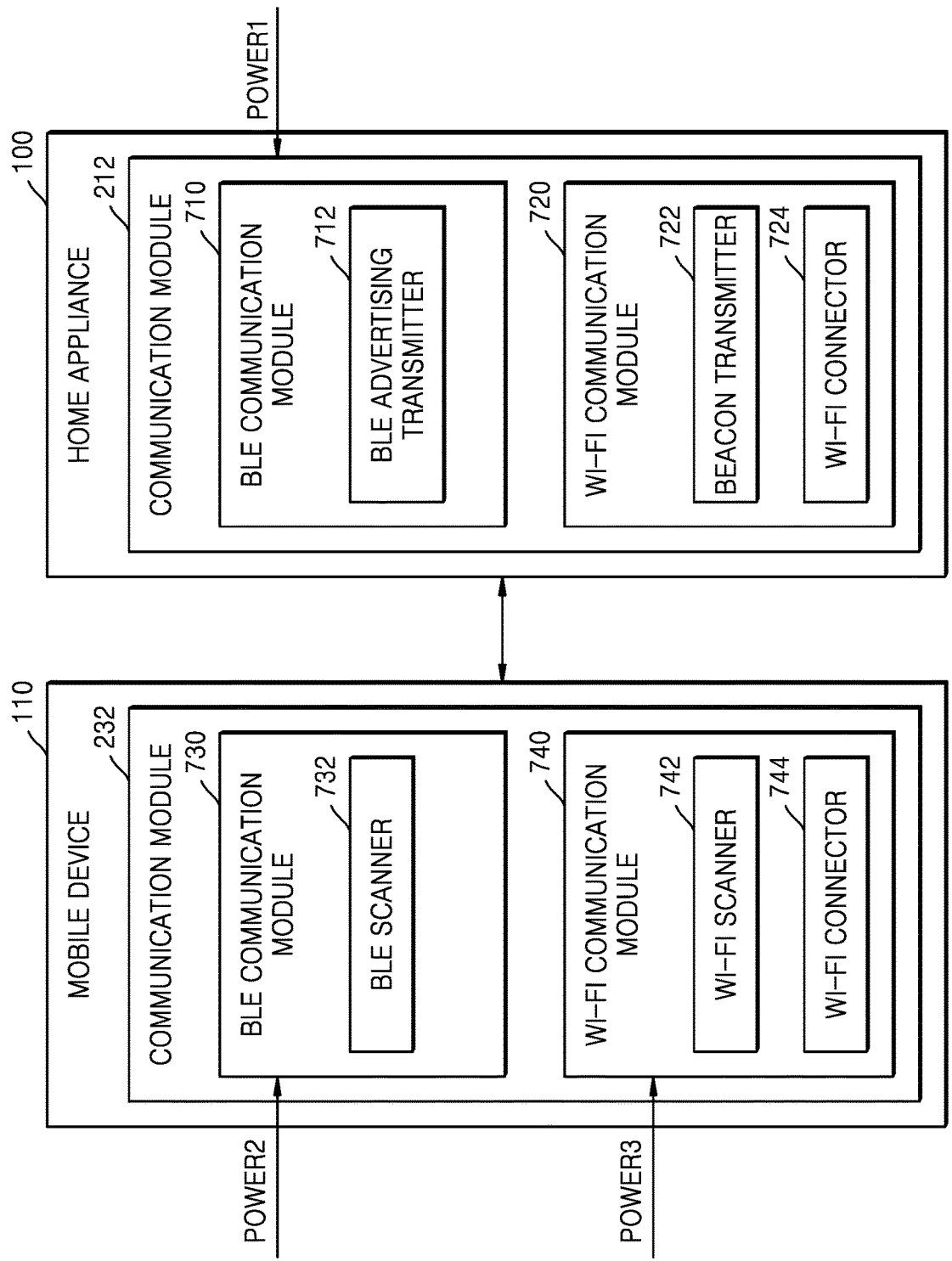
FIG. 7 is a diagram of structures of communication modules of a home appliance and mobile device, according to an embodiment of the disclosure.

FIG. 7 is a diagram of structures of communication modules of a home appliance and mobile device, according to an embodiment of the disclosure.

According to an embodiment of the disclosure, the communication module 212 of the home appliance 100 includes a BLE communication module 710 and a Wi-Fi communication module 720. According to an embodiment of the disclosure, the BLE communication module 710 and the Wi-Fi communication module 720 are configured as a single chipset. When configured as a single chipset, the BLE communication module 710 and the Wi-Fi communication module 720 are connected to a same first power line POWER1. Due to such a structure, the BLE communication module 710 and the Wi-Fi communication module 720 are turned on or off together with turning on or off of the first power line POWER1.

The home appliance 100 includes a certain power supply module (not shown), and supplies power to the first power line POWER1 from the power supply module. The processor 210 controls the power supply module to supply power to the first power line POWER1.

The BLE communication module 710 includes a BLE advertising transmitter 712. The BLE advertising transmitter 712 outputs a BLE advertising packet via a BLE advertising method. The BLE advertising transmitter 712 outputs the BLE advertising packet generated by the processor 210.

The Wi-Fi communication module 720 performs a Wi-Fi communication operation. The Wi-Fi communication module 720 includes a beacon transmitter 722 and a Wi-Fi connector 724. The beacon transmitter 722 generates and outputs a Wi-Fi beacon of a Soft AP. The processor 210 controls operations of generating and outputting the Wi-Fi beacon. The Wi-Fi connector 724 establishes a Wi-Fi communication connection with an external device and performs Wi-Fi communication. The Wi-Fi connector 724 establishes the Wi-Fi communication connection with the mobile device 110 and AP device 130, and performs the Wi-Fi communication.

The communication module 232 of the mobile device 110 includes a BLE communication module 730 and a Wi-Fi communication module 740. The BLE communication module 730 and the Wi-Fi communication module 740 may be connected to different power lines. The BLE communication module 730 may be connected to a second power line POWER2 and the Wi-Fi communication module 740 may be connected to a third power line POWER3. The BLE communication module 730 and the Wi-Fi communication module 740 may be connected to different power lines to be independently turned on or off. In other words, the Wi-Fi communication module 740 may be turned off while the BLE communication module 730 is turned on and performs a BLE scan or BLE communication. Power supplied to the second power line POWER2 may be smaller than power supplied to the third power line POWER3. For example, the power supplied to the second power line POWER2 may be about 3 mA when the BLE communication module 730 is enabled, and may be about 50 nA when the BLE communication module 730 is disabled. The power supplied to the third power line POWER3 may be 300 mA when the Wi-Fi communication module 740 is enabled, and may be 1 mA when the Wi-Fi communication module 740 is disabled.

The processor 230 of the mobile device 110 may control on or off of the BLE communication module 730 and Wi-Fi communication module 740, according to an operation mode. For example, in a standby mode, the processor 230 may periodically turn on or off the BLE communication module 730 or perform the BLE scan always, and turn off the Wi-Fi communication module 740. When there is a Wi-Fi communication request, the processor 230 may apply power to the Wi-Fi communication module 740.

The BLE communication module 730 includes a BLE scanner 732. The BLE scanner 732 performs a BLE scan of detecting a BLE packet. The BLE scanner 732 is operable with standby power. According to an embodiment of the disclosure, the processor 230 may periodically perform the BLE scan in a standby mode.

The BLE scanner 732 performs the BLE scan and detects a BLE advertising packet output from the home appliance 100. The BLE scanner 732 receives the detected BLE advertising packet and transmits the same to the processor 230.

The Wi-Fi communication module 740 includes a Wi-Fi scanner 742 and a Wi-Fi connector 744. The Wi-Fi scanner 742 performs a Wi-Fi scan and detects a Wi-Fi signal. The Wi-Fi scanner 742 detects and receives a Wi-Fi beacon output from the Soft AP of the home appliance 100. The Wi-Fi scanner 742 transmits the received Wi-Fi beacon to the processor 230. The processor 230 may obtain information included in the received Wi-Fi beacon.

The Wi-Fi connector 744 establishes a W-Fi connection with another device and performs Wi-Fi communication. According to an embodiment of the disclosure, the Wi-Fi connector 744 establishes a Wi-Fi communication connection with the Wi-Fi connector 724 of the home appliance 100, based on receiving the Wi-Fi beacon corresponding to an SSID of the home appliance 100.

According to an embodiment of the disclosure, the mobile device 110 establishes the Wi-Fi communication connection with the AP device 130. The mobile device 110 may access a long-range communication network via the AP device 130 while performing Wi-Fi communication with the AP device 130.

In addition to the BLE communication module 730 and the Wi-Fi communication module 740, the communication module 232 of the mobile device 110 may include a mobile communication module, an NFC module, or the like.

Figure 8:
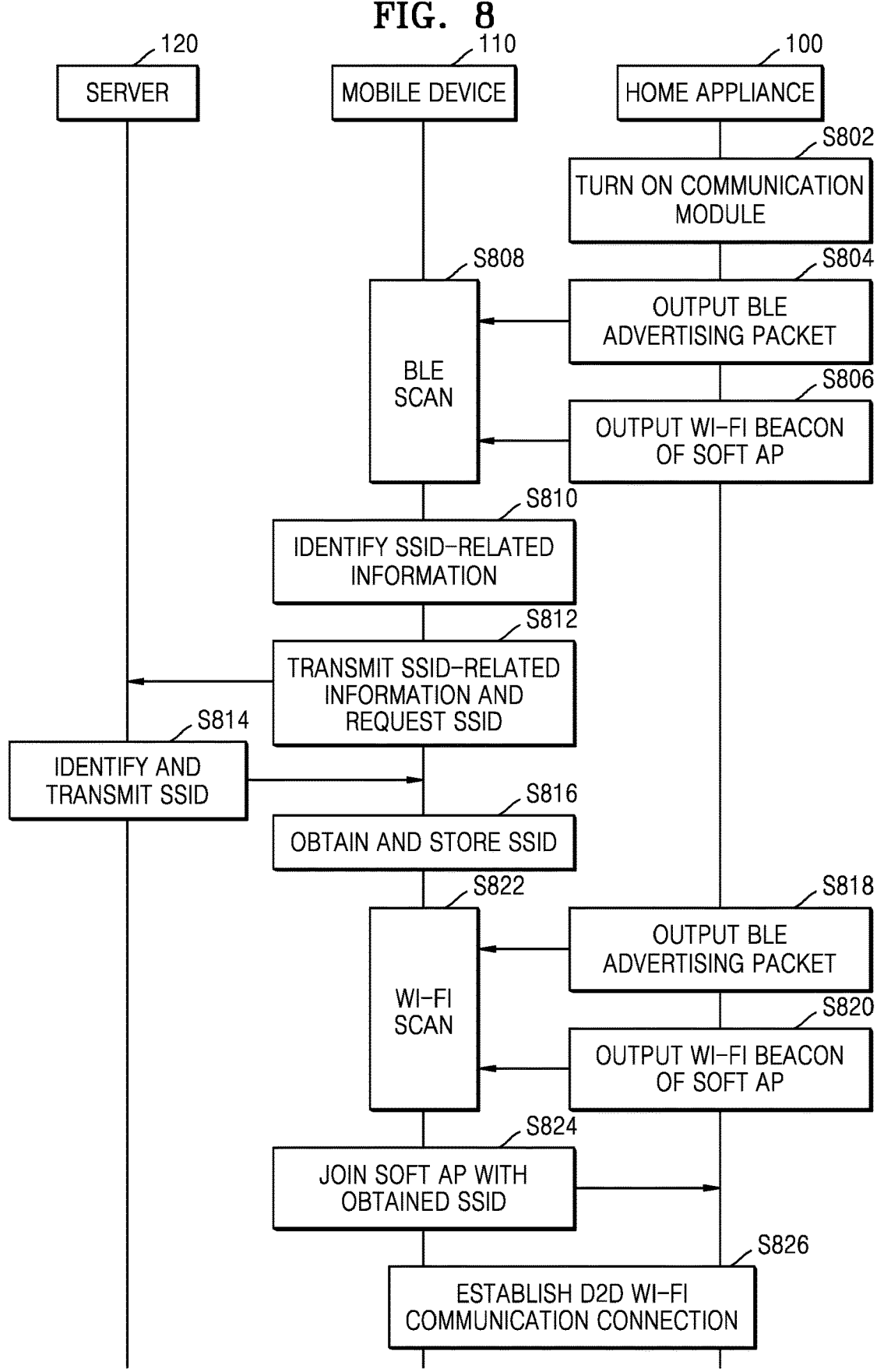
FIG. 8 is a flowchart of operations of a home appliance, mobile device, and server, according to an embodiment of the disclosure.

FIG. 8 is a flowchart of operations of a home appliance, mobile device, and server, according to an embodiment of the disclosure.

FIG. 8 illustrates operations based on the communication module 212 of the home appliance 100 and the communication module 232 of the mobile device 110 shown in FIG. 7. Also, an embodiment of the disclosure of FIG. 8 is a configuration in which the home appliance 100 performs BLE advertising and Wi-Fi beacon output at a same time interval, as in FIG. 6.

In operation S802, the home appliance 100 turns on the communication module 212. By turning on the communication module 212, the home appliance 100 turns on the BLE communication module 710 and the Wi-Fi communication module 720. Also, the home appliance 100 operates the Wi-Fi communication module 720 in a Soft AP mode, and enables a Soft AP.

Next, in operation S804, the home appliance 100 outputs a BLE advertising packet via a BLE advertising method. The BLE advertising packet includes SSID-related information of the Soft AP. Also, in operation S806, the home appliance 100 outputs a Wi-Fi beacon of the Soft AP. The BLE advertising packet and the Wi-Fi beacon may be output during a same time interval. A time interval during which the BLE advertising packet is output and a time interval during which the Wi-Fi beacon is output do not need to be completely same, and according to an embodiment of the disclosure, there may be a difference between the two time intervals. Embodiments of the disclosure are not limited to a case where the time interval during which the BLE advertising packet is output and the time interval during which the Wi-Fi beacon is output completely match each other.

In operation S808, the mobile device 110 performs a BLE scan to detect and receive the BLE advertising packet. In operation S808, Wi-Fi scan may be or may not be performed simultaneously with the BLE scan. Then, in operation S810, the mobile device 110 receives the BLE advertising packet and obtains SSID-related information in the BLE advertising packet. The SSID-related information includes, for example, a manufacturer ID and an initial setting ID.

Then, in operation S812, the mobile device 110 generates an SSID request including the SSID-related information and transmits the SSID request to the server 120. The SSID request includes the SSID-related information and information indicating that an SSID is requested. According to an embodiment of the disclosure, the mobile device 110 obtains an address of the server 120 from the BLE advertising packet. According to another embodiment of the disclosure, the mobile device 110 obtains the address of the server 120 from a first application.

Then, in operation S814, the server 120 searches for or identifies the SSID, in response to receiving the SSID request. Also, the server 120 transmits, to the mobile device 110 found or identified SSID information.

Then, in operation S816, the mobile device 110 receives the SSID transmitted from the server 120, and stores the same. The mobile device 110 stores the obtained SSID in the memory 234.

Figure 9:
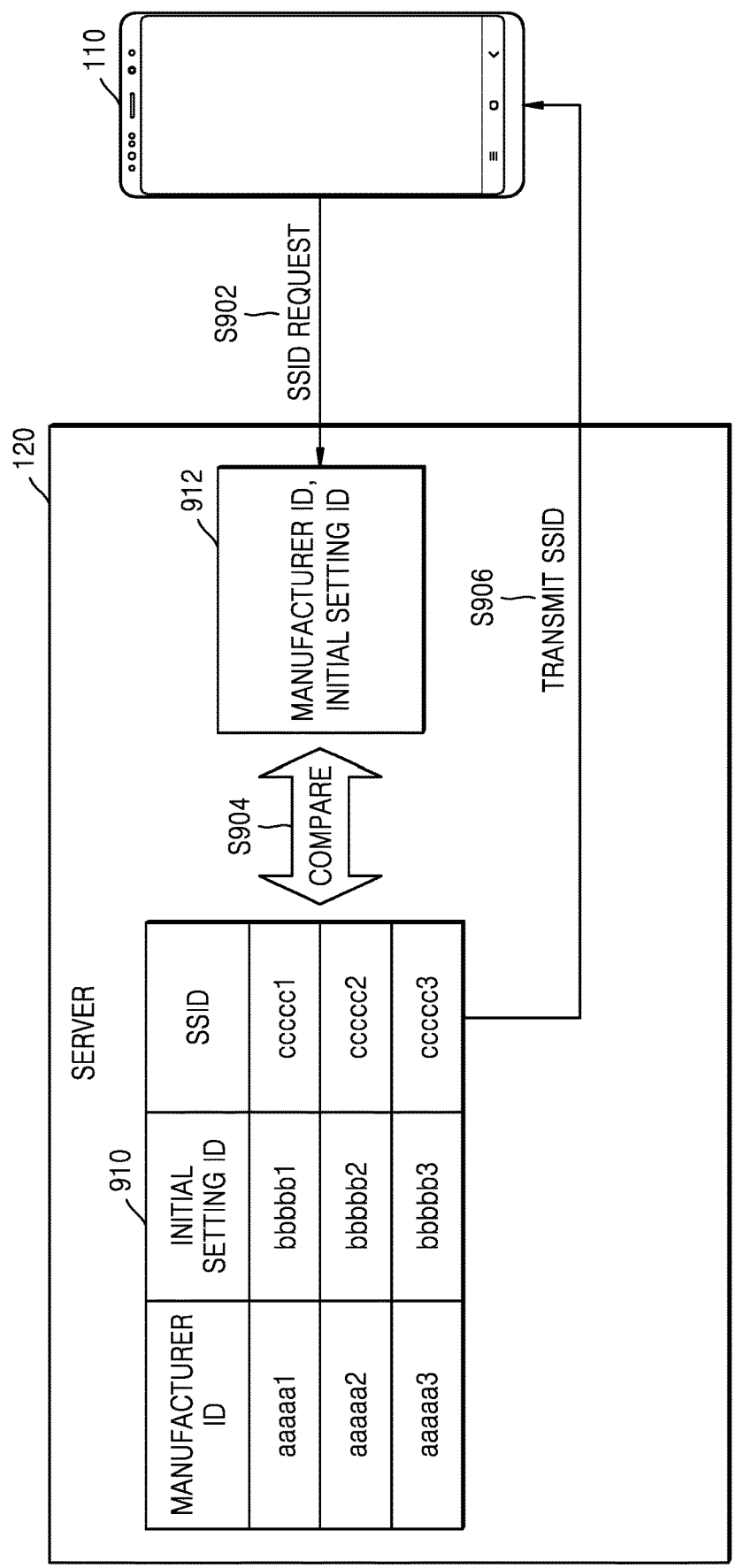
FIG. 9 is a diagram for describing a process, performed by a server, of identifying a service set identifier (SSID), according to an embodiment of the disclosure.

Referring to FIG. 9, operations S814 and S816 will be described in detail.

FIG. 9 is a diagram for describing a process, performed by a server, of identifying an SSID, according to an embodiment of the disclosure.

Upon receiving the BLE advertising packet, the mobile device 110 identifies the SSID-related information stored in the BLE advertising packet. The mobile device 110 generates the SSID request including the SSID-related information. The mobile device 110 transmits the SSID request to the server 120 (operation S902).

The server 120 stores, in a certain memory or database, an SSID lookup table 910 in which the SSID-related information and SSID are stored. The SSID lookup table 910 may be stored in the server 120 before the home appliance 100 is released. The SSID lookup table 910 shows a matching relationship between the SSID-related information and the SSID. The SSID lookup table 910 includes SSID information corresponding to each piece of SSID-related information. For example, the SSID-related information includes a manufacturer ID and initial setting ID, and the SSID lookup table 910 includes the SSID information corresponding to each combination of the manufacturer ID and initial setting ID.

The server 120 compares SSID-related information 912 included in the SSID request with the SSID lookup table 910 to search for and identify SSID information matching the received SSID-related information 912 (operation S904). A processor included in the server 120 searches for the SSID information matching the received SSID-related information, via a certain comparison operation. For example, the processor of the server 120 searches the SSID lookup table 910 for the SSID information matching the combination of manufacturer ID and initial setting ID included in the SSID-related information 912.

When the SSID matching the SSID-related information 912 is found, the server 120 transmits the found SSID to the mobile device 110 (operation S906). The SSID request may include an account, access address information, or the like of the mobile device 110. The server 120 transmits the SSID to the mobile device 110, based on an access address for the mobile device 110 included in the SSID request.

The mobile device 110 obtains the SSID by receiving the SSID information transmitted from the server 120. The mobile device 110 stores the obtained SSID in the memory 234.

Referring back to FIG. 8, operations after the mobile device 110 obtained the SSID in operation S816 are described.

Next, in operation S822, the mobile device 110 performs a W-Fi scan. The mobile device 110 may or may not perform a BLE scan while performing the Wi-Fi scan. Until a D2D Wi-Fi communication connection is established, the home appliance 100 repeats an operation (operation S818) of outputting the BLE advertising packet and an operation (operation S820) of outputting the Wi-Fi beacon of the Soft AP. The mobile device 110 detects the Wi-Fi beacon of the Soft AP by performing the Wi-Fi scan. The mobile device 110 identifies that the previously obtained SSID matches an SSID of the Wi-Fi beacon of the Soft AP.

In operation S824, the mobile device 110 joins the Soft AP when the Wi-Fi beacon of the Soft AP having the same SSID as the stored SSID is detected. Then, in operation S826, the D2D Wi-Fi communication connection is established between the mobile device 110 and the Soft AP of the home appliance 100. When the D2D Wi-Fi communication connection is established, the mobile device 110 and the home appliance 100 performs inter-device direct communication via the D2D Wi-Fi communication connection.

Figure 10:
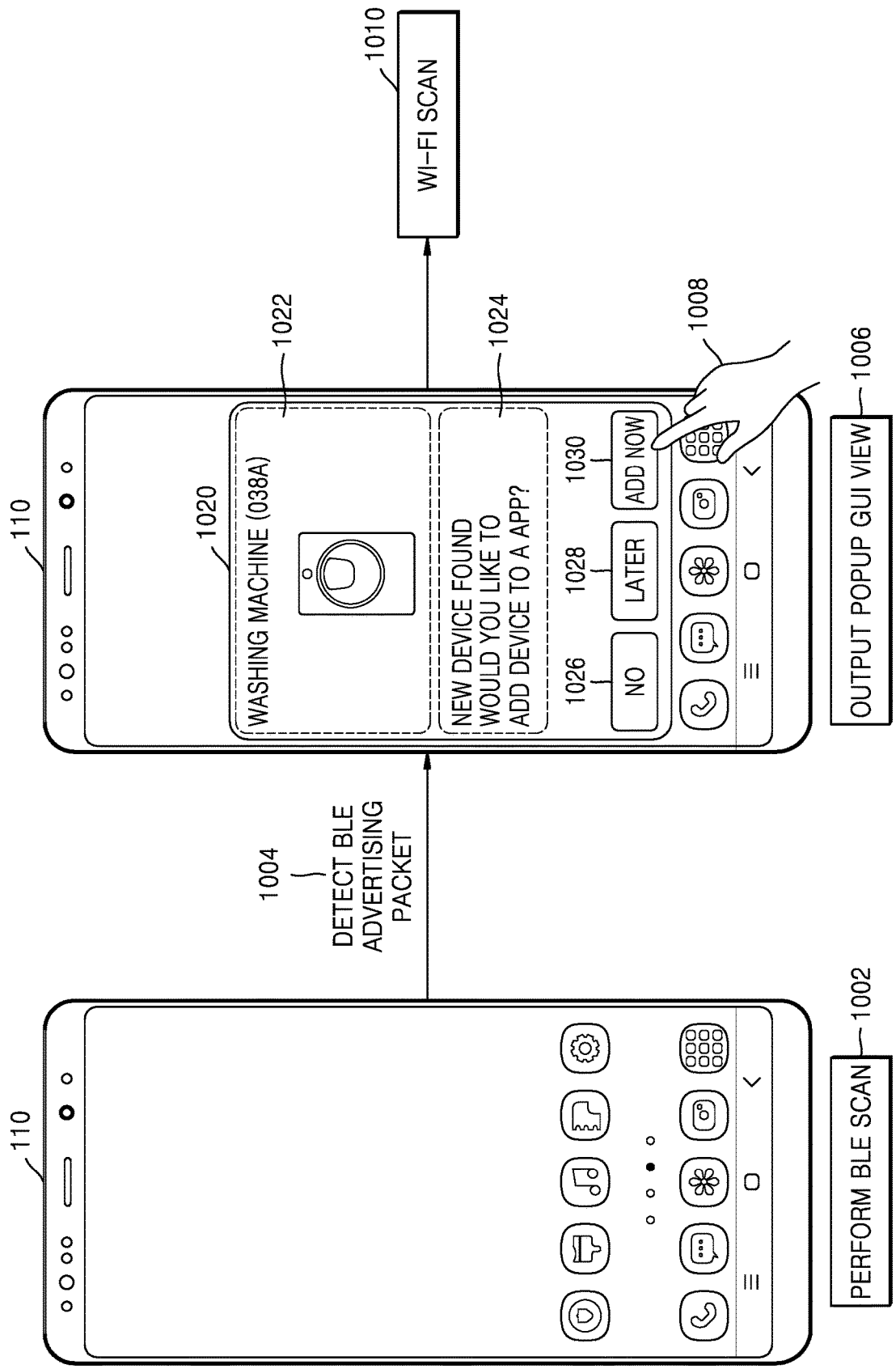
FIG. 10 is a diagram showing a configuration in which a mobile device provides a popup graphic user interface (GUI) view, according to an embodiment of the disclosure.

FIG. 10 is a diagram showing a configuration in which a mobile device provides a popup GUI view, according to an embodiment of the disclosure.

According to an embodiment of the disclosure, the mobile device 110 performs a BLE scan in a home screen state or in a state in which a certain application is being executed (operation 1002). The mobile device 110 may detect a BLE advertising packet transmitted from the home appliance 100 by performing the BLE scan, even in a state in which a first application controlling the home appliance 100 is not performed.

Upon detecting the BLE advertising packet (operation 1004), the mobile device 110 identifies information about the home appliance 100 included in the BLE advertising packet. According to an embodiment of the disclosure, the BLE advertising packet may include at least one of a device type (e.g., a washing machine, an air conditioner, a refrigerator, or the like) of the home appliance 100, a model name of the home appliance 100, or product owned state information. Upon detecting the home appliance 100 in a new product state, based on the BLE advertising packet, the mobile device 110 outputs a popup GUI view 1020 on a current screen (operation 1006). The popup GUI view 1020 is displayed on a part or all of a current GUI view. The mobile device 110 displays the popup GUI view 1020 on the GUI view currently displayed. The mobile device 110 may overlay the popup GUI view 1020 on the GUI view currently displayed.

The popup GUI view 1020 may include information 1022 about the home appliance 100, a message 1024 indicating that the home appliance 100 in the new product state has been detected, and UI elements 1026, 1028, and 1030 for receiving a user selection. The information 1022 about the home appliance 100 may include a type, model name, product image, and the like of the home appliance 100. The message 1024 indicating that the home appliance 100 in the new product state has been detected may include information, a guide, or a query regarding a following operation.

The UI elements 1026, 1028, and 1030 for receiving a user selection include elements corresponding to options regarding the following operation of the mobile device 110. For example, the UI elements 1026, 1028, and 1030 includes a "no" button 1026, a "later" button 1028, or an "add now" button 1030. The mobile device 110 performs a Wi-Fi scan (operation 1010), in response to a user selecting the "add now" button 1030 (operation 1008). When the user selects the "no" button 1026, the mobile device 110 does not additionally perform the Wi-Fi scan and ends a process regarding the BLE advertising packet. When the user selects the "later" button 1028, the mobile device 110 stores the BLE advertising packet and may perform an initial registration procedure of the home appliance 100 when the user executes the first application later.

Figure 11:
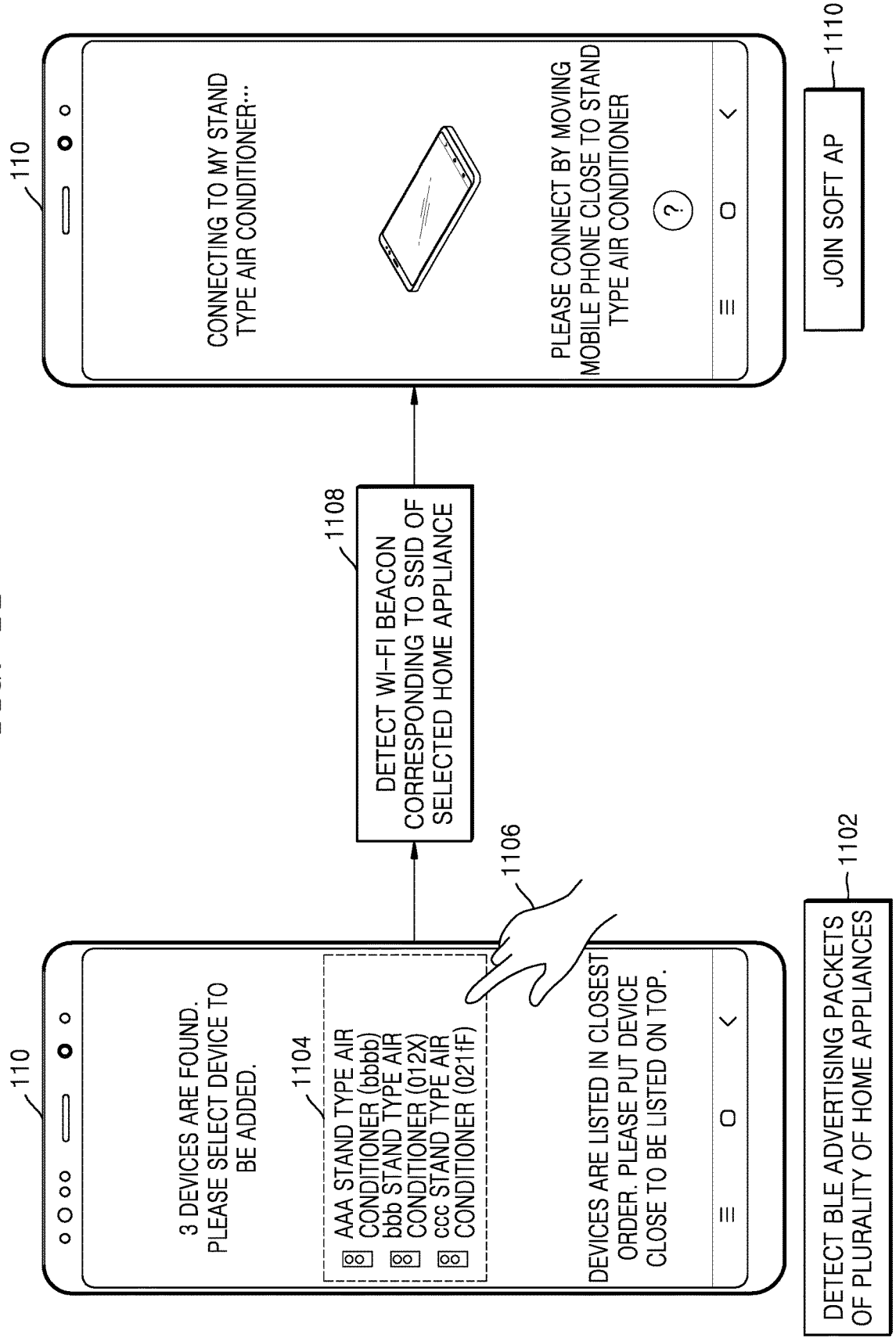
FIG. 11 is a diagram showing a process, performed by a mobile device, of detecting a home appliance and establishing a Wi-Fi connection, according to an embodiment of the disclosure.

FIG. 11 is a diagram showing a process, performed by a mobile device, of detecting a home appliance and establishing a Wi-Fi connection, according to an embodiment of the disclosure.

According to an embodiment of the disclosure, the mobile device 110 may detect BLE advertising packets output from the plurality of home appliances 100 (operation 1102). When there are the plurality of home appliances 100 outputting the BLE advertising packets nearby, the mobile device 110 detects the plurality of home appliances 100 via a BLE scan.

Upon detecting the plurality of home appliances 100, the mobile device 110 outputs a home appliance list 1104 including information about the detected plurality of home appliances 100. The mobile device 110 obtains information about the home appliance 100 from each of the detected BLE advertising packets. The mobile device 110 may obtain, from the BLE advertising packet, information about a name, identifier, device type, model name, or the like of the home appliance 100. The home appliance list 1104 includes information about each of the plurality of home appliances 100.

The mobile device 110 receives a user input of selecting one among the home appliance list 1104 (operation 1106). The mobile device 110 obtains an SSID of the home appliance 100 selected by the user input. The mobile device 110 generates an SSID request including SSID-related information included in the BLE advertising packet corresponding to the home appliance 100 selected by a user. The mobile device 110 transmits the SSID request to the server 120 to obtain the SSID corresponding to the home appliance 100 selected by the user.

Upon obtaining the SSID, the mobile device 110 performs a Wi-Fi scan. While performing the Wi-Fi scan, the mobile device 110 detects a Wi-Fi beacon corresponding to the SSID obtained from the server 120 (operation 1108). The adjacent plurality of home appliances 100 may output Wi-Fi beacons of different SSIDs. Among the Wi-Fi beacons detected via the Wi-Fi scan, the mobile device 110 searches for a Wi-Fi beacon having an SSID corresponding to the SSID selected by the user.

Upon detecting the Wi-Fi beacon corresponding to the SSID of the home appliance 100 selected by the user, the mobile device 110 joins a Soft AP having the corresponding SSID (operation 1110). By joining the Soft AP of the home appliance 100 selected by the user, the mobile device 110 establishes a Wi-Fi communication connection with the home appliance 100 selected by the user.

Figure 12:
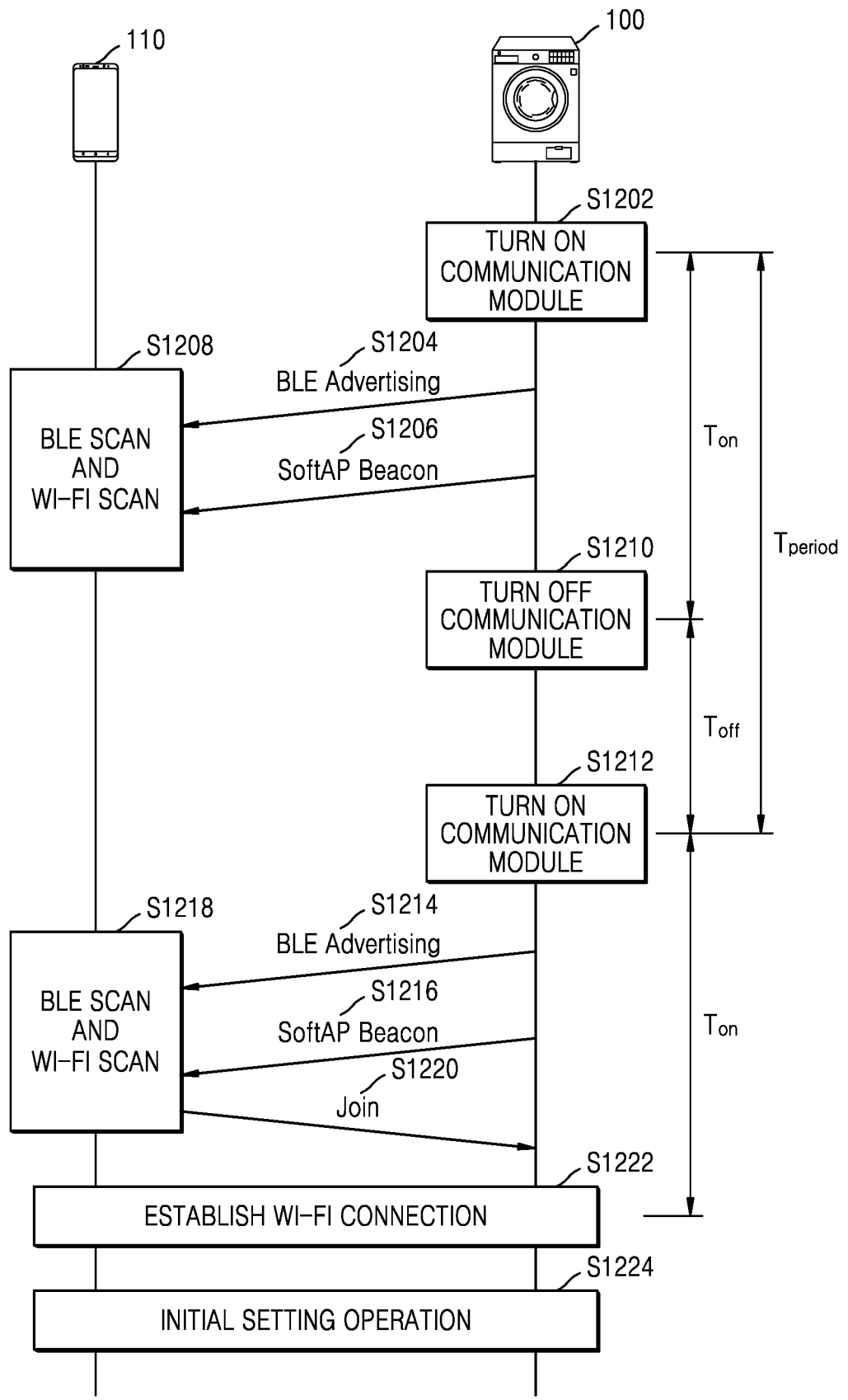
FIG. 12 is a diagram showing a process of establishing communication between a mobile device and a home appliance and performing an initial setting operation, according to an embodiment of the disclosure.

FIG. 12 is a diagram showing a process of establishing communication between a mobile device and a home appliance and performing an initial setting operation, according to an embodiment of the disclosure.

According to an embodiment of the disclosure, the home appliance 100 may periodically and repeatedly turn on or off the communication module 212 while performing a Wi-Fi beacon output operation and BLE advertising for an initial registration operation. A control method of periodically turning on or off the communication module 212 may be referred to as duty cycling.

In the home appliance 100, when the BLE communication module 710 and the Wi-Fi communication module 720 are implemented as a single chipset and turned on or off together, power consumption may increase due to performing of BLE advertising and Wi-Fi beacon output together to as to perform an initial registration operation of the home appliance 100. To perform the initial registration operation, a user of the mobile device 110 needs to perform a certain control in response to the initial registration operation of the home appliance 100. However, the initial registration operation may not be performed quickly, but may be delayed due to various reasons. For example, the user may not manipulate a first application in response to the BLE advertising and Wi-Fi beacon output of the home appliance 100, or the initial registration operation may not be performed because there is no mobile device 110 nearby. In this case, the home appliance 100 repeatedly performs BLE advertising and Wi-Fi beacon output operations until the initial registration operation is performed. However, when the BLE advertising and Wi-Fi beacon output operations are continuously performed, the power consumption of the home appliance 100 increases. In particular, the Wi-Fi communication module 720 consumes considerable power and is unable to be driven with standby power.

According to an embodiment of the disclosure, the home appliance 100 resolves continuous consumption of high power for the initial registration operation, by periodically turning on or off the communication module 212 while performing the BLE advertising and Wi-Fi beacon output operation for the initial registration operation.

According to an embodiment of the disclosure, the duty cycling may be performed in a first time period $T_{period}$ including a first time interval and a second time interval. The home appliance 100 may apply power to the communication module 212 during the first time interval $T_{on}$ and not apply power to the communication module 212 during the second time interval $T_{off}$.

Referring to FIG. 12, a process of applying the duty cycling to the communication module 212 by the home appliance 100 will be described.

First, in operation S1202, the home appliance 100 turns on the communication module 212 by applying power to the communication module 212, so as to establish a D2D Wi-Fi communication connection for the initial registration operation. When the communication module 212 is turned on, power is applied to both the BLE communication module 710 and the Wi-Fi communication module 720. The home appliance 100 executes a Soft AP function such that the Wi-Fi communication module 720 operates as a virtual AP. The Wi-Fi communication module 720 operates in a Soft AP mode.

Then, in operation S1204, the home appliance 100 performs BLE advertising. The home appliance 100 generates a BLE advertising packet and outputs the BLE advertising packet via a BLE advertising method. The BLE advertising packet includes SSID-related information of a Soft AP.

Also, in operation S1206, the home appliance 100 outputs a Wi-Fi beacon of the Soft AP. The home appliance 100 outputs a Wi-Fi beacon from the Soft AP to transmit information about the Soft AP to a peripheral device.

Operations S1204 and S1206 are not performed in a specific order, and are performed in parallel during a same time interval. In other words, during the same time interval, the BLE communication module 710 performs the BLE advertising and the Wi-Fi communication module 720 performs the Wi-Fi beacon output operation.

Next, in operation S1208, the mobile device 110 performs a BLE scan and Wi-Fi scan. The mobile device 110 enables the BLE communication module 730 to perform the BLE scan and enables the Wi-Fi communication module 740 to perform the Wi-Fi scan.

Because the BLE scan may be performed with standby power, the BLE scan is performable always or periodically on the background. By periodically performing the BLE scan, the mobile device 110 may detect the BLE advertising packet output from the surrounding home appliance 100, without having to perform a first application for controlling the home appliance 100.

Because the Wi-Fi scan is difficult to be performed with standby power, the mobile device 110 may perform the Wi-Fi scan when there is a request for the W-Fi scan. According to an embodiment of the disclosure, the mobile device 110 detects the BLE advertising packet via the BLE scan, and performs the W-Fi scan when it is determined that there is the home appliance 100 that requires the initial registration operation.

The home appliance 100 performs the BLE advertising (operation S1204) and the Wi-Fi beacon output operation (operation S1206) during the first time interval $T_{on}$. The home appliance 100 applies power to the communication module 212 during the first time interval $T_{on}$ and maintains the communication module 212 in a turn-on state. Also, the home appliance 100 enables the Soft AP during the first time interval $T_{on}$.

When an operation of establishing the D2D Wi-Fi communication connection is not performed within the first time interval $T_{on}$, the home appliance 100 turns off the communication module 212 during the second time interval $T_{off}$, in operation S1210. The home appliance 100 may turn off the communication module 212 by blocking power supplied to the communication module 212.

When the communication module 212 is turned off and the second time interval $T_{off}$ elapses, the home appliance 100 supplies power to the communication module 212 in operation S1212 to turn on the communication module 212. When the communication module 212 is turned on, the Soft AP may be enabled.

The home appliance 100 repeats the duty cycling of turning on the communication module 212 during the first time interval $T_{on}$ and turning off the communication module 212 during the second time interval $T_{off}$, until an operation of establishing a D2D Wi-Fi communication channel is detected.

When an operation (operation S1220) of joining the Soft AP from the mobile device 110 is detected while the home appliance 100 is performing the BLE advertising (operation S1214) and the Wi-Fi beacon output operation (operation S1216) and maintaining the turn-on state of the communication module 212 during the first time interval $T_{on}$, the home appliance 100 determines that a D2D Wi-Fi communication establishment operation has been initiated. The mobile device 110 may initiate the D2D Wi-Fi communication establishment operation by performing the BLE scan and Wi-Fi scan (operation S1218), obtaining an SSID of the home appliance 100, and joining the Soft AP of the home appliance 100.

When the D2D Wi-Fi communication establishment operation is initiated during the first time interval $T_{on}$, the home appliance 100 stops the duty cycling and maintains the turn-on state of the communication module 212. In operation S1222, the home appliance 100 performs a Wi-Fi connection establishment operation while maintaining the turn-on state of the communication module 212. Also, in operation S1224, the home appliance 100 performs a D2D initial setting operation and a D2S initial setting operation while maintaining the turn-on state of the communication module 212.

Figure 13:
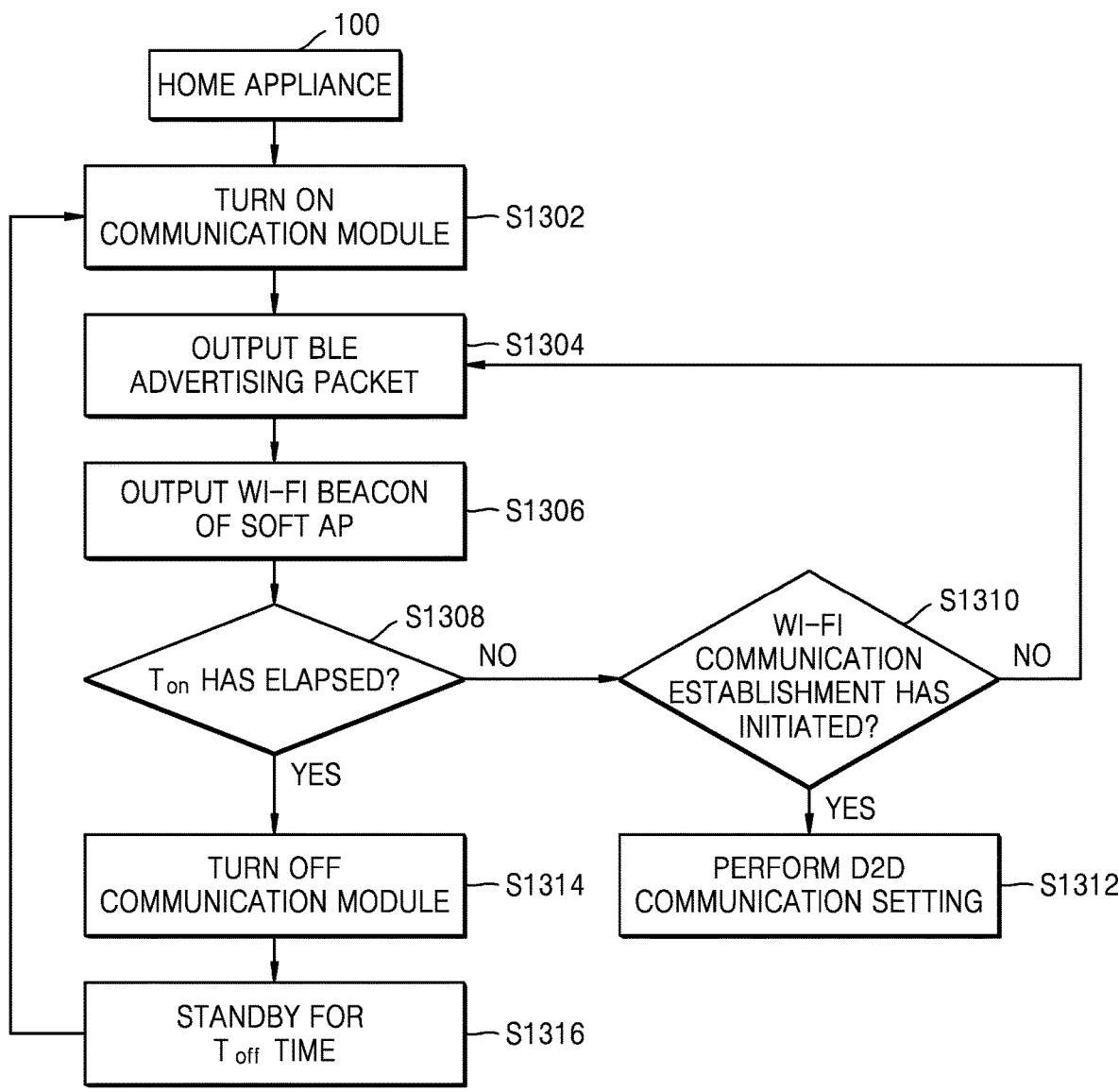
FIG. 13 is a diagram showing a process, performed by a home appliance, of performing a duty cycle operation, according to an embodiment of the disclosure.

FIG. 13 is a diagram showing a process, performed by a home appliance, of performing a duty cycle operation, according to an embodiment of the disclosure.

In operation S1302, the home appliance 100 turns on the communication module 212. The home appliance 100 enables a Soft AP while turning on the communication module 212.

Then, the home appliance 100 outputs a BLE advertising packet in operation S1304 and outputs a Wi-Fi beacon of the Soft AP in operation S1306. Operation S1304 and operation S1306 are not necessarily performed sequentially, and may be performed together for a first time interval $T_{on}$. The home appliance 100 determines whether the first time interval $T_{on}$ has elapsed (operation S1308) while performing BLE advertising and Wi-Fi beacon output during the first time interval $T_{on}$. According to an embodiment of the disclosure, the home appliance 100 may determine whether the first time interval $T_{on}$ has elapsed from a time point when the communication module 212 is turned on, by referring to time information of the home appliance 100.

When the first time interval $T_{on}$ has not elapsed, the home appliance 100 determines whether a Wi-Fi communication establishment operation has initiated in operation S1310. The home appliance 100 determines that the Wi-Fi communication establishment operation has initiated when an operation of joining the Soft AP of the home appliance 100 is performed by the mobile device 110.

When it is determined that the Wi-Fi communication establishment operation has not initiated in operation S1310, the home appliance 100 repeats operations of outputting the BLE advertising packet and outputting the Wi-Fi beacon of the Soft AP.

When it is determined that the Wi-Fi communication establishment operation has initiated in operation S1310, the home appliance 100 continuously performs the Wi-Fi communication establishment operation in operation S1312.

When it is determined that the first time interval $T_{on}$ has elapsed from the time point when the communication module 212 is turned on, in operation S1308, the home appliance 100 turns off the communication module 212 in operation S1314. By turning off the communication module 212, the home appliance 100 stops the BLE advertising and Wi-Fi beacon output operation.

In operation S1316, the home appliance 100 standby for a second time interval $T_{off}$ from a time point when the communication module 212 is turned off. When the second time interval $T_{off}$ has elapsed from the time point when the communication module 212 is turned off, the home appliance 100 turns on the communication module 212 again in operation S1302. The home appliance 100 repeats operations of turning on the communication module 212 during the first time interval $T_{on}$ and turning off the communication module 212 during the second time interval $T_{off}$, until the Wi-Fi communication establishment operation is initiated.

Figure 14:
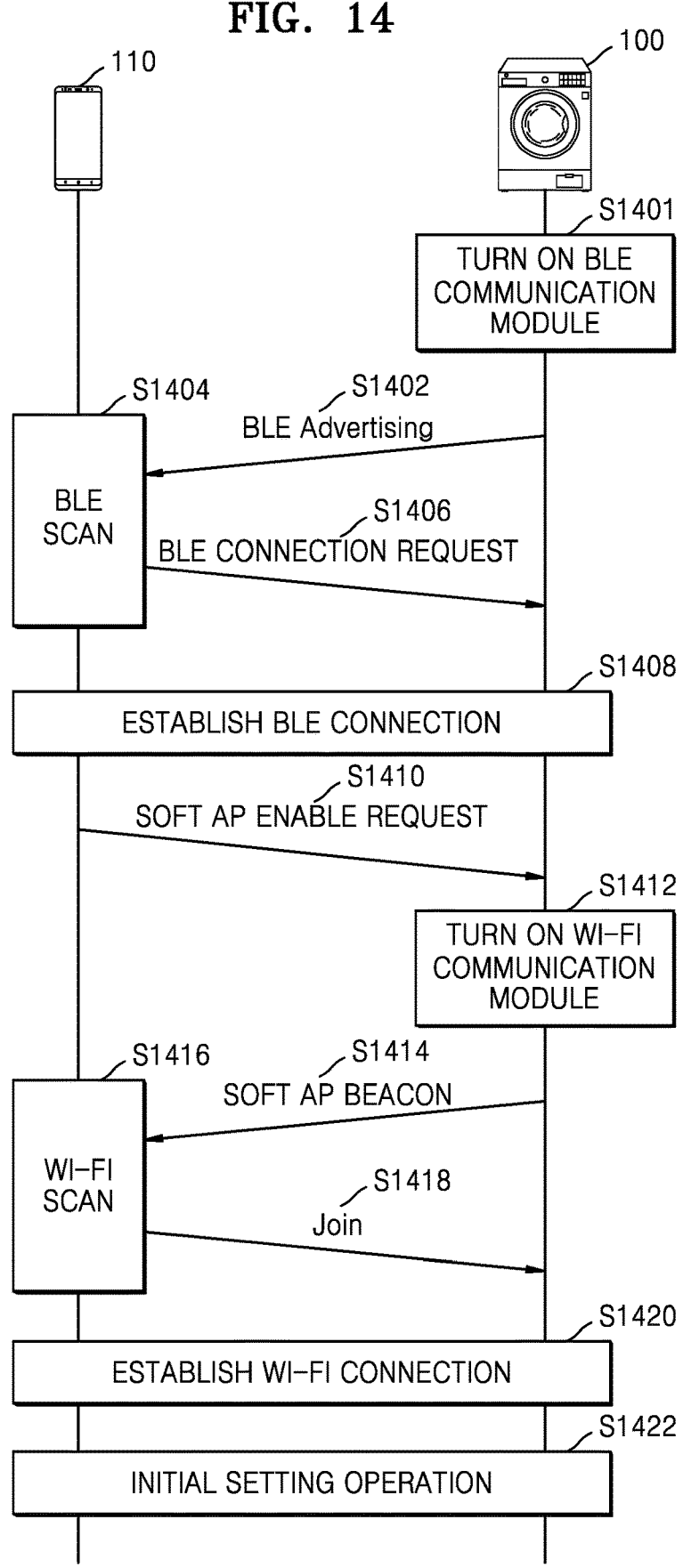
FIG. 14 is a diagram showing a process of establishing communication between a mobile device and a home appliance and performing an initial setting operation, according to an embodiment of the disclosure.

FIG. 14 is a diagram showing a process of establishing communication between a mobile device and a home appliance and performing an initial setting operation, according to an embodiment of the disclosure.

According to an embodiment of the disclosure, the home appliance 100 includes the BLE communication module 710 and the Wi-Fi communication module 720, which may be independently turned on or off. The home appliance 100 may independently turn on or off the BLE communication module 710 and the Wi-Fi communication module 720, by individually applying power to the BLE communication module 710 and the Wi-Fi communication module 720. Also, according to an embodiment of the disclosure, the home appliance 100 may establish a BLE connection with the mobile device 110, and the mobile device 110 may request the home appliance 100 to turn on a Soft AP via the BLE connection. According to a request of the mobile device 110, the home appliance 100 may turn on the Wi-Fi communication module 720 and enable the Soft AP. According to an embodiment of the disclosure, the home appliance 100 may reduce power consumption by turning on the Wi-Fi communication module 720 and performing Wi-Fi communication, when the Wi-Fi communication module 720 is required.

Operations according to an embodiment of the disclosure will be described with reference to FIG. 14.

First, in operation S1401, the home appliance 100 turns on the BLE communication module 710. When the BLE communication module 710 is turned on, power is applied to the BLE communication module 710. The BLE communication module 710 is also operable in a standby power state. The home appliance 100 may always maintain the BLE communication module 710 in a turn-on state.

Then, in operation S1402, the home appliance 100 performs BLE advertising. The home appliance 100 generates a BLE advertising packet and outputs the BLE advertising packet via a BLE advertising method. The BLE advertising packet includes SSID-related information of the Soft AP.

Next, in operation S1404, the mobile device 110 performs a BLE scan. The mobile device 110 performs the BLE scan by enabling the BLE communication module 730.

The mobile device 110 may detect and receive the BLE advertising packet output via the BLE advertising method, during the BLE scan. Because the BLE scan may be performed with standby power, the BLE scan is performable always or periodically on the background. By periodically performing the BLE scan, the mobile device 110 may detect the BLE advertising packet output from the surrounding home appliance 100, without having to perform a first application for controlling the home appliance 100.

Upon obtaining the BLE advertising packet, the mobile device 110 obtains an SSID from the server 120, based on the SSID-related information included in the BLE advertising packet.

Then, in operation S1406, the mobile device 110 transmits a BLE connection request to the home appliance 100, based on the BLE advertising packet. The mobile device 110 transmits the BLE connection request to the home appliance 100 to request establishment of a BLE communication connection.

Then, in operation S1408, the BLE communication connection is established between the mobile device 110 and the home appliance 100. The BLE communication module 730 of the mobile device 110 and the BLE communication module 710 of the home appliance 100 may establish a BLE communication channel.

Then, in operation S1410, the mobile device 110 transmits a Soft AP enable request to the home appliance 100, via the BLE communication channel. The Soft AP enable request is a request for enabling the Soft AP of the home appliance 100.

Next, in operation S1412, the home appliance 100 turns on the Wi-Fi communication module 720 in response to the Soft AP enable request received from the mobile device 110 via the BLE communication channel. The home appliance 100 turns on the Wi-Fi communication module 720 by applying power to the Wi-Fi communication module 720. Also, the home appliance 100 enables the Soft AP.

Then, in operation S1414, the home appliance 100 outputs a Wi-Fi beacon of the Soft AP. The home appliance 100 outputs the Wi-Fi beacon from the Soft AP to transmit information about the Soft AP to a peripheral device.

Next, in operation S1416, the mobile device 110 performs a W-Fi scan. The mobile device 110 performs the Wi-Fi scan by using the Wi-Fi communication module 740. The mobile device 110 may detect and receive the Wi-Fi beacon during the Wi-Fi scan. Because the Wi-Fi scan is difficult to be performed with standby power, the mobile device 110 may perform the Wi-Fi scan when there is a request for the W-Fi scan. According to an embodiment of the disclosure, the mobile device 110 detects the BLE advertising packet via the BLE scan, and performs the W-Fi scan when it is determined that there is the home appliance 100 that requires an initial registration operation. According to another embodiment of the disclosure, the mobile device 110 may transmit the Soft AP enable request and perform the Wi-Fi scan.

Then, in operation S1418, when the Wi-Fi beacon matching the obtained SSID is detected, the mobile device 110 joins the Soft AP of the home appliance 100. In operation S1420, a Wi-Fi connection between the mobile device 110 and the home appliance 100 is established when the mobile device 110 joins the Soft AP of the home appliance 100.

In operation S1420, the home appliance 100 performs a Wi-Fi connection establishment operation while maintaining a turn-on state of the Wi-Fi communication module 720. Also, in operation S1422, the home appliance 100 performs a D2D initial setting operation and a D2S initial setting operation while maintaining the turn-on state of the Wi-Fi communication module 720.

Figure 15:
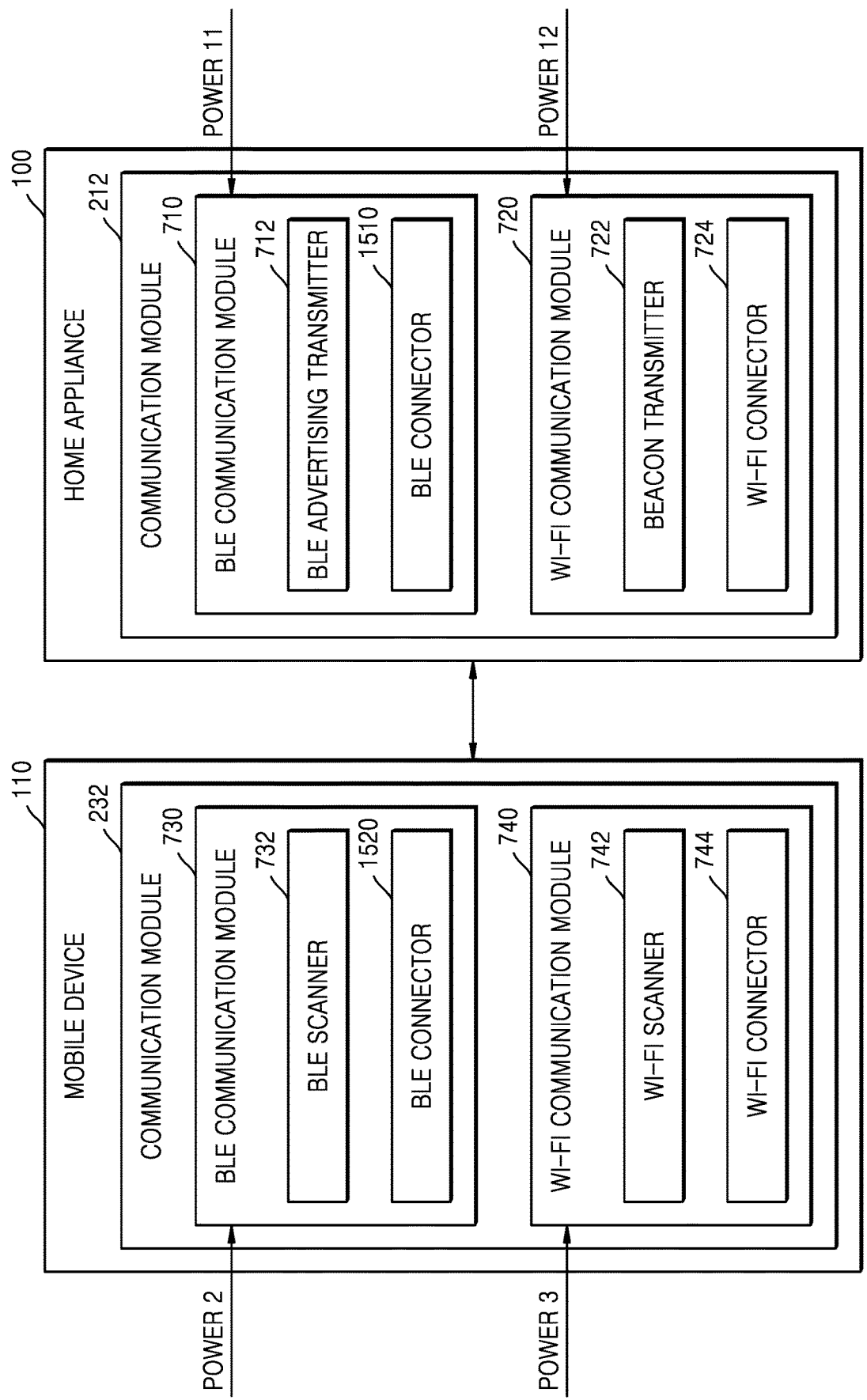
FIG. 15 is a diagram of structures of communication modules of a home appliance and mobile device, according to an embodiment of the disclosure.

FIG. 15 is a diagram of structures of communication modules of a home appliance and mobile device, according to an embodiment of the disclosure.

According to an embodiment of the disclosure, the communication module 212 of the home appliance 100 includes a BLE communication module 710 and a Wi-Fi communication module 720. According to an embodiment of the disclosure, the BLE communication module 710 and the Wi-Fi communication module 720 are configured as individual chipsets. When configured as individual chipsets, the BLE communication module 710 and the Wi-Fi communication module 720 are connected to different power lines. The BLE communication module 710 may be connected to an 11th power line POWER11 and the Wi-Fi communication module 720 may be connected to a 12th power line POWER12. The BLE communication module 710 is turned on when power is applied to the 11th power line POWER11, and maintains a turn-on state while power is applied to the 11th power line POWER11. The Wi-Fi communication module 720 is turned on when power is applied to the 12th power line POWER12, and maintains a turn-on state while power is applied to the 12th power line POWER12.

The 11th power line POWER11 and the 12th power line POWER12 are power lines that are independently controllable. The 11th power line POWER11 applies a voltage and current corresponding to rated power of the BLE communication module 710. The 12th power line POWER12 applies a voltage and current corresponding to rated power of the Wi-Fi communication module 720. Power supplied to the 11th power line POWER11 may be smaller than power supplied to the 12th power line POWER12. The processor 210 may control an operation of applying power to the 11th power line POWER11 and an operation of applying power to the 12th power line POWER12.

The home appliance 100 includes a certain power supply module (not shown), and supplies power to the 11th power line POWER11 and the 12th power line POWER12 from the power supply module. The processor 210 controls the power supply module to supply power to the 11th power line POWER11 and 12th power line POWER12.

The BLE communication module 710 includes the BLE advertising transmitter 712 and a BLE connector 1510.

The BLE advertising transmitter 712 outputs a BLE advertising packet via a BLE advertising method. The BLE advertising transmitter 712 outputs the BLE advertising packet generated by the processor 210.

The BLE connector 1510 establishes a BLE communication connection with another device. According to an embodiment of the disclosure, the BLE connector 1510 establishes the BLE communication connection with the mobile device 110. The BLE connector 1510 may establish the BLE communication connection, in response to a BLE connection request received from the mobile device 110. The BLE connector 1510 may set and establish a BLE communication channel with the mobile device 110.

The Wi-Fi communication module 720 performs a Wi-Fi communication operation. The Wi-Fi communication module 720 includes the beacon transmitter 722 and the Wi-Fi connector 724. The beacon transmitter 722 generates and outputs a Wi-Fi beacon of a Soft AP. The processor 210 controls operations of generating and outputting the Wi-Fi beacon. The Wi-Fi connector 724 establishes a Wi-Fi communication connection with an external device and performs Wi-Fi communication. The Wi-Fi connector 724 establishes the Wi-Fi communication connection with the mobile device 110 and AP device 130, and performs the Wi-Fi communication.

The communication module 232 of the mobile device 110 includes the BLE communication module 730 and the Wi-Fi communication module 740. The BLE communication module 730 and the Wi-Fi communication module 740 may be connected to different power lines. The BLE communication module 730 may be connected to the second power line POWER2 and the Wi-Fi communication module 740 may be connected to the third power line POWER3.

The processor 230 of the mobile device 110 may control on or off of the BLE communication module 730 and Wi-Fi communication module 740, according to an operation mode.

The BLE communication module 730 includes the BLE scanner 732 and a BLE connector 1520.

The BLE scanner 732 performs a BLE scan of detecting a BLE packet. The BLE scanner 732 is operable with standby power. According to an embodiment of the disclosure, the processor 230 may periodically perform the BLE scan in a standby mode.

The BLE scanner 732 performs the BLE scan and detects the BLE advertising packet output from the home appliance 100. The BLE scanner 732 receives the detected BLE advertising packet and transmits the same to the processor 230.

The BLE connector 1520 establishes a BLE communication connection with another device. According to an embodiment of the disclosure, the BLE connector 1520 establishes the BLE communication connection with the home appliance 100. The BLE connector 1520 transmits a BLE connection request to the home appliance 100. The BLE connector 1520 may set and establish a BLE communication channel with the home appliance 100, based on a response of the BLE connector 1510 of the home appliance 100.

The Wi-Fi communication module 740 includes the Wi-Fi scanner 742 and the Wi-Fi connector 744. The Wi-Fi scanner 742 performs a Wi-Fi scan and detects a Wi-Fi signal. The Wi-Fi scanner 742 detects and receives a Wi-Fi beacon output from the Soft AP of the home appliance 100. The Wi-Fi scanner 742 transmits the received Wi-Fi beacon to the processor 230. The processor 230 may obtain information included in the received Wi-Fi beacon.

The Wi-Fi connector 744 establishes a W-Fi connection with another device and performs Wi-Fi communication. According to an embodiment of the disclosure, the Wi-Fi connector 744 establishes a Wi-Fi communication connection with the Wi-Fi connector 724 of the home appliance 100, based on receiving the Wi-Fi beacon corresponding to an SSID of the home appliance 100.

Figure 16:
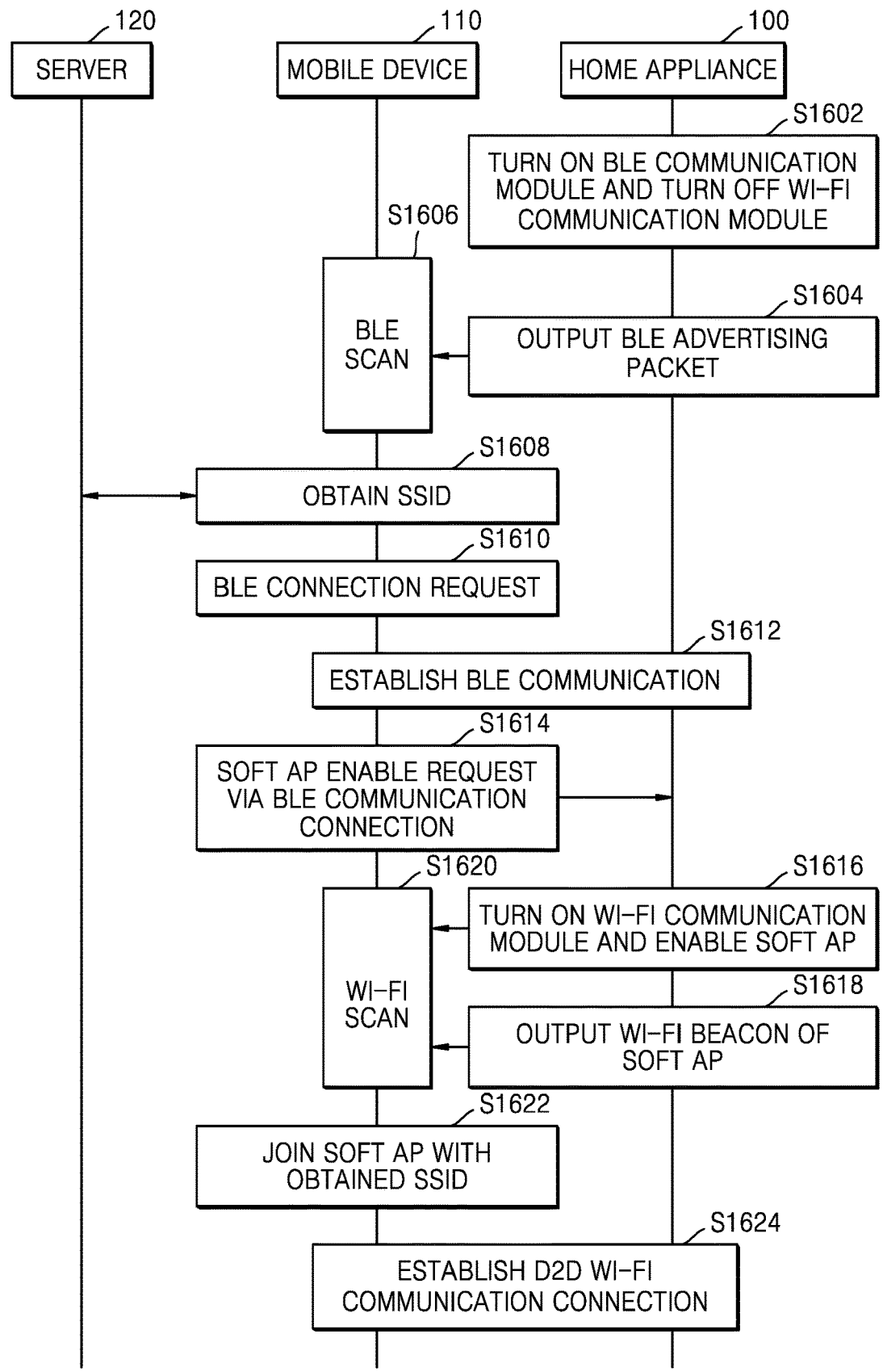
FIG. 16 is a flowchart of operations of a home appliance, mobile device, and server, according to an embodiment of the disclosure.

FIG. 16 is a flowchart of operations of a home appliance, mobile device, and server, according to an embodiment of the disclosure.

FIG. 16 illustrates operations based on the communication module 212 of the home appliance 100 and the communication module 232 of the mobile device 110 shown in FIG. 15. Also, an embodiment of the disclosure of FIG. 16 corresponds to an embodiment of the disclosure, in which the home appliance 100 independently turns on or off the BLE communication module 710 and the Wi-Fi communication module 720, as shown in FIG. 14.

In operation S1602, the home appliance 100 turns on the BLE communication module 710. In operation 1602, the home appliance 100 maintains a turn-off state of the Wi-Fi communication module 720.

Next, in operation S1604, the home appliance 100 outputs a BLE advertising packet via a BLE advertising method. The BLE advertising packet includes SSID-related information of a Soft AP.

In operation S1606, the mobile device 110 performs a BLE scan to detect and receive the BLE advertising packet. The mobile device 110 receives the BLE advertising packet and obtains the SSID-related information in the BLE advertising packet.

Then, in operation S1608, the mobile device 110 obtains an SSID. The mobile device 110 generates an SSID request including the SSID-related information and transmits the SSID request to the server 120. In response to receiving the SSID request, the server 120 searches for or identifies the SSID. Also, the server 120 transmits, to the mobile device 110 found or identified SSID information. The mobile device 110 receives and stores the SSID transmitted from the server 120. The mobile device 110 stores the obtained SSID in the memory 234.

Also, in operation S1610, the mobile device 110 transmits a BLE connection request to the home appliance 100. The mobile device 110 generates the BLE connection request, based on BLE advertising packet information, and transmits the BLE connection request to the home appliance 100.

An order of performing operation S1608 and operation S1610 is not limited that shown in FIG. 16. Operations S1608 and S1610 may be performed in parallel or sequentially. Operation S1608 only need to be performed before operation S1614 described below.

Then, in operation S1612, the mobile device 110 and home appliance 100 establishes a BLE communication connection. The home appliance 100 responds to the BLE connection request transmitted from the mobile device 110. The mobile device 110 may establish a BLE communication channel, based on a response to the BLE connection request, which is received from the home appliance 100.

Then, in operation S1614, the mobile device 110 transmits a Soft AP enable request to the home appliance 100, via the BLE communication connection.

Next, in operation S1616, the home appliance 100 turns on the Wi-Fi communication module 720 and enables the Soft AP, in response to the Soft AP enable request. The home appliance 100 turns on the Wi-Fi communication module 720 by applying power to the Wi-Fi communication module 720. Also, the home appliance 100 may enable the Soft AP by executing driving software for enabling the Soft AP.

According to an embodiment of the disclosure, the home appliance 100 may switch from a standby power mode to a normal mode before turning on the Wi-Fi communication module 720.

The standby power mode is a mode for consuming only limited power so as to minimize power consumption. In the standby power mode, power consumption is low and power may be supplied only to some components that require to be enabled in the standby power mode. For example, in the standby power mode, power may be supplied only to the BLE communication module 710, a certain sensor (e.g., a recognition/detection sensor, a door opening sensor, or the like), and the like, and power may not be supplied to remaining components.

The normal mode is a mode for supplying rated power of the home appliance 100. In the normal mode, power is supplied to most components of the home appliance 100. In the normal mode, power is supplied such that all functions of the home appliance 100 are usable.

Because the BLE communication module 710 operates even in the standby power mode, the home appliance 100 may operate in the standby power mode while operations S1602, S1604, and S1606 related to BLE communication are performed. However, the Wi-Fi communication module 720 is unable to operate with power of the standby power mode. According to an embodiment of the disclosure, the home appliance 100 operates in the standby power mode while operations S1602, S1604, and S1606 of performing BLE communication are performed, and switches an operation mode or power mode to the normal mode before operation S1616 of performing Wi-Fi communication.

Then, in operation S1618, the home appliance 100 outputs a Wi-Fi beacon of the Soft AP.

Next, in operation S1620, the mobile device 110 performs a W-Fi scan. The mobile device 110 detects the Wi-Fi beacon of the Soft AP by performing the Wi-Fi scan. The mobile device 110 identifies that the previously obtained SSID matches an SSID of the Wi-Fi beacon of the Soft AP.

In operation S1622, the mobile device 110 joins the Soft AP when the Wi-Fi beacon of the Soft AP having the same SSID as the stored SSID is detected. Then, in operation S1624, a D2D Wi-Fi communication connection is established between the mobile device 110 and the Soft AP of the home appliance 100. When the D2D Wi-Fi communication connection is established, the mobile device 110 and the home appliance 100 performs inter-device direct communication via the D2D Wi-Fi communication connection.

Figure 17:
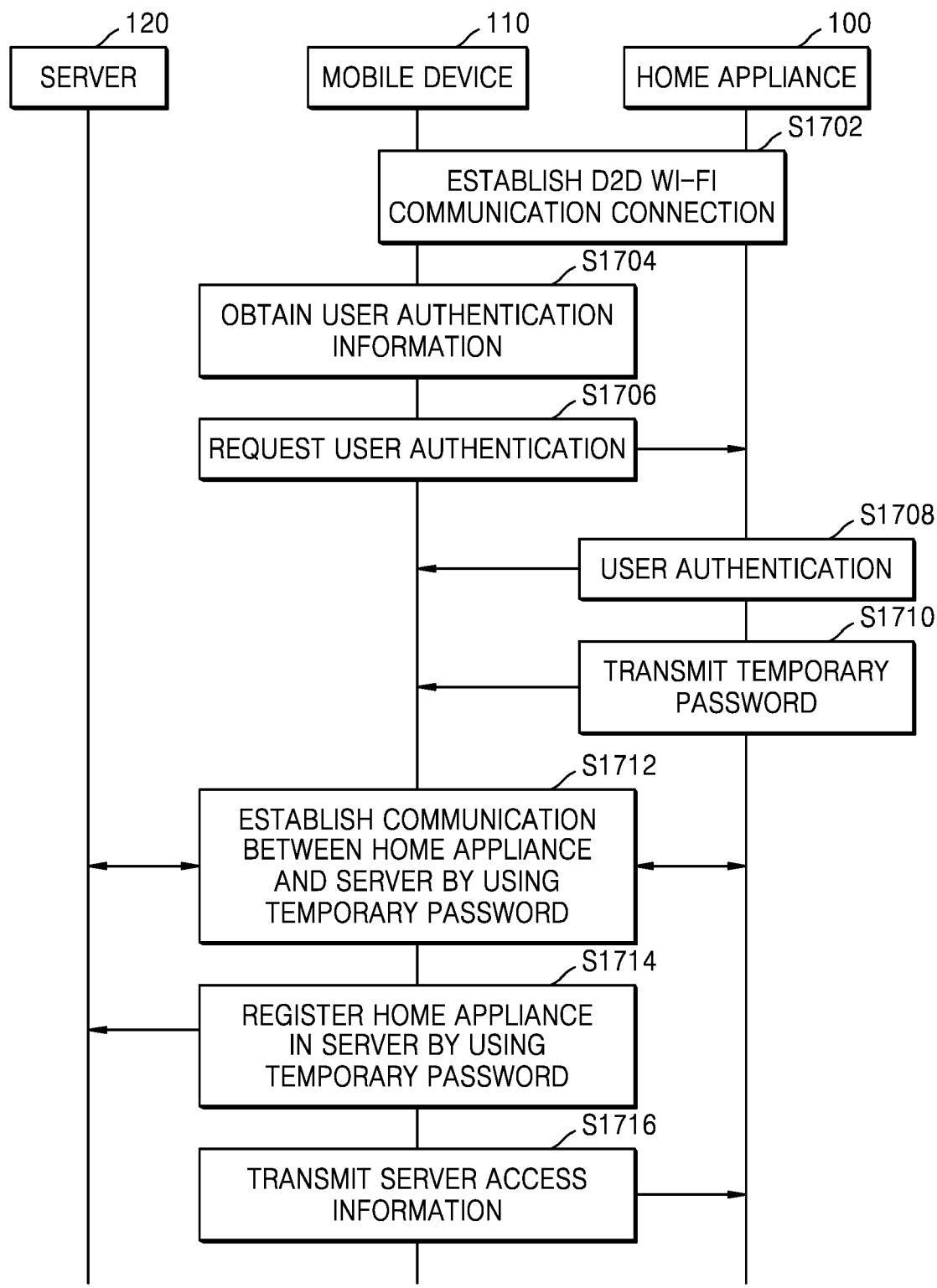
FIG. 17 is a diagram showing a process, performed by a server, a mobile device, and a home appliance, of performing user authentication, according to an embodiment of the disclosure.

FIG. 17 is a diagram showing a process, performed by a server, a mobile device, and a home appliance, of performing user authentication, according to an embodiment of the disclosure.

According to an embodiment of the disclosure, the home appliance 100 may perform user authentication to allow the mobile device 110 to control an initial setting operation. The home appliance 100 identifies whether a user of the mobile device 110 is an owner of the home appliance 100, by using information locally provided via the home appliance 100. The home appliance 100 may allow the home appliance 100 to be controlled via a D2D connection established with the home appliance 100, only when it is determined that the user of the mobile device 110 is the owner of the home appliance 100. Also, the home appliance 100 allow operations of establishing a D2S connection between the home appliance 100 and the server 120 and of registering the home appliance 100 in the server 120 to be controlled, only when the user of the mobile device 110 is the owner of the home appliance 100.

First, in operation S1702, the mobile device 110 and the home appliance 100 establishes the D2D connection according to embodiments of the disclosure described above.

Then, in operation S1704, the mobile device 110 obtains user authentication information from the home appliance 100. A process, performed by the mobile device 110, of obtaining the user authentication information from the home appliance 100 will be described with reference to FIGS. 18 and 19.

Figure 18:
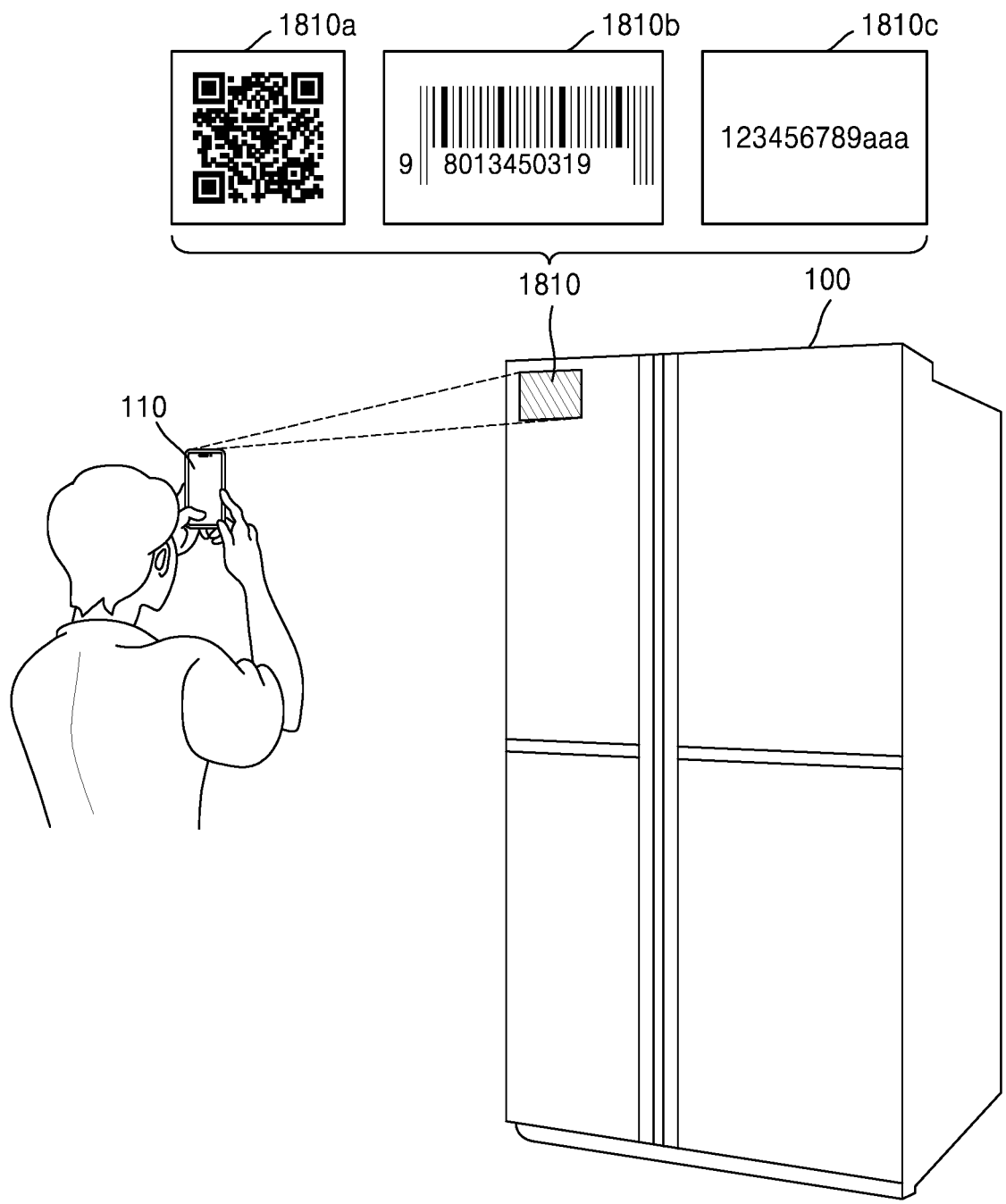
FIG. 18 is a diagram showing a process, performed by a mobile device, of obtaining user authentication information from a home appliance.

FIG. 18 is a diagram showing the process, performed by the mobile device 110, of obtaining the user authentication information from the home appliance 100.

According to an embodiment of the disclosure, the mobile device 110 obtains the user authentication information by photographing the user authentication shown on the exterior of the home appliance 100. The mobile device 110 includes a camera (not shown) and photographs the user authentication information shown on the exterior of the home appliance 100, by using the camera. The home appliance 100 may include the user authentication information printed on or attached to a first region 1810 of a housing.

According to an embodiment of the disclosure, the user authentication information includes a QR code 1810*a*. The QR code 1810*a* includes information corresponding to the user authentication information. The mobile device 110 photographs the QR code 1810*a* by using the camera. The mobile device 110 recognizes the photographed QR code 1810*a* to obtain the user authentication information.

According to another embodiment of the disclosure, the user authentication information includes a barcode 1810*b*. The barcode 1810*b* includes information corresponding to the user authentication information. The mobile device 110 photographs the barcode 1810*b* by using the camera. The mobile device 110 recognizes the photographed barcode 1810*b* to obtain the user authentication information.

According to an embodiment of the disclosure, the QR code 1810*a* or barcode 1810*b* may be linked to a certain cloud server address performing user authentication. By photographing the QR code 1810*a* or barcode 1810*b*, the mobile device 110 moves to the certain cloud server address and performs user authentication via a certain cloud server. The mobile device 110 may receive authentication complete information indicating that the user authentication is completed, from the cloud server. The authentication complete information may be information pre-registered in the home appliance 100. For example, the authentication complete information may be certain identification information. The home appliance 100 may receive the authentication complete information from the mobile device 110 to complete the user authentication.

According to another embodiment of the disclosure, the user authentication information includes a serial number 1810*c*. The serial number 1810*c* includes information corresponding to the user authentication information. The mobile device 110 photographs the serial number 1810*c* by using the camera. The mobile device 110 recognizes the photographed serial number 1810*c* to obtain the user authentication information.

According to an embodiment of the disclosure, the home appliance 100 may use at least one or a combination of the QR code 1810*a*, the barcode 1810*b*, or the serial number 1810*c*. The home appliance 100 may provide various combinations of the user authentication information such that the user authentication information may be selectively collected according to a function (e.g., the camera, QR code recognition, barcode recognition, or the like) supported by the mobile device 110 or preference of the user.

According to an embodiment of the disclosure, the home appliance 100 includes a display (not shown) and displays at least one of the QR code 1810*a*, the barcode 1810*b*, or the serial number 1810*c*, on the display. According to an embodiment of the disclosure, when a D2D communication connection between the mobile device 110 and the home appliance 100 is established, the home appliance 100 may display the user authentication information on the display.

Figure 19:
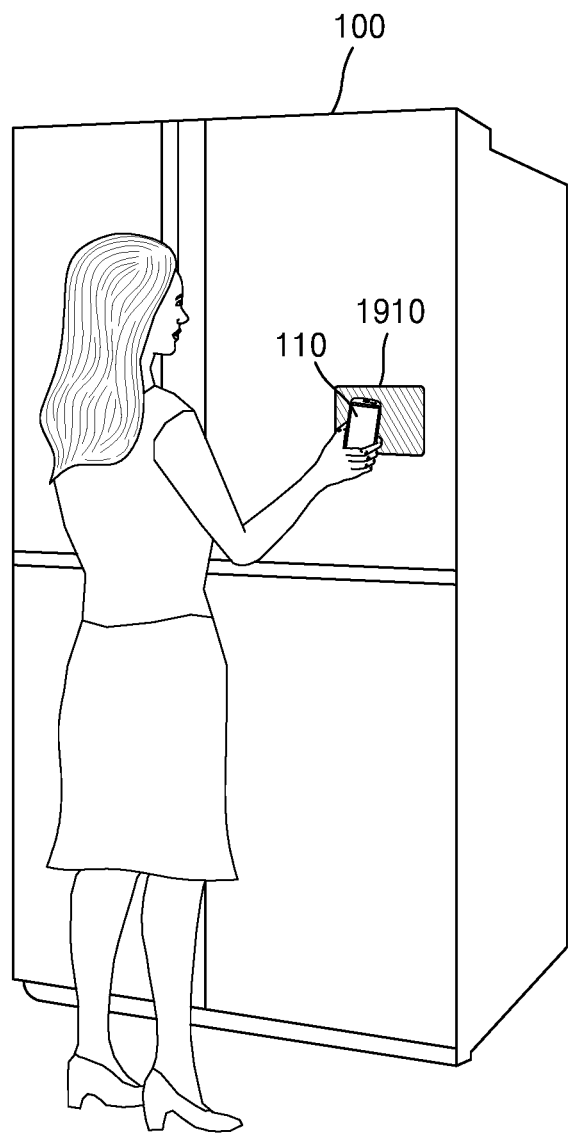
FIG. 19 is a diagram showing a process, performed by a mobile device, of obtaining user authentication information from a home appliance, by using a near field communication (NFC) method, according to an embodiment of the disclosure.

FIG. 19 is a diagram showing a process, performed by a mobile device, of obtaining user authentication information from a home appliance, by using an NFC method, according to an embodiment of the disclosure.

According to an embodiment of the disclosure, the home appliance 100 may transmit the user authentication information to the mobile device 110, via the NFC method. The home appliance 100 includes an NFC tag region 1910. The mobile device 110 receives the user authentication information via NFC, by being located adjacent to the NFC tag region 1910 of the home appliance 100. According to an embodiment of the disclosure, the mobile device 110 may provide a guide to arrange the mobile device 110 adjacent to the NFC tag region 1910, after D2D communication establishment. Based on the guide of the mobile device 110, the user may arrange the mobile device 110 adjacent to the NFC tag region 1910. When the user arranges the mobile device 110 adjacent to the NFC tag region 1910, the user authentication information is transmitted from the home appliance 100 to the mobile device 110, via NFC.

Referring back to FIG. 17, operations after the user authentication information is obtained will be described.

Upon obtaining the user authentication information, the mobile device 110 requests the home appliance 100 for user authentication, in operation S1706. A user authentication request includes the user authentication information obtained from the home appliance 100, and request information requesting the user authentication. Also, the user authentication request may include information about the mobile device 110. The information about the mobile device 110 may include identification information of the mobile device 110, account information of the server 120 to which the mobile device 110 is connected, and the like. The mobile device 110 transmits the user authentication request to the home appliance 100. The mobile device 110 transmits the user authentication request to the home appliance 100, via the D2D Wi-Fi communication connection.

Then, in operation S1708, upon receiving the user authentication request, the home appliance 100 performs the user authentication, based on the received user authentication request. The home appliance 100 may store, in the memory 214, the user authentication information transmitted to the mobile device 110. For example, the home appliance 100 may store, in the memory 214, information about at least one of the QR code 1810a, the barcode 1810b, or the serial number 1810c attached to the housing. As another example, the home appliance 100 may output, via the display, the user authentication information stored in the memory 214. The home appliance 100 performs the user authentication on the mobile device 110, based on the user authentication information pre-stored in the memory 214, as such. The home appliance 100 may perform the user authentication by determining whether the user authentication information received from the mobile device 110 matches the user authentication information stored in the memory 214.

Then, in operation S1710, the home appliance 100 generates a temporary password and transmits the same to the mobile device 110. The temporary password is a one-time password (OTP). The home appliance 100 generates the temporary password to be used for an initial setting operation, and transmits the same to the mobile device 110.

Then, in operation S1712, the mobile device 110 performs a communication establishment operation between the home appliance 100 and the server 120, by using the temporary password received from the home appliance 100. The mobile device 110 may transmit a cloud server address for the initial setting operation to the home appliance 100, and control communication to be established between the home appliance 100 and a cloud server.

Next, in operation S1714, the mobile device 110 registers the home appliance 100 in the server 120, by using the temporary password. The mobile device 110 registers a name, type, model name, location, or the like of the home appliance 100 in the server 120, and connects the home appliance 100 to a certain account registered in the server 120. Here, the server 120 may receive permission from the home appliance 100 for the home appliance 100 to be connected to the certain account. The home appliance 100 may transmit information indicating that the home appliance 100 is allowed to be connected to the certain account, by using the temporary password. A process of connecting the home appliance 100 to the certain account by using the temporary password will be described in detail below with reference to FIG. 20.

Then, in operation S1716, the mobile device 110 transmits server access information to the home appliance 100. The home appliance 100 is connected to the certain account of the server 120. Accordingly, an ID and password of the account are required for the home appliance 100 to access the server 120. The mobile device 110 transmits, to the home appliance 100, the ID and password of the account to which the home appliance 100 is connected. The mobile device 110 may access the server 120 later, by using the ID and password of the account received from the mobile device 110.

Figure 20:
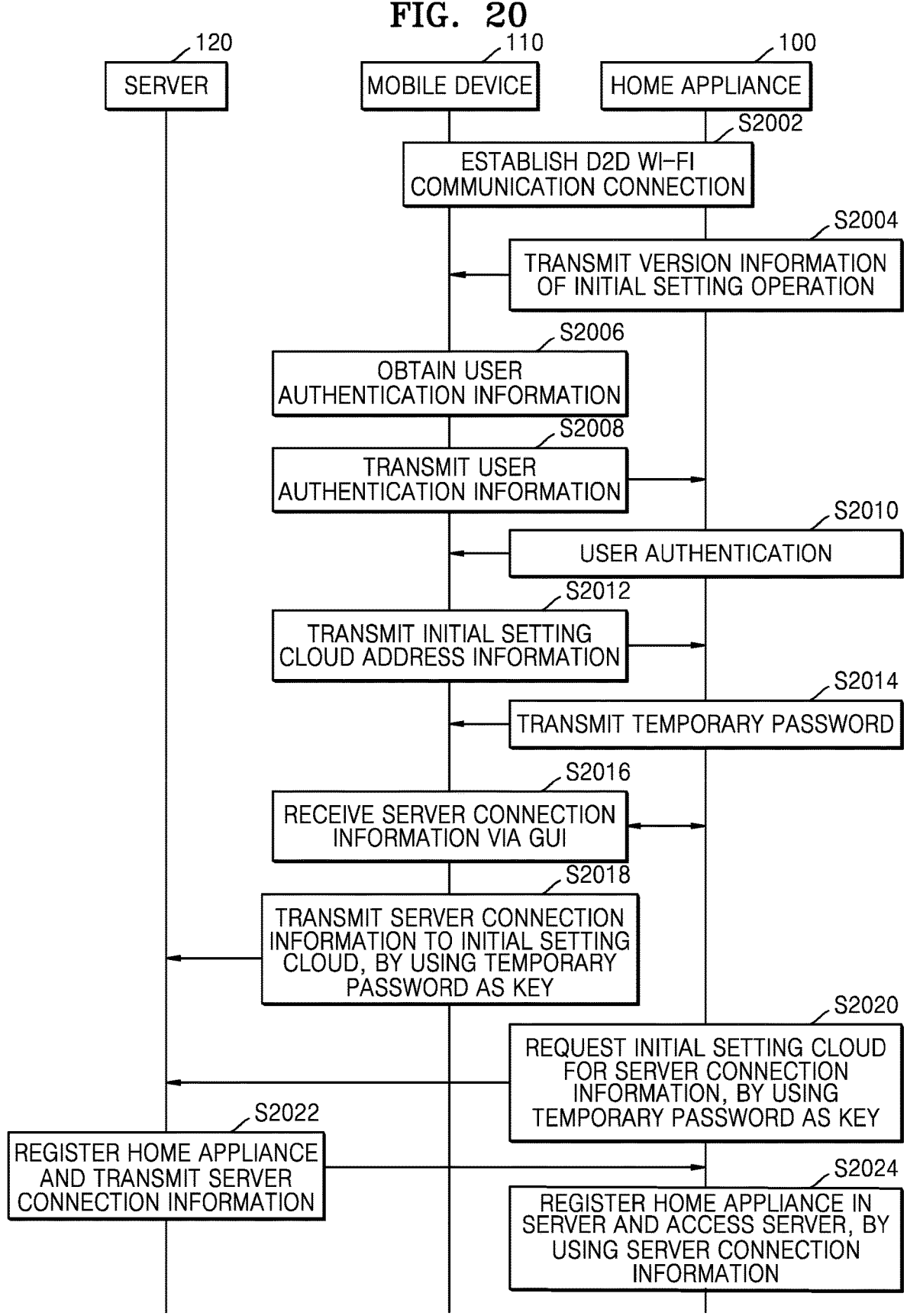
FIG. 20 is a diagram showing a process, performed by a home appliance, of performing user authentication and performing a device-to-device (D2D) initial setting operation and a device-to-server (D2S) initial setting operation, according to an embodiment of the disclosure.

FIG. 20 is a diagram showing a process, performed by a home appliance, of performing user authentication and performing a D2D initial setting operation and a D2S initial setting operation, according to an embodiment of the disclosure.

According to an embodiment of the disclosure, the server 120, the mobile device 110, and the home appliance 100 performs a server registration process of the home appliance 100 by using, as a key, a temporary password set in the home appliance 100.

First, in operation S2002, the mobile device 110 and the home appliance 100 establishes a D2D connection according to embodiments of the disclosure described above.

Then, in operation S2004, the home appliance 100 transmits, to mobile device 110, version information of an initial setting operation.

The home appliance 100 includes the version information identifying the initial setting operation performed by a corresponding home appliance. For example, the initial setting operation of the home appliance 100 may be classified into a version in which a BLE advertising packet and a Wi-Fi beacon are output during a same time interval, a version in which the BLE advertising packet and the Wi-Fi beacon are output during different time intervals, a version to which duty cycling is applied, a version to which the duty cycling is not applied, a version in which BLE communication is established, a version in which the BLE communication is not established, and the like. The home appliance 100 transmits, to the mobile device 110, the version information of the initial setting operation performed by a corresponding device. The mobile device 110 performs the initial setting operation and communicates with the home appliance 100, based on the received version information of the initial setting operation.

Also, the home appliance 100 may include a version of a protocol communicating with the mobile device 110. The home appliance 100 transmits, to the mobile device 110, the version of protocol communicating with the mobile device 110. The mobile device 110 performs communication with the home appliance 100, based on information about the version of the protocol, received from the home appliance 100.

Then, in operation S2006, the mobile device 110 obtains user authentication information from the home appliance 100.

Then, upon obtaining the user authentication information, the mobile device 110 requests the home appliance 100 for user authentication, in operation S2008.

Then, in operation S2010, upon receiving a user authentication request, the home appliance 100 performs user authentication, based on the received user authentication request. The home appliance 100 performs the user authentication on the mobile device 110, based on the user authentication information pre-stored in the memory 214. The home appliance 100 may perform the user authentication by determining whether the user authentication information received from the mobile device 110 matches the user authentication information stored in the memory 214.

Then, in operation S2012, the mobile device 110 transmits initial setting cloud address information to the home appliance 100. A process module performing the initial setting operation may be generated in the server 120, during the initial setting operation of the mobile device 110 and home appliance 100. An address linked to the initial setting process module performing the initial setting operation or to a site accessing the processing module is referred to as an initial setting cloud address. The mobile device 110 and the home appliance 100 may access the initial setting cloud address to approach the initial setting process module.

According to an embodiment of the disclosure, the mobile device 110 may obtain the initial setting cloud address information via a first application. The first application may store address information linked to the initial setting process module. When the home appliance 100 in a new product state is detected, the mobile device 110 executes the first application and may obtain the initial setting cloud address information stored in the first application.

According to another embodiment of the disclosure, the mobile device 110 may obtain the initial setting cloud address information from the version information of the initial setting operation received from the home appliance 100. The home appliance 100 may store the initial setting cloud address information supporting the initial setting operation of the home appliance 100. The home appliance 100 may transmit, to the mobile device 110, the initial setting cloud address information together when transmitting the version information of the initial setting operation (operation S2004) after a D2D Wi-Fi communication connection is established in the mobile device 110 while in the new product state. The mobile device 110 may obtain the initial setting cloud address information together with the version information of the initial setting operation. In this case, operation S2012 of transmitting, by the mobile device 110, the initial setting cloud address information to the home appliance 100 may be omitted.

Then, in operation S2014, the home appliance 100 generates a temporary password and transmits the same to the mobile device 110.

Then, in operation S2016, the mobile device 110 receives server connection information from a user, via a GUI. The mobile device 110 may receive, from the user, the certain server connection information via the GUI, so as to connect the home appliance 100 to a certain account of the server 120.

According to an embodiment of the disclosure, the server connection information is an ID and password of the certain account of the server 120 in which the home appliance 100 is to be registered. The user may input the ID and password registered in the server 120 via the GUI to connect the home appliance 100 to the certain account of the server 120.

According to another embodiment of the disclosure, the server connection information is authentication information to be used when the home appliance 100 accesses the server 120. In addition to the ID and password of the account to which the home appliance 100 is connected, the server 120 may generate and store the authentication information for the home appliance 100. In this regard, the server 120 may receive the authentication information used by the home appliance 100 to access the server 120, via a first application of the mobile device 110.

Then, in operation S1028, the mobile device 110 transmits the server connection information to an initial setting cloud, by using the temporary password received from the home appliance 100 as a key. By transmitting the server connection information by using the temporary password received from the home appliance 100 as the key, the mobile device 110 may authenticate that a user of the mobile device 110 is an authentic user of the home appliance 100.

Next, in operation S2020, the home appliance 100 requests the initial setting cloud for the server connection information, by using the temporary password as a key.

In operation S2022, the server 120 registers the home appliance 100 in the certain account of the server 120 and transmits the server connection information received from the mobile device 110 to the home appliance 100, only when the temporary password received from the mobile device 110 matches the temporary password received from the home appliance 100. Via the temporary password, the server 120 may identify that the server connection information received from the mobile device 110 is input by the authentic user of the home appliance 100. Thus, according to an embodiment of the disclosure, the server 120 may enhance security by preventing an arbitrary user from wrongly registering the home appliance 100 remotely via the mobile device 110 in his/her device and controlling the home appliance 100.

Then, in operation S2024, the home appliance 100 may register the home appliance 100 in the server 120 and access the server 120, by using the server connection information. The server 120 may complete a registration procedure of the home appliance 100 as the home appliance 100 accesses the server 120 by using the server connection information. After being registered in the server 120, the home appliance 100 may transmit, to the server 120, state information, sensor information, monitoring information, a support request, a data process request, or the like of the home appliance 100. Also, after being registered in the server 120, the home appliance 100 may operate by receiving a control signal from the server 120.

Figure 21:
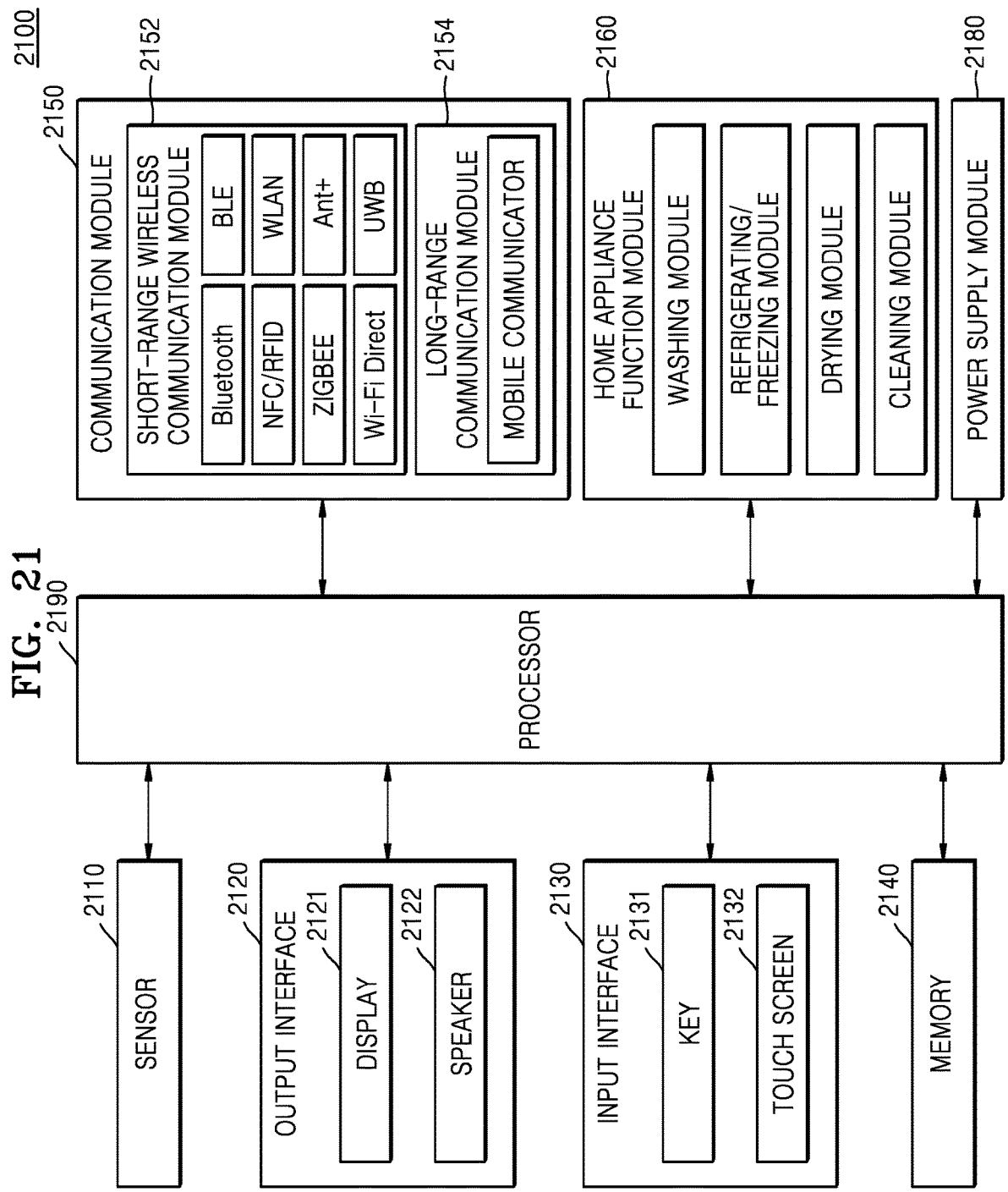
FIG. 21 is a block diagram of a structure of a home appliance, according to an embodiment of the disclosure.

FIG. 21 is a block diagram of a structure of a home appliance, according to an embodiment of the disclosure.

The home appliance 100 according to an embodiment of the disclosure may correspond to a home appliance 2100. The home appliance 2100 according to an embodiment of the disclosure includes a sensor 2110, an output interface 2120, an input interface 2130, a memory 2140, a communication module 2150, a home appliance function module 2160, a power supply module 2180, and a processor 2190. The home appliance 2100 may be configured in various combinations of the components shown in FIG. 21, and the components shown in FIG. 21 are not all essential components.

The home appliance 2100 of FIG. 21 corresponds to the home appliance 100 described in FIG. 2, the memory 2140 corresponds to the memory 214 described in FIG. 2, the processor 2190 corresponds to the processor 210 described in FIG. 2, and the communication module 2150 corresponds to the communication module 212 described in FIG. 2.

The sensor 2110 may include various types of sensors, and for example, the sensor 2110 may include various types of sensors, such as an image sensor, an infrared sensor, an ultrasonic sensor, a radar sensor, a recognition/detection sensor, a movement detection sensor, a proximity sensor, an illumination sensor, and the like. Because functions of each sensor can be intuitively inferred by one of ordinary skill in the art from the name, detailed descriptions thereof will be omitted.

The output interface 2120 may include a display 2121, a speaker 2122, and the like. The output interface 2120 outputs various notifications, messages, and information generated by the processor 2190.

The input interface 2130 may include a key 2131, a touch screen 2132, and the like. The input interface 2130 receives a user input and transmits the same to the processor 2190.

The memory 2140 stores various types of information, data, an instruction, a program, and the like required for operations of the home appliance 2100. The memory 2140 may be configured in at least one of a volatile memory or a nonvolatile memory, or a combination thereof. The memory 2140 may include at least one type of storage medium among a flash memory type, a hard disk type, a multimedia card micro type, a card type memory (for example, a secure digital (SD) or an extreme digital (XD) memory), random access memory (RAM), static RAM (SRAM), read-only memory (ROM), electrically erasable programmable ROM (EEPROM), programmable ROM (PROM), a magnetic memory, a magnetic disk, and an optical disk. Also, the home appliance 2100 may operate a web storage or cloud server performing a storing function on the Internet.

The communication module 2150 may include at least one or a combination of a short-range wireless communication module 2152 or a long-range communication module 2154. The communication module 2150 may include at least one antenna for communicating with another device wirelessly.

The short-range wireless communication module 2152 may include a Bluetooth communication module, a Bluetooth low energy (BLE) communication module, a near field communication module, a wireless local area network (WLAN) (Wi-Fi) communication module, a Zigbee communication module, an infrared data association (IrDA) communication module, a Wi-Fi direct (WFD) communication module, an ultra-wideband (UWB) communication module, and an Ant+ communication module, but is not limited thereto.

The long-range communication module 2154 may include a communication module performing various types of long-range communication, and may include a mobile communicator. The mobile communicator may transmit or receive a wireless signal to or from at least one of a base station, an external terminal, or a server, on a mobile communication network. Here, the wireless signal may include various types of data according to exchange of a voice call signal, an image call signal, or a text/multimedia message.

The home appliance function module 2160 includes an operation module that performs an intrinsic function of the home appliance 2100. When the home appliance 2100 corresponds to a washing machine, the home appliance function module 2160 includes a washing module. The washing module may include a washing machine drum, a water supply portion, a drainage portion, a motor, a door, a detergent input hole, and the like. When the home appliance 2100 corresponds to a refrigerator, the home appliance function module 2160 may include a refrigerating/freezing module. The refrigerating/freezing module may include a container, a cooler, a door, a temperature sensor, and the like. When the home appliance 2100 corresponds to a dryer, the home appliance function module 2160 may include a drying module. The drying module may include a laundry container, a motor, a dehumidifying unit, a door, a dust filter, a capacitor, and the like. When the home appliance 2100 corresponds to a cleaning module, the home appliance function module 2160 may include a cleaning module. The cleaning module may include a vacuum suction unit, a dust collector, a filter, a dust moving pipe, and the like.

The processor 2190 controls all operations of the home appliance 2100. The processor 2190 may control the components of the home appliance 2100 by executing a program stored in the memory 2140.

According to an embodiment of the disclosure, the processor 2190 may include a separate neural processing unit (NPU) performing an operation of a machine learning model. In addition, the processor 2190 may include a central processing unit (GPU), a graphics processing unit (GPU), and the like.

Figure 22:
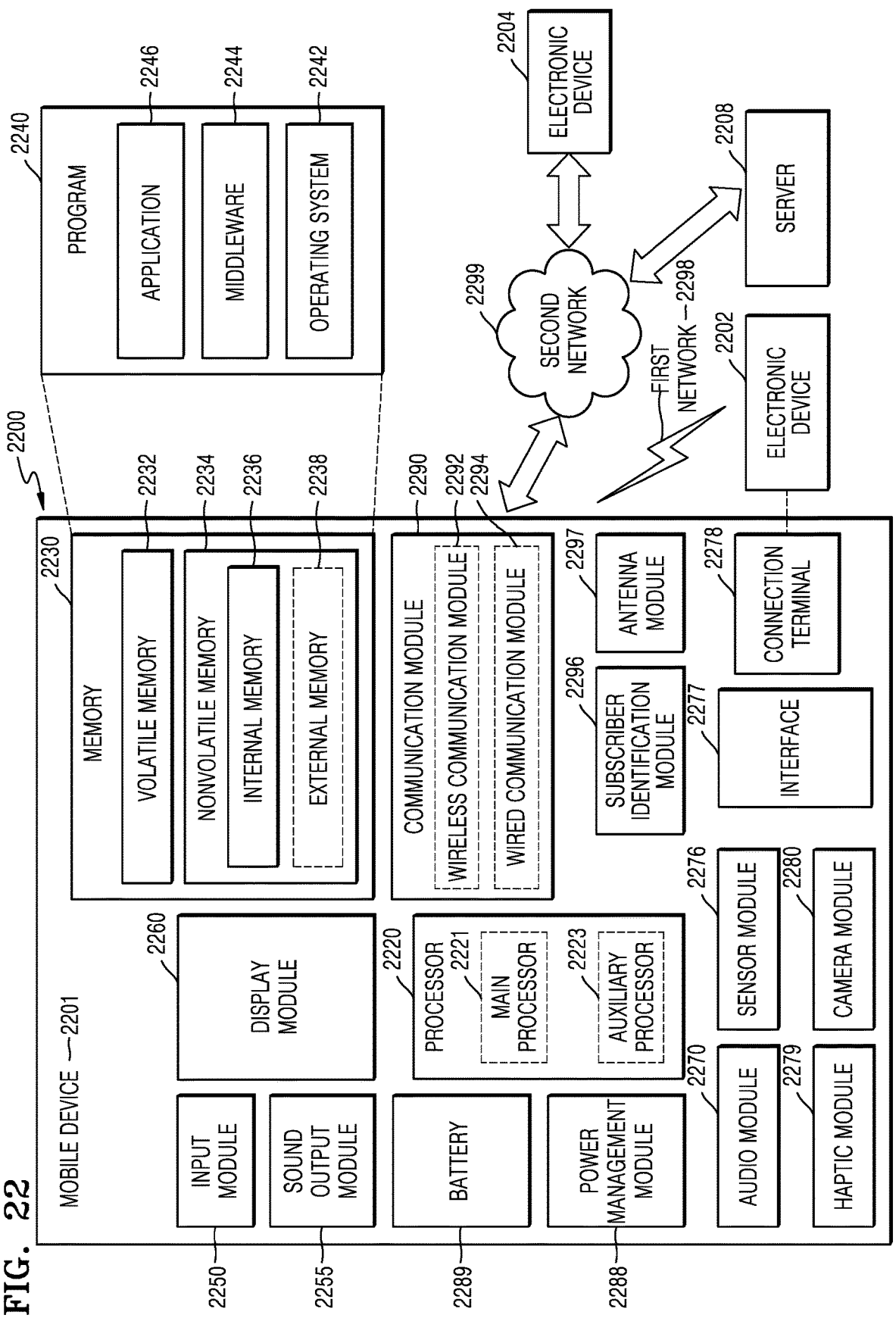
FIG. 22 is a block diagram of a mobile device in a network environment, according to various embodiments of the disclosure

FIG. 22 is a block diagram of a mobile device 2201 in a network environment 2200, according to various embodiments of the disclosure.

The mobile device 2201 of FIG. 22 may correspond to the mobile device 110 described above. Also, the processor 230 described in FIG. 2 may correspond to a processor 2220, and the communication module 232 described in FIG. 2 may correspond to a communication module 2290. Also, the memory 234 described in FIG. 2 may correspond to a memory 2230, an I/O interface 236 described in FIG. 2 may correspond to an input module 2250, a sound output module 2255, a display module 2260, an audio module 2270, and a haptic module 2279. In addition, the server 120 described in FIG. 2 may correspond to a server 2208, and the home appliance 100 may correspond to an electronic device 2202 or electronic device 2204.

Referring to FIG. 22, in the network environment 2200, the mobile device 2201 may communicate with the electronic device 2202 via a first network 2298 (e.g., a short-range wireless communication network) or communicate with at least one of the electronic device 2204 or server 2208 via a second network 2299 (e.g., a long-range wireless communication network). According to an embodiment of the disclosure, the mobile device 2201 may communicate with the electronic device 2204 via the server 2208. According to an embodiment of the disclosure, the mobile device 2201 may include the processor 2220, the memory 2230, the input module 2250, the sound output module 2255, the display module 2260, the audio module 2270, a sensor module 2276, an interface 2277, a connection terminal 2278, the haptic module 2279, a camera module 2280, a power management module 2288, a battery 2289, the communication module 2290, a subscriber identification module 2296, or an antenna module 2297. According to some embodiments of the disclosure, at least one (e.g., the connection terminal 2278) of the components may be omitted or one or more other components may be added to the mobile device 2201. According to some embodiments of the disclosure, some (e.g., the sensor module 2276, the camera module 2280, or the antenna module 2297) of the components may be integrated into one component (e.g., the display module 2260).

The processor 2220 may, for example, control at least one component (e.g., a hardware or software component) of the mobile device 2201 connected to the processor 2220 by executing software (e.g., a program 2240), and may perform various data processes or operations. According to an embodiment of the disclosure, as at least a part of the data processes or operations, the processor 2220 may store, in a volatile memory 2232, a command or data received from another component (e.g., the sensor module 2276 or communication module 2290), process the command or data stored in the volatile memory 2232, and store result data in a nonvolatile memory 2234. According to an embodiment of the disclosure, the processor 2220 may include a main processor 2221 (e.g., a CPU or application processor) or an auxiliary processor 2223 (e.g., a GPU, NPU, image signal processor, sensor sub processor, or communication processor) that is operable independently from or together with the main processor 2221. For example, when the mobile device 2201 includes the main processor 2221 and the auxiliary processor 2223, the auxiliary processor 2223 may be configured to use lower power than the main processor 2221 or be specialized for a designated function. The auxiliary processor 2223 may be implemented separately from or as a part of the main processor 2221.

The auxiliary processor 2223 may, for example, control at least some of functions or states related to at least one component (e.g., the display module 2260, the sensor module 2276, or the communication module 2290) from among the components of the mobile device 2201, instead of the main processor 2221 while the main processor 2221 is in an inactive (e.g., sleep) state, or together with the main processor 2221 when the main processor 2221 is in an active (e.g., application execution) state. According to an embodiment of the disclosure, the auxiliary processor 2223 (e.g., the image signal processor or communication processor) may be implemented as a part of a functionally related component (e.g., the camera module 2280 or communication module 2290). According to an embodiment of the disclosure, the auxiliary processor 2223 (e.g., the NPU) may include a hardware structure specialized for processing of an artificial intelligence (AI) model. The AI model may be generated via machine learning. Such learning may be, for example, performed by the mobile device 2201 itself where the AI model is performed, or via a separate server (e.g., the server 2208). Examples of a learning algorithm may include supervised learning, unsupervised learning, semi-supervised learning, and reinforcement learning, but are not limited thereto. The AI model may include a plurality of artificial neural network layers. An artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination thereof, but is not limited thereto. The AI model may include, additionally or alternatively, a software structure, in addition to a hardware structure.

The memory 2230 may store various types of data used by at least one component (e.g., the processor 2220 or sensor module 2276) of the mobile device 2201. The data may include, for example, software (e.g., the program 2240), and input data or output data regarding a command related thereto. The memory 2230 may include the volatile memory 2232 or the nonvolatile memory 2234.

The program 2240 may be stored in the memory 2230 as software, and may include, for example, an operating system 2242, middleware 2244, or an application 2246.

The input module 2250 may receive a command or data to be used in a component (e.g., the processor 2220) of the mobile device 2201 from the outside (e.g., a user) of the mobile device 2201. The input module 2250 may include, for example, a microphone, a mouse, a keyboard, a key (e.g., a button), or a digital pen (e.g., a stylus pen).

The sound output module 2255 may output a sound signal to the outside of the mobile device 2201. The sound output module 2255 may include, for example, a speaker or a receiver. The speaker may be used for a general purpose, such as multimedia reproduction or recording reproduction. The receiver may be used to receive an incoming call. According to an embodiment of the disclosure, the receiver may be implemented separately from or as a part of the speaker.

The display module 2260 may visually provide information to the outside (e.g., the user) of the mobile device 2201. The display module 2260 may include, for example, a display, a hologram device, or a projector, and a control circuit for controlling a corresponding device. According to an embodiment of the disclosure, the display module 2260 may include a touch sensor configured to detect a touch, or a pressure sensor configured to measure strength of power generated by the touch.

The audio module 2270 may convert sound into an electric signal or convert an electric signal into sound. According to an embodiment of the disclosure, the audio module 2270 may obtain sound via the input module 2250 or output sound via the sound output module 2255 or an external electronic device (e.g., the electronic device 2202 (e.g., a speaker or headphone)) connected to the mobile device 2201 directly or wirelessly.

The sensor module 2276 may detect an operating state (e.g., power or temperature) of the mobile device 2201 or an external environment state (e.g., a user state), and generate an electric signal or data value corresponding to the detected state. According to an embodiment of the disclosure, the sensor module 2276 may include, for example, a gesture sensor, a gyro-sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2277 may support one or more designated protocols that may be used by the mobile device 2201 to be connected to an external electronic device (e.g., the electronic device 2202) directly or wirelessly. According to an embodiment of the disclosure, the interface 2277 may include, for example, a high-definition multimedia interface (HDMI), a universal serial bus (USB) interface, a secure digital (SD) card interface, or an audio interface.

The connection terminal 2278 may include a connector enabling the mobile device 2201 to be physically connected to an external electronic device (e.g., the electronic device 2202) therethrough. According to an embodiment of the disclosure, the connection terminal 2278 may include, for example, an HDMI connector, a USB connector, an SD card connector, or an audio connector (e.g., a headphone connector).

The haptic module 2279 may convert an electric signal into a mechanical stimulus (e.g., vibration or motion) or an electric stimulus, which may be recognized by a user via tactile or exercise sense. According to an embodiment of the disclosure, the haptic module 2279 may include, for example, a motor, a piezoelectric device, or an electric stimulus device.

The camera module 2280 may capture a still image and a moving image. According to an embodiment of the disclosure, the camera module 2280 may include one or more lenses, image sensors, image signal processors, or flashes.

The power management module 2288 may manage power supplied to the mobile device 2201. According to an embodiment of the disclosure, the power management module 2288 may be implemented as, for example, at least a part of a power management integrated circuit (PMIC).

The battery 2289 may supply power to at least one component of the mobile device 2201. According to an embodiment of the disclosure, the battery 2289 may include, for example, a primary battery that is unable to be recharged, a rechargeable secondary battery, or a fuel cell.

The communication module 2290 may support establishment of a direct (e.g., wired) communication channel or wireless communication channel between the mobile device 2201 and an external electronic device (e.g., the electronic device 2202, the electronic device 2204, or the server 2208), and performing of communication via an established communication channel. The communication module 2290 is operated independently from the processor 2220 (e.g., the application processor), and may include one or more communication processors supporting direct (e.g., wired) communication or wireless communication. According to an embodiment of the disclosure, the communication module 2290 may include a wireless communication module 2292 (e.g., a cellular communication module, a short-range wireless communication module, or a global navigation satellite system (GNSS) communication module), or a wired communication module 2294 (e.g., an LAN communication module or a power line communication module). A corresponding communication module among such communication modules may communicate with the external electronic device 2204 via the first network 2298 (e.g., the short-range wireless communication network, such as Bluetooth, WFD, or IrDA) or the second network 2299 (e.g., the long-range communication network, such as a legacy cellular network, 5G network, next-generation communication network, the Internet, or computer network (e.g., LAN or WAN)). Such various types of communication modules may be integrated into one component (e.g., a single chip) or implemented as a plurality of separate components (e.g., a plurality of chips). The wireless communication module 2292 may identify or authenticate the mobile device 2201 in a communication network, such as the first network 2298 or second network 2299, by using subscriber information (e.g., an international mobile subscriber identifier (IMSI) stored in the subscriber identification module 2296.

The wireless communication module 2292 may support a 5G network beyond 4G network, and next-generation communication technology, for example, new radio (NR) access technology. The NR access technology may support enhanced mobile broadband (eMBB), massive machine type communication (mMTC), or ultra-reliability and low-latency communication (URLLC). The wireless communication module 2292 may support, for example, a high-frequency band (e.g., mmWave band) to achieve a high data rate. The wireless communication module 2292 may support various technologies for securing performance in a high-frequency band, for example, technologies such as beamforming, massive multiple-input and multiple-output (MIMO), full dimensional MIMO (FD-MIMO), array antenna, analog beamforming, and large scale antenna. The wireless communication module 2292 may support various requirements specified by the mobile device 2201, an external electronic device (e.g., the electronic device 2204), or a network system (e.g., the second network 2299). According to an embodiment of the disclosure, the wireless communication module 2292 may support a peak data rate (e.g., 20 Gbps or greater) for eMBB realization, loss coverage (e.g., 164 dB or less) for mMTC realization, or U-plane latency (e.g., 0.5 ms or less for each downlink (DL) and uplink (UL) or 1 ms or less of round trip) for URLLC realization.

The antenna module 2297 may transmit or receive a signal or power to or from the outside (e.g., an external electronic device). According to an embodiment of the disclosure, the antenna module 2297 may include an antenna including an emitter consisting of a conductor or conductive pattern formed on a substrate (e.g., a printed circuit board (PCB)). According to an embodiment of the disclosure, the antenna module 2297 may include a plurality of antennas (e.g., an array antenna). In this case, at least one antenna suitable to a communication method used in a communication network, such as the first network 2298 or second network 2299, may be selected from the plurality of antennas by, for example, the communication module 2290. The signal or power may be transmitted or received between the communication module 2290 and an external electronic device via the at least one selected antenna. According to some embodiments of the disclosure, a component (e.g., a radio frequency integrated circuit (RFIC) other than the emitter may be additionally provided as a part of the antenna module 2297.

According to various embodiments of the disclosure, the antenna module 2297 may form an mmWave antenna module. According to an embodiment of the disclosure, the mmWave antenna module may include a printed circuit board, an RFIC capable of supporting a designated high-frequency band (e.g., an mmWave band) and arranged on or adjacent to a first surface (e.g., a bottom surface) of the printed circuit board, and a plurality of antennas (e.g., an array antenna) capable of transmitting or receiving a signal of the designated high-frequency band and arranged on or adjacent to a second surface (e.g., a top surface) of the printed circuit board.

At least some of the components may be connected to each other via a communication method between peripheral devices (e.g., a bus, a general purpose input and output (GPIO), a serial peripheral interface (SPI), or a mobile industry processor interface (MIPI), and may exchange signals (e.g., a command or data).

According to an embodiment of the disclosure, the command or data may be transmitted or received between the mobile device 2201 and the external electronic device 2204, via the server 2208 connected to the second network 2299. Each external electronic device 2202 or 2204 may be a same or different type of device as or from the mobile device 2201. According to an embodiment of the disclosure, all or some of operations executed by the mobile device 2201 may be executed by one or more external electronic devices from among the external electronic devices 2202, 2204, or 2208. For example, when the mobile device 2201 is to perform a certain function or service automatically or in response to a request from a user or another device, the mobile device 2201 may request one or more external electronic devices to perform at least a part of the function or service, instead of or in addition to performing the function or service by itself. Upon receiving the request, the one or more external electronic devices may execute at least a part of the requested function or service or an additional function or service related to the request, and transmit a result thereof to the mobile device 2201. The mobile device 2201 may process the result as it is or additionally, and provide the result as at least a part of a response to the request. In this regard, for example, cloud computing, distributed computing, mobile edge computing (MEC), or client-server computing technology may be used. The mobile device 2201 may provide an ultra-low latency service by using, for example, the distributed computing or mobile edge computing. According to another embodiment of the disclosure, the external electronic device 2204 may include an Internet of things (IoT) device. The server 2208 may be an intelligent server using machine learning and/or neural network. According to an embodiment of the disclosure, the external electronic device 2204 or server 2208 may be included in the second network 2299. The mobile device 2201 may be applied to an intelligence service (e.g., a smart home, a smart city, a smart car, or health care), based on 5G communication technology and IoT-related technology.

The term "module" used in various embodiments of the disclosure may include a unit implemented in hardware, software, or firmware, and for example, may be interchangeably used with a term such as a logic, a logic block, a component, or a circuit. The module may be an integrally configured component, a minimum unit of the component, which perform one or more functions, or a part of the component. For example, according to an embodiment of the disclosure, the module may be configured in a form of an application-specific integrated circuit (ASIC).

Various embodiments of the disclosure may be implemented as software (e.g., a program) including one or more instructions stored in a storage medium readable by a machine (e.g., the mobile device 110 or home appliance 100). For example, a processor of the machine (e.g., the mobile device 110 or home appliance 100) may invoke at least one instruction from among the one or more instructions stored in the storage medium, and execute the at least one instruction. Accordingly, the machine is enabled to operate to perform at least one function according to the at least one invoked instruction. The one or more instructions may include code generated by a compiler or code executable by an interpreter. The machine-readable storage medium may be provided in a form of a non-transitory storage medium. Here, 'non-transitory' only means that the storage medium is a tangible device and does not contain a signal (for example, electromagnetic waves). This term does not distinguish a case where data is stored in the storage medium semi-permanently and a case where data is stored in the storage medium temporarily.

According to an embodiment of the disclosure, a method according to various embodiments of the disclosure may be provided by being included in a computer program product. The computer program products are products that can be traded between sellers and buyers. The computer program product may be distributed in a form of machine-readable storage medium (for example, a compact disc read-only memory (CD-ROM)), or distributed (for example, downloaded or uploaded) through an application store (for example, Play Store™), or directly or online between two user devices (for example, smartphones). In the case of online distribution, at least a part of the computer program product may be at least temporarily stored or temporarily generated in the machine-readable storage medium such as a server of a manufacturer, a server of an application store, or a memory of a relay server.

According to various embodiments of the disclosure, each component (e.g., module or program) of the above-described components may include a single or plurality of entities, and some of the plurality of entities may be separately arranged in another component. According to various embodiments of the disclosure, one or more components among the above-described components, or one or more operations may be omitted, or one or more other components or operations may be added. Alternatively or additionally, a plurality of components (e.g., modules or programs) may be integrated into one component. In this case, the integrated component may perform one or more functions of each of the plurality of components in a same or similar manner as a corresponding component among the plurality of components before the integration. According to various embodiments of the disclosure, operations performed by modules, programs, or other components may be sequentially, parallelly, repetitively, or heuristically executed, one or more of the operations may be executed in a different order or omitted, or one or more other operations may be added.

Although embodiments have been described herein in detail, it should be understood that the various changes, substitutions, and alterations could be made hereto without departing from the spirit and scope of the embodiments.

What is claimed is:

1. A method of controlling a home appliance, the method comprising:
by a home appliance,
outputting, via Bluetooth low energy (BLE) advertising, a BLE advertising packet including service set identifier (SSID)-related information related to an SSID of a software enabled access point (Soft AP) of the home appliance in a new product state in which the home appliance has not been registered in a server;
outputting a Wi-Fi beacon of the Soft AP;
in response to a connection request for the Soft AP received from a mobile device after outputting the Wi-Fi beacon, establishing a Wi-Fi communication connection between the mobile device and the Soft AP;
receiving, from the mobile device via the Wi-Fi communication connection, a control signal related to an initial setting operation of registering the home appliance in the server; and
performing the initial setting operation, based on the received control signal.

2. The method of claim 1, wherein the SSID-related information comprises manufacturer identification information and initial setting identification information of the home appliance, and the SSID of the Soft AP is matched to at least one of the manufacturer identification information or the initial setting identification information, or a combination thereof.

3. The method of claim 1, wherein the outputting of the BLE advertising packet and the outputting of the Wi-Fi beacon are performed by a communication module of the home appliance configured as a single chip, wherein at least a part of a time interval for outputting the BLE advertising packet and at least a part of a time interval for outputting the Wi-Fi beacon overlap.

4. The method of claim 1, wherein
the outputting of the BLE advertising packet and the outputting of the Wi-Fi beacon are performed by a communication module of the home appliance configured as a single chip, and
the method further comprises:
by the home appliance,
during a first time interval, applying power to the communication module and performing the outputting of the BLE advertising packet and the outputting of the Wi-Fi beacon;
when the establishing of the Wi-Fi communication connection between the mobile device and the Soft AP is not initiated during the first time interval, during a second time interval after the first time interval, blocking the power of the communication module and stopping the outputting of the BLE advertising packet and the outputting of the Wi-Fi beacon; and
periodically repeating the first time interval and the second time interval until the establishing of the Wi-Fi communication connection between the mobile device and the Soft AP is initiated.

5. The method of claim 1, further comprising:
by the home appliance,
displaying, on a display of the home appliance, user authentication information to be used for user authentication of the mobile device.

6. The method of claim 5, wherein the performing of the initial setting operation comprises, after the user authentication of the mobile device is completed:
receiving address information of an initial setting cloud from the mobile device,
transmitting a temporary password to the mobile device,
receiving server connection information from the initial setting cloud, by using the temporary password as authentication information, and
registering the home appliance in the server by using the server connection information.

7. The method of claim 5, further comprising:
by the home appliance,
before the user authentication of the mobile device, transmitting version information of the initial setting operation to the mobile device via the Wi-Fi communication connection.

8. The method of claim 1, wherein
the outputting of the BLE advertising packet is performed by a BLE communication module of the home appliance,
the outputting of the Wi-Fi beacon is performed by a Wi-Fi communication module of the home appliance, and
the method further comprises:
by the home appliance,
blocking power of the Wi-Fi communication module while the outputting of the BLE advertising packet is being performed.

9. The method of claim 8, further comprising:
by the home appliance,
establishing a Bluetooth communication connection with the mobile device, based on a BLE connection request received from the mobile device;
supplying power to the Wi-Fi communication module and activating the Soft AP, based on receiving an activation request of the Soft AP via the Bluetooth communication connection; and
outputting the Wi-Fi beacon of the Soft AP.

10. A computer-readable recording medium having recorded thereon a program for executing, on a computer, the method of claim 1.

11. A home appliance comprising:
a communication module;
at least one memory storing at least one instruction; and
at least one processor connected to the at least one memory,
wherein the at least one processor is configured to execute the at least one instruction to:
output, via Bluetooth low energy (BLE) advertising, a BLE advertising packet including service set identifier (SSID)-related information related to an SSID of a software enabled access point (Soft AP) of the home appliance in a new product state in which the home appliance has not been registered in a server,
output a Wi-Fi beacon of the Soft AP via the communication module,
in response to a connection request for the Soft AP received from a mobile device after outputting the Wi-Fi beacon, establish a Wi-Fi communication connection between the mobile device and the Soft AP,
receive, from the mobile device via the Wi-Fi communication connection, a control signal related to an initial setting operation of registering the home appliance in the server, and
perform the initial setting operation, based on the received control signal.

12. The home appliance of claim 11, wherein
the outputting of the BLE advertising packet and the outputting of the Wi-Fi beacon are performed by the communication module configured as a single chip, and
at least a part of a time interval for outputting the BLE advertising packet and at least a part of a time interval for outputting the Wi-Fi beacon overlap.

13. The home appliance of claim 11, wherein
the outputting of the BLE advertising packet and the outputting of the Wi-Fi beacon are performed by the communication module configured as a single chip, and
the at least one processor is further configured to execute the at least one instruction to:
during a first time interval, apply power to the communication module and perform the outputting of the BLE advertising packet and the outputting of the Wi-Fi beacon,
when the establishing of the Wi-Fi communication connection between the mobile device and the Soft AP is not initiated during the first time interval, during a second time interval after the first time interval, block the power of the communication module and stop the outputting of the BLE advertising packet and the outputting of the Wi-Fi beacon, and
periodically repeat the first time interval and the second time interval until the establishing of the Wi-Fi communication connection between the mobile device and the Soft AP is initiated.

14. The home appliance of claim 11, wherein
the communication module comprises:
a BLE communication module, and
a Wi-Fi communication module,
the BLE communication module and the Wi-Fi communication module are independently turned on or turned off,
the outputting of the BLE advertising packet is performed by the BLE communication module,
the outputting of the Wi-Fi beacon is performed by the Wi-Fi communication module, and
the at least one processor is further configured to execute the at least one instruction to block power of the Wi-Fi communication module while the outputting of the BLE advertising packet is being performed.

15. The home appliance of claim 14, wherein the at least one processor is further configured to execute the at least one instruction to:
establish a Bluetooth communication connection with the mobile device, based on a BLE connection request received from the mobile device,
supply power to the Wi-Fi communication module and activate the Soft AP, based on receiving an activation request of the Soft AP via the Bluetooth communication connection, and
output the Wi-Fi beacon of the Soft AP.

16. A method comprising:
by a mobile device,
performing a Bluetooth low energy (BLE) scan operation;
detecting a BLE advertising packet that includes service set identifier (SSID)-related information of a home appliance and is transmitted from the home appliance in a new product state in which the home appliance has not been registered in a server, by performing the BLE scan operation;
obtaining an SSID of the home appliance from the server, by using the SSID-related information;
establishing a Wi-Fi communication connection with the home appliance, by using the SSID of the home appliance;
providing an initial setting graphic user interface (GUI) related to an initial setting operation of registering the home appliance in the server; and
transmitting, to the home appliance via the Wi-Fi communication connection, a control signal related to the initial setting operation input through the initial setting GUI.

17. The method of claim 16, further comprising:
by the mobile device,
initiating a Wi-Fi scan, based on detecting the BLE advertising packet transmitted from the home appliance in the new product state.

18. The method of claim 16, further comprising:
by the mobile device,
obtaining user authentication information from the home appliance; and
requesting the home appliance for authentication, by using the user authentication information.

19. The method of claim 18, further comprising:
by the mobile device,
after the authentication from the home appliance is completed:
   receiving a temporary password from the home appliance; and
   transmitting, to an initial setting cloud, server connection information input via the initial setting GUI, by using the temporary password.

20. The method of claim 16, further comprising:
by the mobile device,
displaying, as a popup GUI view, information about the home appliance in the new product state, based on detecting the BLE advertising packet transmitted from the home appliance in the new product state that has not been registered in the server.

* * * * *